United States Patent
Yamamichi et al.

(10) Patent No.: US 7,823,212 B2
(45) Date of Patent: Oct. 26, 2010

(54) SECURELY AGGREGATING CONTENT ON A STORAGE DEVICE

(75) Inventors: Masato Yamamichi, Ota (JP); Satomi Yamamichi, legal representative, Ota (JP); Keiko Yamamichi, legal representative, Maebashi (JP); Motoji Ohmori, Hirakata (JP); Masaya Yamamoto, Hirakata (JP); Yasushi Uesaka, Sanda (JP); Hiroshi Hamasaka, Hirakata (JP)

(73) Assignee: Panasonic Corporation, Osaka (JP)

( * ) Notice: Subject to any disclaimer, the term of this patent is extended or adjusted under 35 U.S.C. 154(b) by 1252 days.

(21) Appl. No.: 10/553,412

(22) PCT Filed: Apr. 21, 2004

(86) PCT No.: PCT/JP2004/005715

§ 371 (c)(1),
(2), (4) Date: Oct. 17, 2005

(87) PCT Pub. No.: WO2004/095452

PCT Pub. Date: Nov. 4, 2004

(65) Prior Publication Data

US 2006/0253910 A1     Nov. 9, 2006

(30) Foreign Application Priority Data

Apr. 22, 2003     (JP)     ............... 2003-116836

(51) Int. Cl.
*G06F 21/00*     (2006.01)
(52) U.S. Cl. .......................... 726/30; 705/57
(58) Field of Classification Search ............... 726/30; 705/57
See application file for complete search history.

(56) References Cited

U.S. PATENT DOCUMENTS 5,687,191 A     11/1997     Lee et al.
5,761,301 A *     6/1998     Oshima et al. ............... 705/57

(Continued)

FOREIGN PATENT DOCUMENTS

CN     1226064     8/1999

(Continued)

OTHER PUBLICATIONS

H. Sakamoto et al., "SD Memory Card Specifications and Content Protection Technology," Matsushita Technical Journal, vol. 48, No. 2, (Apr. 2002), issued on Apr. 18, 2002, pp. 4-10 (with English Abstract & partial translations).

*Primary Examiner*—Christian LaForgia
(74) *Attorney, Agent, or Firm*—Wenderoth, Lind & Ponack, L.L.P.

(57) ABSTRACT

An aggregation system aggregates contents recorded on a plurality of recording mediums and recording them onto another recording medium while protecting the copyrights of the contents is provided. The aggregation system includes an aggregation apparatus and a reproduction apparatus. The aggregation apparatus obtains a main content from an optical disc, obtains a sub content from a memory card, and aggregates the obtained main content and sub content and records them onto a portable medium. The reproduction apparatus obtains the main content from the optical disc, obtains reproduction control information for controlling reproduction of the main content, and reproduces the main content recorded on the optical disc based on the reproduction control information.

26 Claims, 34 Drawing Sheets

U.S. PATENT DOCUMENTS

| | | | | |
|---|---|---|---|---|
| 5,805,699 | A * | 9/1998 | Akiyama et al. | 705/58 |
| 6,694,023 | B1 | 2/2004 | Kim | |
| 6,782,190 | B1 * | 8/2004 | Morito | 386/94 |
| 7,130,251 | B1 | 10/2006 | Morohashi | |
| 7,149,754 | B2 * | 12/2006 | Miller et al. | 707/104.1 |
| 7,299,199 | B2 * | 11/2007 | Nomura et al. | 705/26 |
| 7,327,934 | B2 * | 2/2008 | Kitani | 386/94 |
| 7,483,957 | B2 * | 1/2009 | Sako et al. | 709/217 |
| 7,500,101 | B2 * | 3/2009 | Kitani | 713/169 |
| 2002/0066025 | A1 | 5/2002 | Sato et al. | |
| 2002/0141737 | A1 * | 10/2002 | Fuchigami | 386/98 |
| 2003/0051237 | A1 | 3/2003 | Sako et al. | |
| 2003/0079042 | A1 * | 4/2003 | Yamanaka et al. | 709/247 |
| 2004/0190868 | A1 * | 9/2004 | Nakano et al. | 386/94 |
| 2006/0185022 | A1 * | 8/2006 | Yamanaka et al. | 726/30 |
| 2008/0069354 | A1 * | 3/2008 | Kitani et al. | 380/202 |
| 2008/0072072 | A1 * | 3/2008 | Muraki et al. | 713/193 |
| 2009/0202071 | A1 * | 8/2009 | Kato | 380/201 |

FOREIGN PATENT DOCUMENTS

| | | | |
|---|---|---|---|
| EP | 0 809 244 | | 11/1997 |
| EP | 0 813 194 | | 12/1997 |
| EP | 1 249 836 | | 10/2002 |
| JP | 2001-93226 | | 4/2001 |
| JP | 2001-332021 | | 11/2001 |
| JP | 2002-016899 | | 1/2002 |
| JP | 2002-109826 | | 4/2002 |
| JP | 2002-132457 | | 5/2002 |
| WO | 01/65796 | | 9/2001 |
| WO | 02/095550 | | 11/2002 |
| WO | WO 2004/053699 | * | 6/2004 |

* cited by examiner

FIG. 19

| Entry | Medium ID of Optical disc 21 | Decryption key |
|---|---|---|
| 1 | 1 | Decryption key 1 |
| 2 | 2 | Decryption key 2 |
| 3 | 3 | Decryption key 3 |

FIG. 20

| Entry | Medium ID of Optical disc 21 | Decryption key | Medium ID of Portable medium 23 |
|---|---|---|---|
| 1 | 1 | Decryption key 1 | 5 |
| 2 | 2 | Decryption key 2 | |
| 3 | 3 | Decryption key 3 | |

FIG. 23

| Medium ID | 1 | 2 | 3 | 4 | 5 |
|---|---|---|---|---|---|
| Integration judgment information | Permitted | Not permitted | Permitted | Permitted | Not permitted |

FIG. 28

| Medium ID | 1 | | | 2 | | | | 3 | | 4 | 5 | |
|---|---|---|---|---|---|---|---|---|---|---|---|---|
| Sub content ID | 1a | 1b | 1c | 2a | 2b | 2c | 2d | 3a | 3b | 4a | 5a | 5b |
| Aggregation judgment information | Permitted | Not permitted | Not permitted | Permitted | Permitted | Permitted | Not permitted | Permitted | Permitted | Not permitted | Not permitted | Not permitted |

FIG. 29

| Medium ID | 1 | | 2 | 3 | | 4 | 5 | |
|---|---|---|---|---|---|---|---|---|
| Billing to user | Yes | No | — | Yes | No | — | Yes | No |
| Aggregation judgment information | Permitted | Not permitted | Permitted | Permitted | Not permitted | Not permitted | Permitted | Not permitted |

FIG. 30

| Medium ID | 1 | | | | 2 | | 3 | | 4 | 5 | | | |
|---|---|---|---|---|---|---|---|---|---|---|---|---|---|
| Billing for obtainment of sub content | Yes | | No | | Yes | No | — | | — | Yes | | No | |
| Billing for aggregation | Yes | No | Yes | No | — | — | Yes | No | — | Yes | No | Yes | No |
| Aggregation judgment information | Permitted | Not permitted | Not permitted | Not permitted | Permitted | Not permitted | Permitted | Not permitted | Not permitted | Permitted | Not permitted | Not permitted | Not permitted |

| Medium ID | 1 | | 2 | | 3 | 4 | | 5 |
|---|---|---|---|---|---|---|---|---|
| Number of user's aggregations | Up to 1 | 2 or more | Up to 5 | 6 or more | Arbitrary number of times | Up to 3 | 4 or more | Arbitrary number of times |
| Aggregation judgment information | Permitted | Not permitted | Permitted | Not permitted | Permitted | Permitted | Not permitted | Not permitted |

SECURELY AGGREGATING CONTENT ON A STORAGE DEVICE

BACKGROUND OF THE INVENTION

1. Technical Field

The present invention relates to a technique for recording a content which is recorded on a recording medium onto another recording medium, and particularly to an aggregation system for aggregating contents which are recorded on a plurality of recording mediums and recording them onto a single recording medium.

2. Background Art

With the advance of digital signal compression technology and recording technology, it has become common in recent years to sell contents which are digital copyrighted works, such as music, video and programs, recorded on recording mediums such as high-capacity optical discs like digital versatile discs (DVDs). It is possible to copy such digital contents recorded on the recording mediums to other recording mediums like hard disks and the like without deterioration in quality. Therefore, the copyrights of such contents are in danger of being infringed by unauthorized uses and copying thereof, and thus the solution of this problem has been demanded.

As one of the conventional methods for preventing unauthorized uses and copying by third parties, there is the Content Protection for Recordable Media (CPRM) standard, that is, a well-known scheme for preventing unauthorized copying of contents recorded on recording mediums (See, for example, "p. 7 of Matsushita Technical Journal, Vol. 48, No. 2 (April, 2002), issued on Apr. 18, 2002 by Matsushita Electric Industrial Co., Ltd.). This scheme will be briefly explained below.

First, on a recording medium manufactured in compliance with the CPRM standard, a medium ID that is unique to the recording medium is recorded when it is manufactured. This medium ID is the information which can be read but cannot be rewritten nor deleted. When a recording device manufactured in compliance with this standard records a content on a recording medium, it generates a content key by a predetermined method using the medium ID of the recording medium, and records, on the recording medium, the content encrypted by a predetermined method using the content key. Under this scheme, an encrypted content recorded on a recording medium A can be copied to another recording medium B. However, the medium ID of the destination recording medium B is different from the medium ID of the source recording medium A. Therefore, a reproduction device manufactured in compliance with this standard cannot obtain a content key for decrypting the encrypted content which has been recorded on the source recording medium A, even if it generates a content key by a predetermined method by reading the medium ID of the destination recording medium B. As a result, the content which is copied onto the recording medium B cannot be decrypted, and thus unauthorized copying can be prevented.

On the other hand, with the recent widespread of the Internet, various types of contents such as music and video have been obtained via the Internet. It is supposed, for example, that video and audio data are recorded on a DVD and a user who purchased the DVD can not only reproduce and view (and listen to) the video and audio data but also replace the audio data recorded on the DVD with another audio data obtained via the Internet and recorded on another recording medium. In this case, the wider the variety of replaceable audio data is, the more the variety of uses of the content recorded on the DVD increases, which enhances the commercial value of the content more and more.

Under these circumstances, it is expected to distribute contents not only via the above-mentioned recording mediums like DVDs but also in other manners for increasing the commercial value of the contents. For example, it may be possible for a user to obtain, via the Internet, a sub content which is to be used in association with a content recorded on a recording medium like a DVD, record the sub content on another recording medium (a hard disk, a high-capacity memory card or the like, for example), and reproduce the content by associating it with the sub content recorded on another recording medium.

It is also expected, in the above-mentioned content distribution manner, to distribute, as a sub content, the modification or addition data for the content recorded on a DVD and reproduce the content recorded on the DVD by associating it with the sub content so as to reproduce the updated content.

In this case, since the content and the sub content to be used in association with the content are recorded on separate recording mediums, a user has to carry a plurality of recording mediums to use these contents in various places. Therefore, it is anticipated, in the above-mentioned content distribution manner, that the use of these contents which are aggregated and recorded on another recording medium will be demanded for the sake of enhanced convenience of portability, for example. This type of usage results in actual copying of the content and the sub content if these contents recorded on separate recording mediums are just aggregated and recorded on another recording medium, because the content and the sub content can be reproduced from both of the source recording mediums and the destination recording medium on which the aggregated contents are recorded. Therefore, some measures must be taken in order to protect the copyrights of the contents.

However, the conventional technology like the CPRM standard is a scheme for preventing unauthorized copying of the contents recorded on a single recording medium in order to protect the copyrights of the contents, and there is no method for aggregating contents recorded on a plurality of recording mediums and recording them on another recording medium in order to enhance users' convenience, while at the same time protecting the copyrights of the contents.

The object of the present invention, in view of the above problem, is to provide an aggregation apparatus for aggregating contents recorded on a plurality of recording mediums and recording them on another recording medium while protecting the copyrights of the contents, a reproduction apparatus for reproducing the aggregated contents while protecting the copyrights of the contents, and an aggregation system for aggregating the contents while protecting the copyrights thereof or for reproducing the aggregated contents while protecting the copyrights thereof.

It should be noted that the above-mentioned aggregation or reproduction of contents under the protection of the copyrights thereof means the aggregation or reproduction of the contents based on the consent of the copyright owners to aggregate or reproduce the contents.

SUMMARY OF THE INVENTION

The aggregation system according to the present invention is an aggregation system comprising an aggregation apparatus, a first reproduction apparatus and a second reproduction apparatus, wherein the aggregation apparatus includes: a first obtainment unit operable to obtain a main content from a first recording medium; a second obtainment unit operable to obtain a sub content; and a recording unit operable to aggregate the main content and the sub content and record the aggregated contents onto a second recording medium, the first reproduction apparatus includes: a third obtainment unit operable to obtain the main content from the first recording medium; a fourth obtainment unit operable to obtain reproduction control information for controlling reproduction of the main content; and a reproduction unit operable to reproduce the main content recorded on the first recording medium, based on the reproduction control information, and the second reproduction apparatus reproduces the main content and the sub content which are recorded on the second recording medium.

The aggregation apparatus according to the present invention is an aggregation apparatus for aggregating a main content recorded on a first recording medium and a sub content and recording the aggregated contents onto a second recording medium, wherein reproduction control information indicating whether or not reproduction of the main content is permitted is recorded on the first recording medium, and the aggregation apparatus comprises: a first obtainment unit operable to obtain the main content from the first recording medium; a second obtainment unit operable to obtain the sub content; a third obtainment unit operable to obtain the reproduction control information from the first recording medium; a judgment unit operable to judge whether or not the reproduction control information is information indicating that reproduction of the main content is permitted; a recording unit operable to aggregate the main content and the sub content and record the aggregated contents onto the second recording medium, when the judgment unit judges that the reproduction control information is the information indicating that reproduction of the main content is permitted; and a changing unit operable to change the reproduction control information recorded on the first recording medium so that the reproduction control information indicates that reproduction of the main content is not permitted, in the case where the main content and the sub content are recorded onto the second recording medium by the recording unit.

The reproduction apparatus according to the present invention is a reproduction apparatus for reproducing a main content recorded on a recording medium, wherein reproduction control information indicating whether or not reproduction of the main content is permitted is recorded on the recording medium, and the reproduction apparatus comprises: a first obtainment unit operable to obtain the main content from the recording medium; a second obtainment unit operable to obtain the reproduction control information from the recording medium; a judgment unit operable to judge whether or not the reproduction control information is information indicating that reproduction of the main content is permitted; and a reproduction unit operable to reproduce the main content recorded on the recording medium, when the judgment unit judges that the reproduction control information is the information indicating that reproduction of the main content is permitted.

The reproduction apparatus according to the present invention is a reproduction apparatus for reproducing an encrypted main content and a sub content which are recorded on a second recording medium after the encrypted main content recorded on a first recording medium and the sub content are aggregated and recorded onto the second recording medium, wherein a decryption key for decrypting the encrypted main content is recorded on the first recording medium, and the reproduction apparatus comprises: a first obtainment unit operable to obtain the encrypted main content from the second recording medium; a second obtainment unit operable to obtain the decryption key from the first recording medium; and a decryption unit operable to decrypt the encrypted main content using the decryption key.

The aggregation system according to the present invention is an aggregation system comprising an aggregation apparatus and a reproduction apparatus, wherein the aggregation apparatus includes: a first obtainment unit operable to obtain a main content; a second obtainment unit operable to obtain a sub content; a third obtainment unit operable to obtain aggregation judgment information indicating whether or not aggregation of the main content and the sub content and recording of the aggregated contents onto a recording medium are permitted; a judgment unit operable to judge whether or not the aggregation judgment information is information indicating that aggregation of the main content and the sub content and recording of the aggregated contents onto the recording medium are permitted; and a recording unit operable to aggregate the main content and the sub content and record the aggregated contents onto the recording medium, when the judgment unit judges that the aggregation judgment information is the information indicating that aggregation and recording onto the recoding medium are permitted, and the reproduction apparatus reproduces the main content and the sub content which are recorded on the recording medium.

The aggregation apparatus according to the present invention is an aggregation apparatus for aggregating a main content and a sub content and recording the aggregated contents onto a first recording medium, comprising: a first obtainment unit operable to obtain the main content; a second obtainment unit operable to obtain the sub content; a third obtainment unit operable to obtain aggregation judgment information indicating whether or not aggregation of the main content and the sub content and recording of the aggregated contents onto the first recording medium are permitted; a judgment unit operable to judge whether or not the aggregation judgment information is information indicating that aggregation of the main content and the sub content and recording of the aggregated contents onto the first recording medium are permitted; and a recording unit operable to aggregate the main content and the sub content and record the aggregated contents onto the first recording medium, when the judgment unit judges that the aggregation judgment information is the information indicating that aggregation and recording onto the first recording medium are permitted.

The aggregation system according to the present invention is an aggregation system comprising an aggregation apparatus, and a reproduction apparatus, wherein the aggregation apparatus includes: a first obtainment unit operable to obtain a main content; a second obtainment unit operable to obtain a sub content; and a recording unit operable to aggregate the main content and the sub content and record the aggregated contents onto a recording medium, and the reproduction apparatus includes: a judgment unit operable to judge whether or not a situation of reproduction of the main content and the sub content satisfies a predetermined condition indicating that reproduction of the main content and the sub content is permitted, and a reproduction unit operable to reproduce the main content and the sub content which are recorded on the recording medium, when the judgment unit judges that the situation satisfies the predetermined condition.

The reproduction apparatus according to the present invention is a reproduction apparatus for reproducing a main content and a sub content which are aggregated and recorded onto a recording medium, comprising: a judgment unit operable to judge whether or not a situation of reproduction of the main content and the sub content satisfies a predetermined condition indicating that reproduction of the main content and the sub content is permitted; and a reproduction unit operable to reproduce the main content and the sub content which are recorded on the recording medium, when the judgment unit judges that the situation satisfies the predetermined condition.

As described above, the aggregation system, the aggregation apparatus and the reproduction apparatus of the present invention allow aggregation of contents recorded on a plurality of recording mediums and their recording on another recording medium while protecting the copyrights of the contents, or allow reproduction of the aggregated contents while protecting the copyrights thereof.

In addition, the present invention can be realized as a method including the steps executed by the characteristic units included in the aggregation apparatus or the reproduction apparatus of the present invention, or as a program including these steps. The program can also be distributed via a recording medium such as a CD-ROM or a transmission medium such as a communication network.

As further information about technical background to this application, Japanese Patent Application No. 2003-116836 filed on Apr. 22, 2003 is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 19 is a diagram showing an example of a decryption key list managed by a server 24 in the second embodiment;

FIG. 20 is a diagram showing an example of a decryption key list managed by the server 24 in the second embodiment;

FIG. 23 is a diagram showing an example of medium IDs and aggregation judgment information in the third embodiment;

FIG. 28 is diagram showing an example of medium IDs, sub content IDs and aggregation judgment information in the third embodiment;

FIG. 29 is a diagram showing an example of medium IDs, information indicating whether or not to bill a user and aggregation judgment information in the third embodiment;

FIG. 30 is a diagram showing an example of medium IDs, information indicating whether or not to bill a user and aggregation judgment information in the third embodiment;

DETAILED DESCRIPTION OF THE INVENTION

The best mode for carrying out the present invention will be explained below with reference to the drawings.

First Embodiment

First, an aggregation system 1 in the first embodiment of the present invention will be explained below with reference to FIG. 1 to FIG. 6.

When an aggregation apparatus aggregates contents recorded on a plurality of recording mediums and records them onto another recording medium, this aggregation system 1 does not reproduce, after the aggregation, the content which has been recorded on the recording medium before the aggregation.

Overview of Aggregation System

Figure 1:
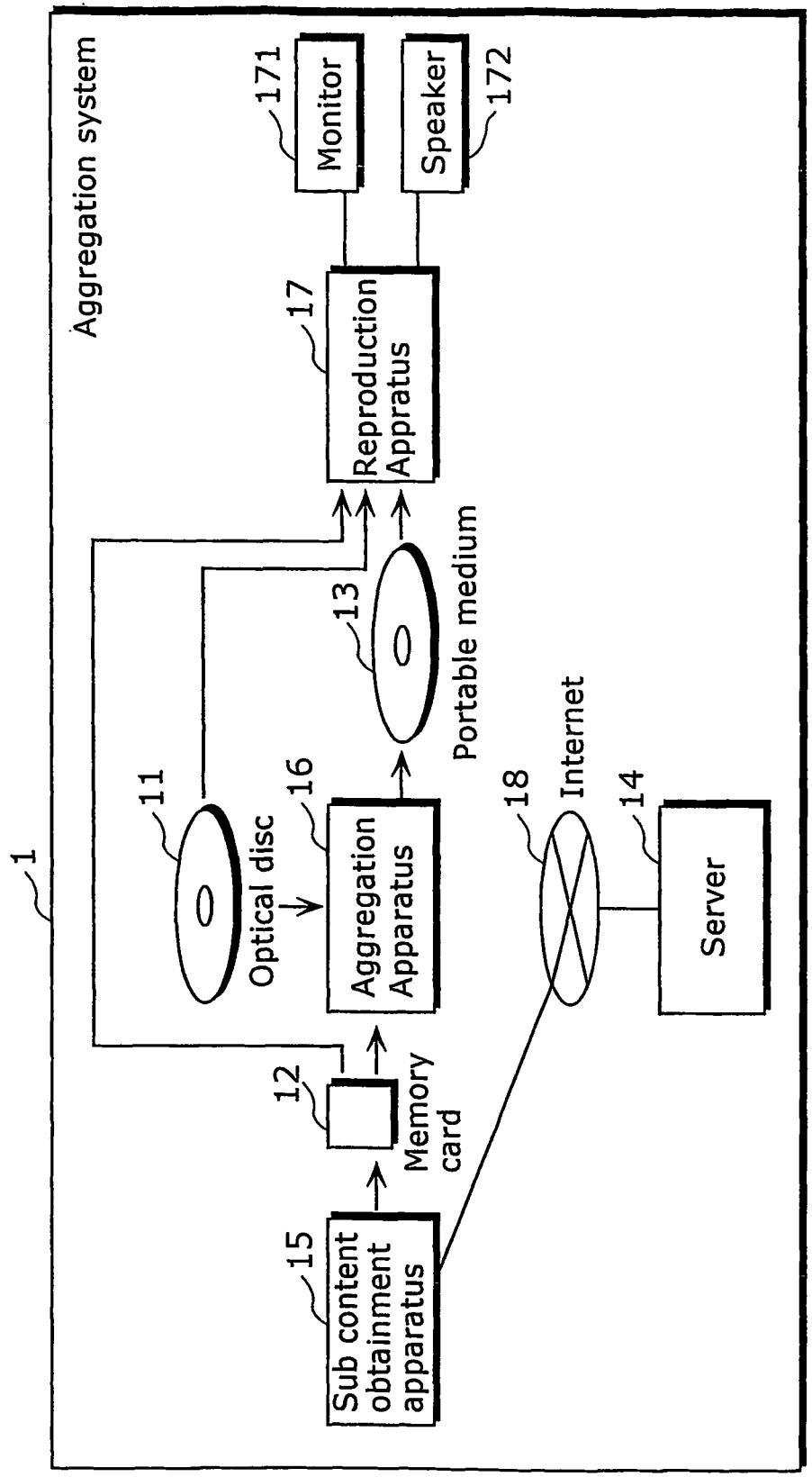
FIG. 1 is a diagram showing a configuration of an aggregation system 1 in a first embodiment.

First, the overview of the aggregation system 1 in the first embodiment will be provided with reference to FIG. 1. FIG. 1 is a block diagram showing the configuration of the aggregation system 1 in the first embodiment.

In FIG. 1, a content such as a movie is recorded, as a main content, on an optical disc 11, a sub content such as audio data to be used in association with the main content recorded on the optical disc 11 can be recorded on a memory card 12, and a portable medium 13 is a portable medium such as a DVD-RAM on which information can be recorded. Note that the portable medium 13 may be a removable hard disk drive (HDD), or may be replaced with a recording medium such as a nonremovable HDD.

A content provider distributes the main content to a user via a distribution means such as a sale of the main content recorded on the optical disc 11, and distributes the sub content to be used in association with the main content to the user from a server 14 via the Internet 18.

On the other hand, the user obtains the sub content from the server 14 via the Internet 18 using a sub content obtainment apparatus 15, and records it on the memory card 12. Then, using a reproduction apparatus 17, the user reproduces the main content recorded on the optical disc 11 by associating it with the sub content recorded on the memory card 12, and views it.

In order to enhance convenience of portability, the user can also aggregate both the main content recorded on the optical disc 11 and the sub content recorded on the memory card 12 and record them onto the portable medium 13, using an aggregation apparatus 16. The user can also reproduce and view the main content and the sub content which are recorded on the portable medium 13, using the reproduction apparatus 17. Note that after aggregating the main content and the sub content and recording them onto the portable medium 13, the aggregation apparatus 16 takes a process so that the main content recorded on the optical disc 11 cannot be reproduced.

In other words, this aggregation system 1 is a system for protecting copyrights of contents by not reproducing a main content which has been recorded on a recording medium before aggregation, after a user aggregates the contents recorded on a plurality of recording mediums and records them onto another recording medium.

The overview of the aggregation system 1 in the first embodiment has been provided, and the detailed explanation of the aggregation system 1 will follow.

Configuration of Aggregation System 1

As shown in FIG. 1, the aggregation system 1 includes the optical disc 11, the memory card 12, the portable medium 13, the server 14, the sub content obtainment apparatus 15, the aggregation apparatus 16 and the reproduction apparatus 17. The server 14 and the sub content obtainment apparatus 15 are connected to each other via the Internet 18.

Structure of Optical Disc 11

Figure 2:
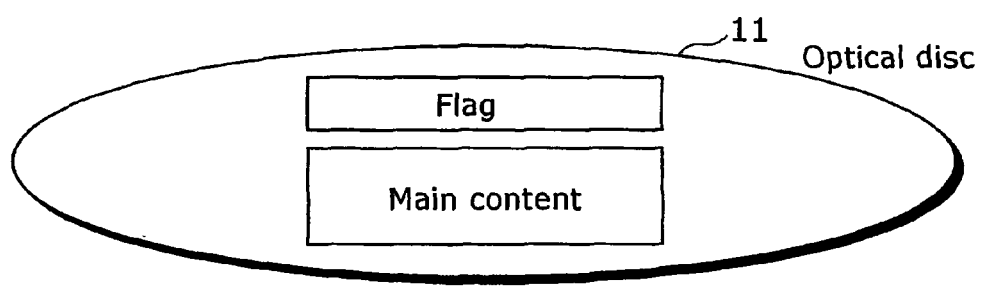
FIG. 2 is a diagram showing a structure of an optical disc 11 in the first embodiment.

The optical disc 11 is a recording medium such as a DVD-RAM on which information can be recorded. FIG. 2 shows the structure of the optical disc 11. As shown in FIG. 2, on the optical disc 11, a main content and reproduction judgment information (flag) indicating whether reproduction of the main content is permitted or not are recorded. It is assumed here that the default value of the reproduction judgment information is a value indicating that the reproduction is permitted, and it is "1" in the first embodiment.

Structure of Memory Card 12

The memory card 12 is a recording medium such as an SD card on which information can be recorded. On the memory card 12, a sub content to be used in association with the main content is recorded by the sub content obtainment apparatus 15.

Structure of Portable Medium 13

The portable medium 13 is a portable medium such as a DVD-RAM on which information can be recorded. The main content recorded on the optical disc 11 and the sub content recorded on the memory card 12 are aggregated and recorded onto the portable medium 13 by the aggregation apparatus 16. Note that the portable medium 13 may be a removable HDD, or may be replaced with a recording medium such as a non-removable HDD. In short, the portable medium 13 or the recording medium that replaces the portable medium 13 must be a recording medium on which aggregated main content and sub content are recorded.

Structure of Server 14

The server 14 holds the sub content to be used in association with the main content recorded on the optical disc 11, and provides the sub content obtainment apparatus 15 with the sub content.

Structure of Sub Content Obtainment Apparatus 15

The sub content obtainment apparatus 15 obtains the sub content from the server 14 via the Internet 18, and records it on the memory card 12.

Structure of Aggregation Apparatus 16

Figure 3:
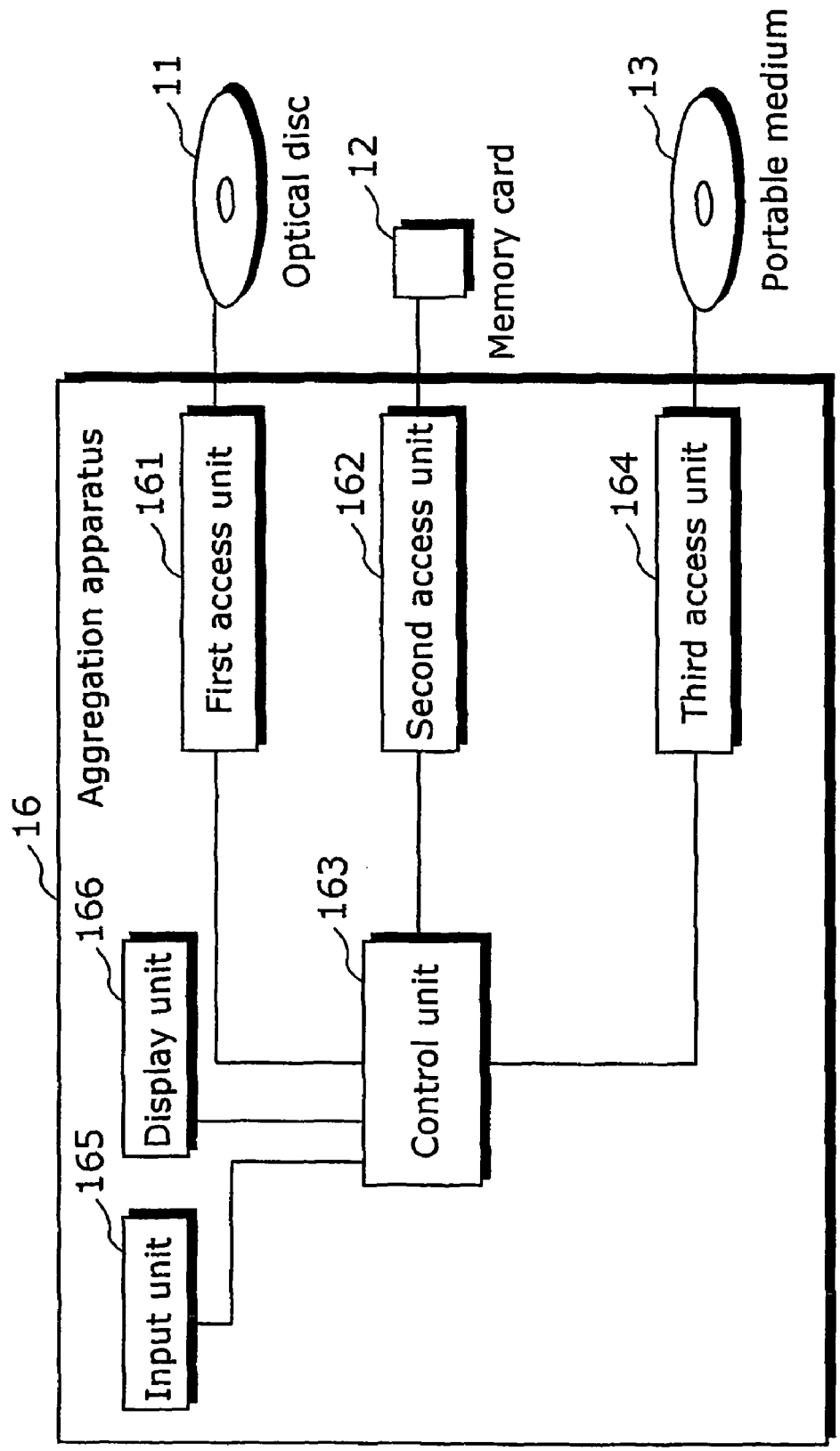
FIG. 3 is a diagram showing a structure of an aggregation apparatus 16 in the first embodiment.

FIG. 3 shows the structure of the aggregation apparatus 16. As shown in FIG. 3, the aggregation apparatus 16 includes a first access unit 161, a second access unit 162, a control unit 163, a third access unit 164, an input unit 165 and a display unit 166.

(1) First Access Unit 161

The first access unit 161 reads the main content and the reproduction judgment information from the optical disc 11 according to the instruction of the control unit 163. The first access unit 161 also rewrites the reproduction judgment information on the optical disc 11 according to the instruction of the control unit 163.

(2) Second Access Unit 162

The second access unit 162 reads the sub content from the memory card 12 according to the instruction of the control unit 163.

(3) Control Unit 163

The control unit 163 reads the main content and the reproduction judgment information from the optical disc 11 via the first access unit 161, and reads the sub content from the memory card 12 via the second access unit 162.

When the value of the reproduction judgment information read from the optical disc 11 is 1, the control unit 163 writes the main content and the sub content onto the portable medium 13 via the third access unit 164. Then, the control unit 163 rewrites, via the first access unit 161, the value of the reproduction judgment information on the optical disc 11 from 1 to another value than 1, for example, 0.

(4) Third Access Unit 164

The third access unit 164 writes the main content and the sub content onto the portable medium 13 according to the instruction of the control unit 163.

(5) Input Unit 165

The input unit 165 accepts an input of an aggregation instruction from a user.

Then, upon receipt of the input of the aggregation instruction from the user, the input unit 165 causes the control unit 163 to operate.

(6) Display Unit 166

After completing the processing of the control unit 163, the display unit 166 notifies the user of the end of the processing by displaying it.

Structure of Reproduction Apparatus 17

Figure 4:
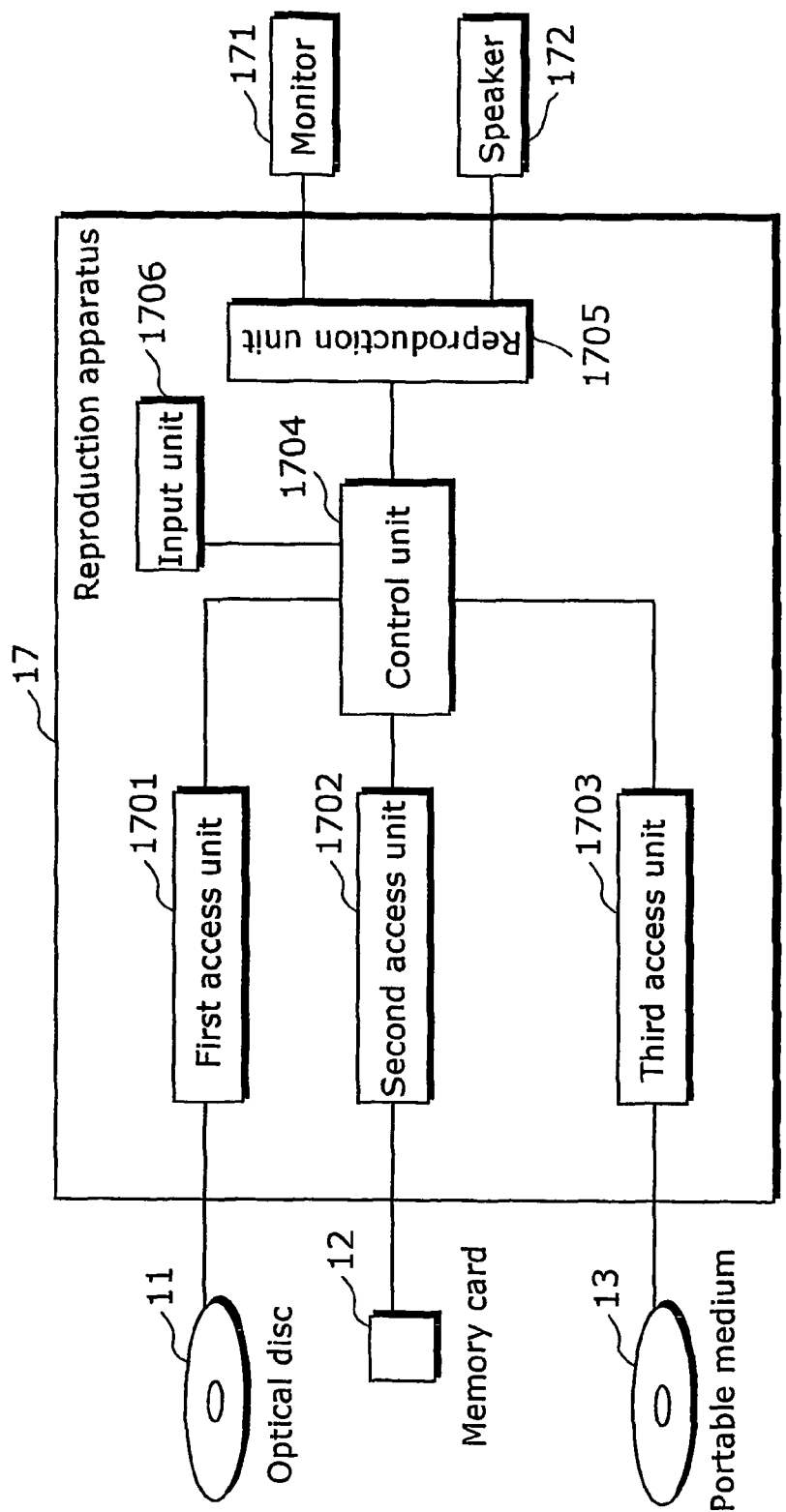
FIG. 4 is a diagram showing a structure of a reproduction apparatus 17 in the first embodiment.

FIG. 4 shows the structure of the reproduction apparatus 17. As shown in FIG. 4, the reproduction apparatus 17 includes a first access unit 1701, a second access unit 1702, a third access unit 1703, a control unit 1704, a reproduction unit 1705 and an input unit 1706.

(1) First Access Unit 1701

The first access unit 1701 reads the main content and the reproduction judgment information from the optical disc 11 according to the instruction of the control unit 1704.

(2) Second Access Unit 1702

The second access unit 1702 reads the sub content from the memory card 12 according to the instruction of the control unit 1704.

(3) Third Access Unit 1703

The third access unit 1703 reads the main content and the sub content from the portable medium 13 according to the instruction of the control unit 1704.

(4) Control Unit 1704

The control unit 1704 performs either the following processing (i) or (ii) according to the instruction of the input unit 1706.

(i) To cause the reproduction unit 1705 to reproduce the main content recorded on the optical disc 11 and the sub content recorded on the memory card 12 by associating them with each other.

The control unit 1704 reads the main content and the reproduction judgment information from the optical disc 11 via the first access unit 1701, and reads the sub content from the memory card 12 via the second access unit 1702. When the value of the reproduction judgment information read from the optical disc 11 is 1, the control unit 1704 causes the reproduction unit 1705 to reproduce the main content and the sub content by associating them with each other and output them to the outside. Note that when the value of the reproduction judgment information is not 1, the control unit 1704 does not cause the reproduction unit 1705 to reproduce the main content and the sub content.

It is assumed in the first embodiment that the main content is digital data composed of audio data and video data and the sub content is digital data composed of audio data, for example. In this case, the control unit 1704 causes the reproduction unit 1705 to replace the audio data in the main content with the audio data in the sub content, so that the main content recorded on the optical disc 11 and the sub content recorded on the memory card 12 are reproduced in association with each other.

(ii) To cause the reproduction unit 1705 to reproduce the main content and the sub content which are recorded on the portable medium 13 by associating them with each other.

The control unit 1704 reads the main content and the sub content from the portable medium 13 via the third access unit 1703. Then, the control unit 1704 causes the reproduction unit 1705 to reproduce the main content and the sub content by associating them with each other and output them to the outside.

(5) Reproduction Unit 1705

The reproduction unit 1705 reproduces the main content and the sub content by associating them with each other under the control of the control unit 1704, and outputs the reproduced data to a monitor 171 and a speaker 172 which are connected to the reproduction unit 1705. The monitor 171 and the speaker 172 output the data reproduced by the reproduction unit 1705 to the outside.

(6) Input Unit 1706

The input unit 1706 accepts an instruction to reproduce the optical disc 11 or an instruction to reproduce the portable medium 13 from the user.

Upon receipt of the instruction to reproduce the optical disc 11, the input unit 1706 causes the control unit 1704 to operate so that the main content recorded on the optical disc 11 and the sub content recorded on the memory card 12 are reproduced in association with each other.

On the other hand, upon receipt of the instruction to reproduce the portable medium 13, the input unit 1706 causes the control unit 1704 to operate so that the main content and the sub content which are recorded on the portable medium 13 are reproduced in association with each other.

Operation of Aggregation System 1

The configuration of the aggregation system 1 has been explained, and the detailed explanation of the operations of the aggregation apparatus 16 and the reproduction apparatus 17, as the operation of the aggregation system 1, will follow.

Operation of Aggregation Apparatus 16

Figure 5:
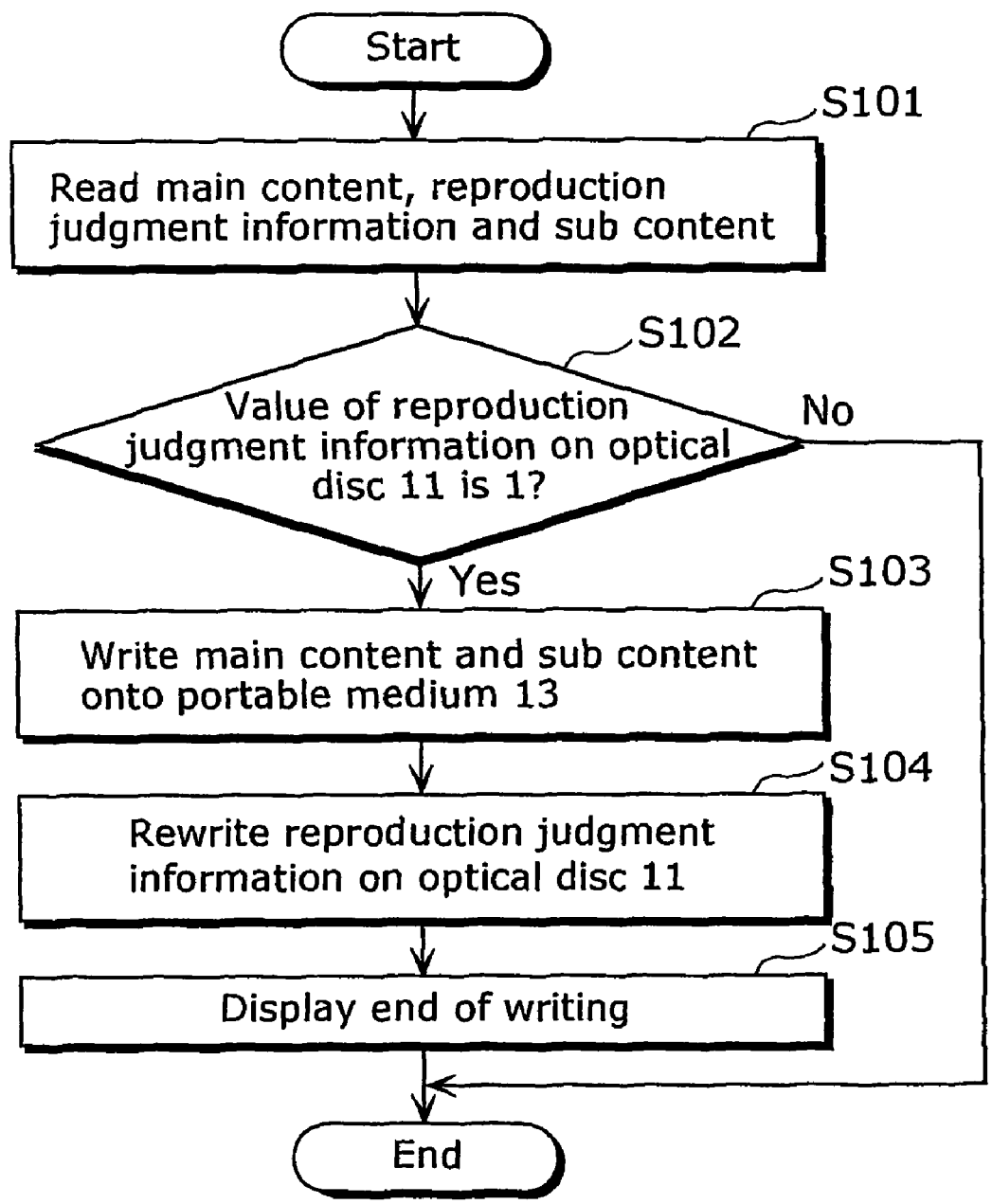
FIG. 5 is a flowchart showing processing of the aggregation apparatus 16 in the first embodiment.

The operation of the aggregation apparatus 16 will be explained with reference to the flowchart as shown in FIG. 5.

When the input unit 165 receives the input of the aggregation instruction from the user, the aggregation apparatus 16 performs the following processing.

First, the control unit 163 reads the main content and the reproduction judgment information from the optical disc 11 via the first access unit 161, and reads the sub content from the memory card 12 via the second access unit 162 (Step S101).

Next, the control unit 163 checks whether the value of the reproduction judgment information read from the optical disc 11 is 1 or not (Step S102), and when the value of the reproduction judgment information is not 1 but 0, for example (No in Step S102), the operation of the aggregation apparatus 16 ends.

On the other hand, when the value of the reproduction judgment information is 1 (Yes in Step S102), the control unit 163 writes the main content and the sub content onto the portable medium 13 via the third access unit 164 (Step S103).

Then, the control unit 163 rewrites the value of the reproduction judgment information on the optical disc 11 to another value than 1, for example, 0, via the first access unit 161 (Step S104).

Next, the display unit 166 displays that writing of the main content and the sub content onto the portable medium 13 has been completed (Step S105). Then, the operation of the aggregation apparatus 16 ends.

Operation of Reproduction Apparatus 17

Figure 6:
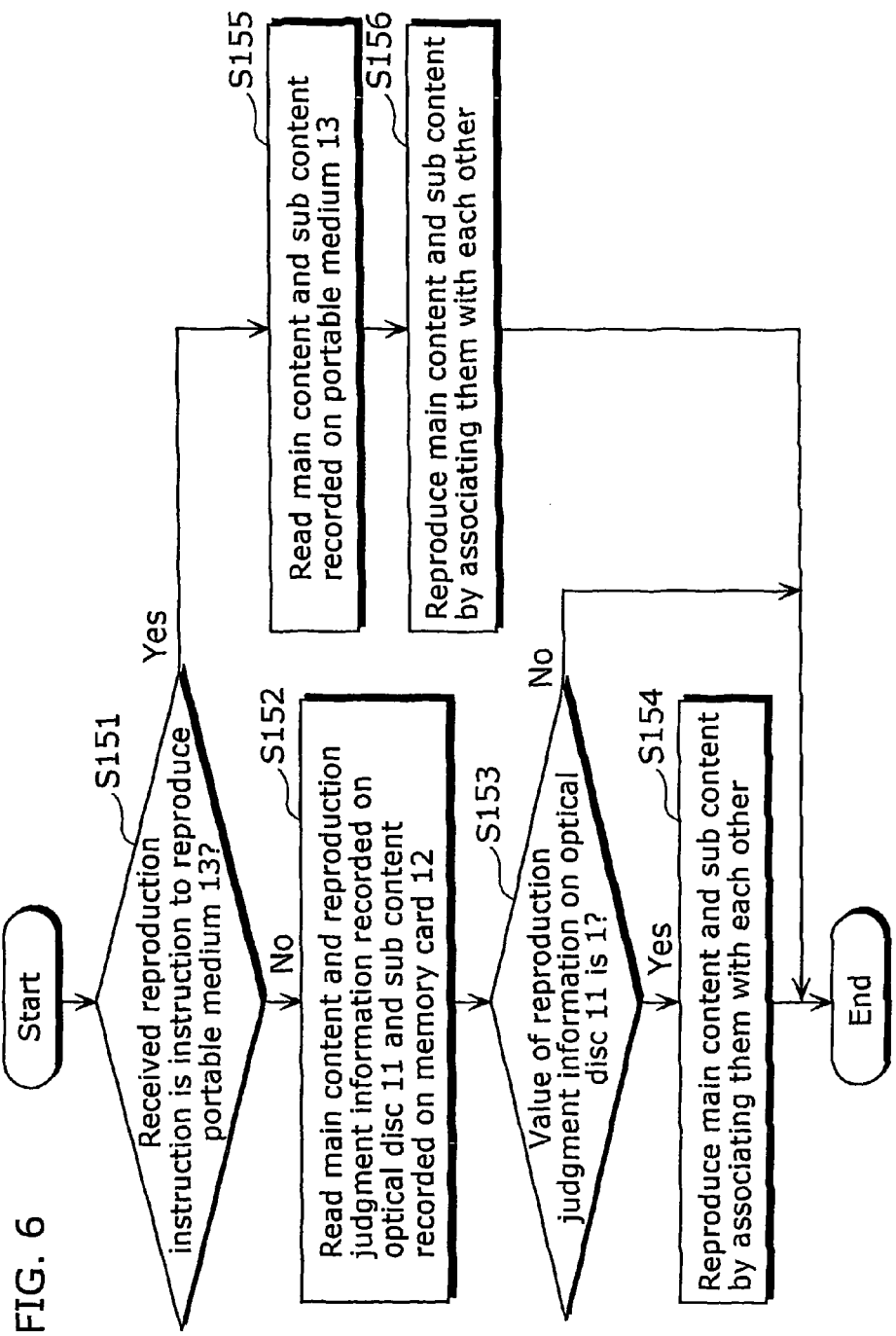
FIG. 6 is a flowchart showing processing of the reproduction apparatus 17 in the first embodiment.

The operation of the reproduction apparatus 17 will be explained with reference to the flowchart as shown in FIG. 6.

When the input unit 1706 receives the instruction to reproduce the optical disc 11 or the instruction to reproduce the portable medium 13 from the user, the reproduction apparatus 17 performs the following operation.

First, the input unit 1706 checks whether the received reproduction instruction is the instruction to reproduce the optical disc 11 or the instruction to reproduce the portable medium 13 (Step S151). The processing goes to Step S152 in the case of the instruction, to reproduce the optical disc 11, whereas the processing goes to Step S155 in the case of the instruction to reproduce the portable medium 13.

To be more specific, in a case where the reproduction instruction received by the input unit 1706 is the instruction to reproduce the optical disc 11 (No in Step S151), the control unit 1704 reads the main content and the reproduction judgment information from the optical disc 11 via the first access unit 1701, and reads the sub content from the memory card 12 via the second access unit 1702 (Step S152).

Next, the control unit 1704 checks whether the value of the reproduction judgment information read from the optical disc 11 is 1 or not (Step S153). When the value of the reproduction judgment information is not 1 but 0, for example (No in Step S153), the operation of the reproduction apparatus 17 ends.

When the value of the reproduction judgment information is 1 (Yes in Step S153), the control unit 1704 causes the reproduction unit 1705 to reproduce the main content read from the optical disc 11 and the sub content read from the memory card 12 by associating them with each other (Step S154). The reproduced data is outputted to the outside via the monitor 171 and the speaker 172. As such, the operation of the reproduction apparatus 17 ends.

On the other hand, in a case where the reproduction instruction received by the input unit 1706 is the instruction to reproduce the portable medium 13 (Yes in Step S151), the control unit 1704 reads the main content and the sub content from the portable medium 13 via the third access unit 1703 (Step S155). Then, the control unit 1704 causes the reproduction unit 1705 to reproduce the main content and the sub content read from the portable medium 13 by associating them with each other (Step 5156). The reproduced data is outputted to the outside via the monitor 171 and the speaker 172. As such, the operation of the reproduction apparatus 17 ends.

Verification of Operation of Aggregation System 1

The overall operation of the aggregation system 1 in the first embodiment will be summarized below.

First, the aggregation apparatus 16 reads the main content and the reproduction judgment information from the optical disc 11 and reads the sub content from the memory card 12. When the value of the reproduction judgment information read from the optical disc 11 is 1, the aggregation apparatus 16 aggregates the main content and the sub content and records them onto the portable medium 13, and rewrites the value of the reproduction judgment information on the optical disc 11 to another value than 1.

When reproducing the main content recorded on the optical disc 11 and the sub content recorded on the memory card 12, the reproduction apparatus 17 reads the main content and the reproduction judgment information from the optical disc 11 and reads the sub content from the memory card 12. When the value of the reproduction judgment information is 1, the reproduction apparatus 17 causes the reproduction unit 1705 to reproduce the main content and the sub content by associating them with each other and output the reproduced data to the outside.

On the other hand, when reproducing the main content and the sub content which are recorded on the portable medium 13, the reproduction apparatus 17 reads the main content and the sub content from the portable medium 13, and causes the reproduction unit 1705 to reproduce both the contents by associating them with each other.

As a result, the user can reproduce the main content recorded on the optical disc 11 and the sub content recorded on the memory card 12 by associating them with each other. In addition, for the sake of enhancing convenience of portability, the user can reproduce the main content and the sub content which are recorded on the portable medium 13 by associating them with each other by aggregating the main content recorded on the optical disc 11 and the sub content recorded on the memory card 12 and recording them on the portable medium 13.

Effect Obtained in First Embodiment

In the first embodiment, after aggregating the main content recorded on the optical disc 11 and the sub content recorded on the memory card 12 and recording them onto the portable medium 13, the aggregation apparatus 16 rewrites the reproduction judgment information recorded on the optical disc 11 from 1 to another value than 1. When the value of the reproduction judgment information recorded on the optical disc 11 is another value than 1, the reproduction apparatus 17 does not reproduce the main content recorded on the optical disc 11.

Thereby, in a case where the main content and the sub content are aggregated and recorded onto the portable medium 13, the main content and the sub content recorded on the portable medium 13 can be reproduced, but the main content recorded on the optical disc 11 cannot be reproduced. As a result, differently from the conventional techniques, even if the aggregation apparatus 16 aggregates the main content recorded on the optical disc 11 and the sub content recorded on the memory card 12 and records them onto the portable medium 13, the main content which has been recorded on the optical disc 11 before the aggregation is not reproduced after the aggregation. Therefore, the copyrights of the contents are protected.

Modifications

Figure 7:
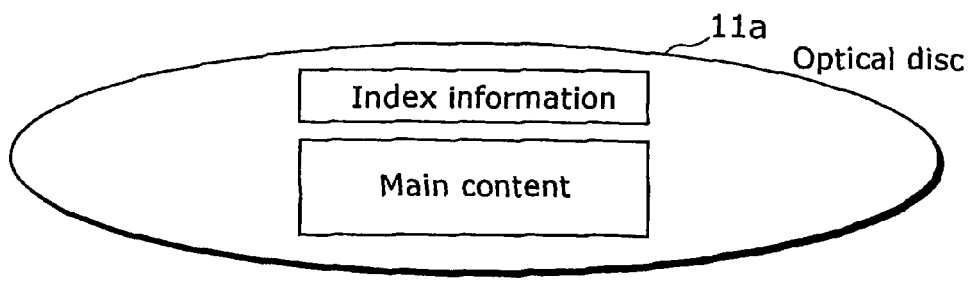
FIG. 7 is a diagram showing a structure of an optical disc 11a in the first embodiment.

Although the first embodiment has been fully described by way of one example of the embodiments of the present invention, it is to be noted that various changes and modifications will be apparent to those skilled in the art. Therefore, unless otherwise such changes and modifications depart from the scope of the present invention, they should be construed as being included therein. The embodiment of the present invention also includes the following modifications:

(1) As shown in FIG. 7, in a case where, as index information, information necessary for reading the main content from an optical disc 11a, such as information of a table of contents (TOC) for a file system of a DVD and a CD, is recorded on the optical disc 11a, the aggregation apparatus 16 may delete or rewrite the index information on the optical disc 11a after aggregating and recording the main content and the sub content on the portable medium 13, in order to prevent reproduction of the main content recorded on the optical disc 11a.

To be more specific, it is assumed, for example, that the TOC information as an example of the index information, as well as the main content, is recorded on the optical disc 11a, as shown in FIG. 7. In the aggregation apparatus 16, the control unit 163 reads the main content from the optical disc 11a via the first access unit 161, reads the sub content from the memory card 12 via the second access unit 162, and writes the main content and the sub content on the portable medium 13 via the third access unit 164. Then, the control unit 163 deletes the TOC information on the optical disc 11a via the first access unit 161.

In the reproduction apparatus 17, when reproducing the main content recorded on the optical disc 11a and the sub content recorded on the memory card 12, the control unit 1704 reads the main content and the TOC information from the optical disc 11a via the first access unit 1701, and reads the sub content from the memory card 12 via the second access unit 1702. If the TOC information is not deleted, the control unit 1704 causes the reproduction unit 1705 to reproduce the main content recorded on the optical disc 11a and the sub content recorded on the memory card 12 by associating them with each other and output the reproduced data to the outside via the monitor 171 and the speaker 172.

On the other hand, in a case where the main content and the sub content which are recorded on the portable medium 13 are reproduced, the control unit 1704 reads the main content and the sub content from the portable medium 13 via the third access unit 1703, and causes the reproduction unit 1705 to reproduce the main content and the sub content by associating them with each other and output the reproduced data to the outside via the monitor 171 and the speaker 172.

Thereby, after the aggregation of the main content and the sub content, the TOC information on the optical disc 11a is deleted and the main content recorded on the optical disc 11a cannot be reproduced, so the same effect as that of the first embodiment can be obtained. Note that although the above explanation is based on the assumption that the TOC information is deleted, the index information such as the TOC information may be rewritten. The same effect can be obtained in either the case where the index information is deleted or rewritten. In addition, not only the index information is deleted or rewritten, but also the main content may be deleted or rewritten.

Figure 8:
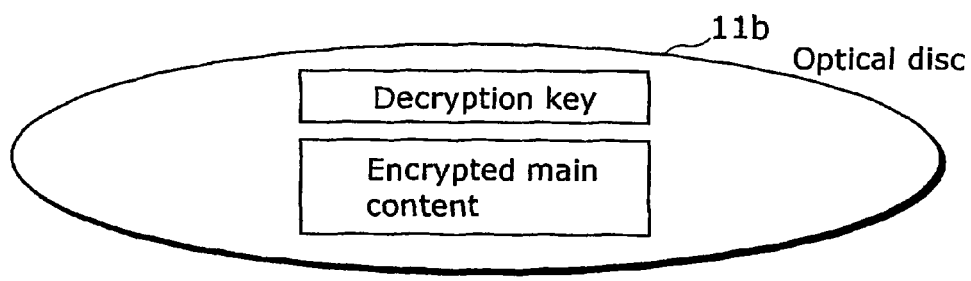
FIG. 8 is a diagram showing a structure of an optical disc 11b in the first embodiment.

(2) Furthermore, FIG. 8 shows an example where an encrypted main content and a decryption key for the main content are recorded on an optical disc 11b. In this case, after aggregating the main content and the sub content, the aggregation apparatus 16 may delete or rewrite the decryption key on the optical disc 11b.

To be more specific, an encrypted main content ECNT=Sym (K, CNT) and a decryption key K' are recorded on the optical disc 11b. The encrypted main content is generated by applying a common key encryption algorithm Sym like a DES encryption method to a main content CNT using an encryption key K. In the common key encryption algorithm, the encryption key K and the decryption key K' have the same value.

In the aggregation apparatus 16, the control unit 163 reads the encrypted main content ECNT and the decryption key K' from the optical disc 11b via the first access unit 161, reads the sub content SCNT from the memory card 12 via the second access unit 162, and writes the encrypted main content ECNT, the decryption key K' and the sub content SCNT onto the portable medium 13 via the third access unit 164. Then, the control unit 163 deletes the decryption key K' on the optical disc 11b via the first access unit 161.

In the reproduction apparatus 17, the control unit 1704 has the common key encryption algorithm Sym which was used for encrypting the main content CNT. When reproducing the main content recorded on the optical disc 11b and the sub content recorded on the memory card 12, the control unit 1704 reads the encrypted main content ECNT and the decryption key K' from the optical disc 11b via the first access unit 1701, and reads the sub content SCNT from the memory card 12 via the second access unit 1702. If the decryption key K' has not been deleted, the control unit 1704 decrypts the encrypted main content ECNT into the main content CNT=Sym (K', ECNT) by applying the common key encryption algorithm Sym to the encrypted main content ECNT using the decryption key K'. Then, the control unit 1704 causes the reproduction unit 1705 to reproduce the decrypted main content, namely, the main content recorded on the optical disc 11b and the sub content recorded on the memory card 12 by associating them with each other and output the reproduced data to the outside via the monitor 171 and the speaker 172.

On the other hand, when reproducing the main content and the sub content which are recorded on the portable medium 13, the control unit 1704 reads the encrypted main content ECNT, the decryption key K' and the sub content SCNT from the portable medium 13 via the third access unit 1703, and decrypts the encrypted main content ECNT into the main content CNT=Sym (K', ECNT) by applying the common key encryption algorithm Sym to the encrypted main content ENCT using the decryption key K'. Then, the control unit 1704 causes the reproduction unit 1705 to reproduce the decrypted main content and the sub content by associating them with each other and output the reproduced data to the outside via the monitor 171 and the speaker 172.

As for the common key encryption method and the DES encryption method, "Gendai Angou" (in Japanese) written by Tatsuaki Okamoto and Hirosuke Yamamoto (Series/Jouhou Kagaku no Suugaku, Sangyo Tosho, 1997) presents a detailed description thereof, so the detailed explanation is not repeated here.

Thereby, after the aggregation of the main content and the sub content, the decryption key recorded on the optical disc 11b is deleted and the encrypted main content recorded on the optical disc 11b cannot be decrypted properly, namely, cannot be reproduced, so the same effect as that in the first embodiment can be obtained. Note that although the above explanation is based on the assumption that the decryption key K' is deleted, the decryption key K' may be rewritten. The same effect can be obtained in either the case where the decryption key is deleted or rewritten. In addition, not only the decryption key is deleted or rewritten, but also the encrypted main content may be deleted or rewritten.

Note that an encryption algorithm to be used is not limited to the common key encryption algorithm, but may be a public key encryption algorithm.

(3) Furthermore, in the above-mentioned modification (2), the aggregation apparatus 16 may decrypt the encrypted main content ECNT. To be more specific, in the aggregation apparatus 16, the control unit 163 has the common key encryption algorithm Sym, and decrypts the encrypted main content ECNT into the main content CNT by applying the common key encryption algorithm Sym to the encrypted main content ECNT using the decryption key K'. The control unit 163 also writes the decrypted main content CNT and the sub content SCNT onto the portable medium 13 via the third access unit 164.

When reproducing the main content recorded on the optical disc 11b and the sub content recorded on the memory card 12, in the reproduction apparatus 17, the control unit 1704 reads the encrypted main content ECNT and the decryption key K' from the optical disc 11b via the first access unit 1701, and reads the sub content SCNT from the memory card 12 via the second access unit 1702, as mentioned above. If the decryption key K' has not been deleted, the control unit 1704 decrypts the encrypted main content ECNT into the main content CNT=Sym (K', ECNT) by applying the common key encryption algorithm Sym to the encrypted main content ECNT using the decryption key K'. Then, the control unit 1704 causes the reproduction unit 1705 to reproduce the decrypted main content, namely, the main content recorded on the optical disc 11b, and the sub content recorded on the memory card 12 by associating them with each other and output the reproduced data to the outside via the monitor 171 and the speaker 172.

On the other hand, when reproducing the main content and the sub content which are recorded on the portable medium 13, the control unit 1704 reads the main content CNT and the sub content SCNT from the portable medium 13 via the third access unit 1703. Then, the control unit 1704 causes the reproduction unit 1705 to reproduce the main content CNT and the sub content SCNT by associating them with each other and output the reproduced data to the outside via the monitor 171 and the speaker 172.

Thereby, the same effect as that in the first embodiment can be obtained, as is the case with the modification (2).

Figure 9:
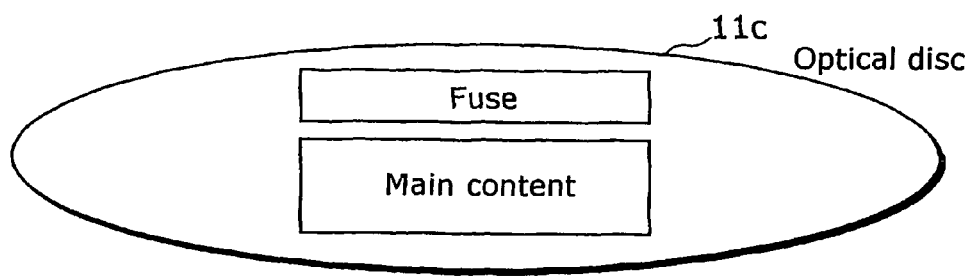
FIG. 9 is a diagram showing a structure of an optical disc 11c in the first embodiment.

(4) Furthermore, FIG. 9 shows an example where an optical disc 11c is equipped with a fuse for blocking the reproduction of the optical disc 11c if it is destroyed. In this case, the aggregation apparatus 16 may destroy the fuse in the optical disc 11c after aggregating the main content and the sub content so as to block the reproduction of the optical disc 11c. This can be realized if, for example, the first access unit 161 in the aggregation apparatus 16 destroys the fuse by irradiating an intense laser beam to the optical disc 11c.

To be more specific, the optical disc 11c may be equipped with an IC chip for making non-contact communication with the outside as an example of a scheme for blocking the reproduction of the optical disc 11c if it is destroyed. In this case, after the aggregation of the main content and the sub content, the first access unit 161 in the aggregation apparatus 16 destroys the IC chip in the optical disc 11c by irradiating an intense laser beam on it.

Thereby, after the aggregation of the main content and the sub content, the IC chip provided in the optical disc 11c is destroyed and the main content recorded on the optical disc 11c cannot be reproduced, so the same effect as that in the first embodiment can be obtained.

Note that not only the fuse is destroyed, but also the storage area of the main content may be destroyed.

(5) Furthermore, in a case where there exist a set of a plurality of main contents and reproduction judgment information on the optical disc 11, the aggregation apparatus 16 may aggregate a plurality of the main contents which exist on the optical disc 11 and one or more sub contents which exist on the memory card 12 and record them onto the portable medium 13. This can be realized as follows. For example, in the aggregation apparatus 16, the control unit 163 reads a plurality of main contents via the first access unit 161, reads one or more sub contents via the second access unit 162, records the plurality of main contents and one or more sub contents onto the portable medium 13 via the third access unit 164 depending on the value of the reproduction judgment information on the optical disc 11, and rewrites the reproduction judgment information on the optical disc 11 via the first access unit 161.

Thereby, it becomes possible to aggregate a plurality of contents of a series or the like and one or more sub contents.

In addition, if a plurality of contents which are viewed repeatedly are aggregated and recorded onto a hard disk or the like using this method, there is no need to swap storage mediums in and out of the reproduction apparatus 17, and thus convenience for users is enhanced.

(6) The default value of the reproduction judgment information to be recorded on the optical disc 11 may be another value than 1. In short, the default value of the reproduction judgment information must be a value indicating that reproduction is permitted.

For example, in a case where the default value of the reproduction judgment information is "Yes", after the control unit 163 in the aggregation apparatus 16 aggregates the main content on the optical disc 11 and the sub content on the memory card 12 and records them onto the portable medium 13, the value of the reproduction judgment information may be rewritten to "No".

Note that the format of the information recorded on the optical disc 11 may be same as the format of the information recorded on the portable medium 13 or the recording medium that replaces the portable medium 13. For example, the information is recorded on any recording mediums in MPEG-2 data format.

Second Embodiment

Next, an aggregation system 2 in the second embodiment of the present invention will be explained below with reference to FIG. 10 to FIG. 14.

When an aggregation apparatus aggregates contents recorded on a plurality of recording mediums and records them onto another recording medium, this aggregation system 2 does not reproduce, after the aggregation, the contents which have been recorded on the source recording mediums and the contents aggregated and recorded onto another recording medium at the same time.

Overview of Aggregation System 2

Figure 10:
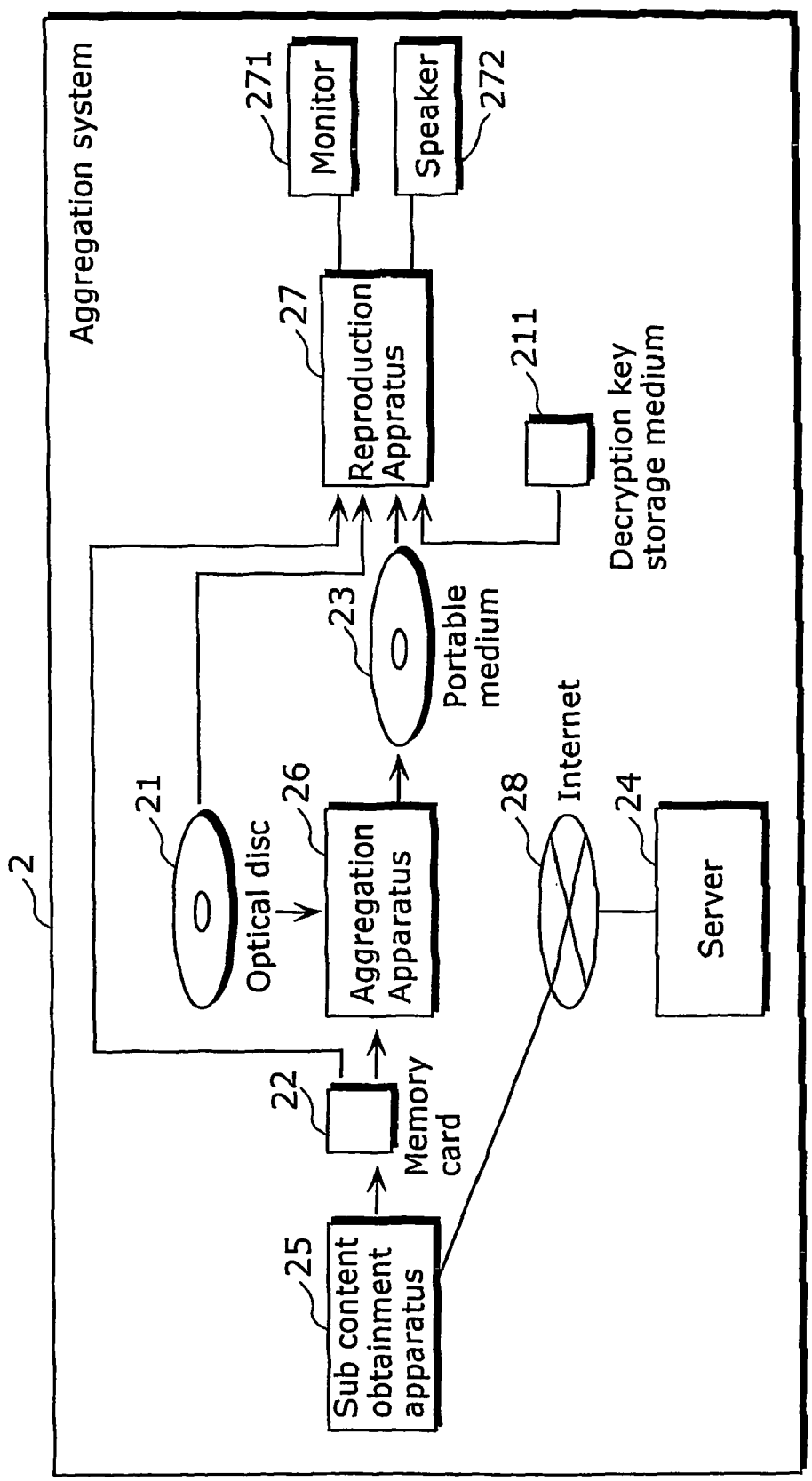
FIG. 10 is a diagram showing a configuration of an aggregation system 2 in a second embodiment.

First, the overview of the aggregation system 2 in the second embodiment will be provided with reference to FIG. 10. FIG. 10 is a block diagram showing the configuration of the aggregation system 2 in the second embodiment.

In FIG. 10, a content such as a movie is recorded, in encrypted form, as a main content, on an optical disc 21, and a decryption key for decrypting the encrypted main content is recorded on a decryption key storage medium 211. A sub content such as audio data to be used in association with the main content recorded on the optical disc 21 can be recorded on a memory card 22, and a portable medium 23 is a portable medium such as a DVD-RAM on which information can be recorded. Note that the portable medium 23 may be a removable HDD, or may be replaced with a recording medium such as a nonremovable HDD.

A content provider distributes the encrypted main content to a user via a distribution means such as a sale of the encrypted main content recorded on the optical disc 21, together with the decryption key storage medium 211, and distributes the sub content to be used in association with the main content from a server 24 via the Internet 28.

On the other hand, the user obtains the sub content from the server 24 via the Internet 28 using a sub content obtainment apparatus 25, and records it on the memory card 22. Then, on a reproduction apparatus 27, the user decrypts the encrypted main content recorded on the optical disc 21 using the decryption key recorded on the decryption key storage medium 211, reproduces the decrypted main content by associating it with the sub content recorded on the memory card 22, and views it.

In order to enhance convenience of portability, the user can also aggregate both the encrypted main content recorded on the optical disc 21 and the sub content recorded on the memory card 22 and record them onto the portable medium 23, using an aggregation apparatus 26. On the reproduction apparatus 27, the user can also reproduce and view the encrypted main content and the sub content which are recorded on the portable medium 23, using the decryption key recorded on the decryption key storage medium 211. It is assumed that the decryption key recorded on the decryption key storage medium 211 cannot be copied onto another recording medium and the decryption key recorded on the decryption key storage medium 211 is necessary for reproducing the content recorded on the optical disc 21 and the content recorded on the portable medium 23. Thereby, the aggregation system 2 does not reproduce the content recorded on the optical disc 21 and the content recorded on the portable medium 23 at the same time on a plurality of reproduction apparatuses.

In other words, this aggregation system 2 is a system for protecting copyrights of contents by not reproducing contents recorded on a plurality of recording mediums and the contents aggregated and recorded onto another recording medium at the same time, after a user aggregates the contents recorded on the plurality of recording mediums and record them onto another recording medium.

The overview of the aggregation system 2 in the second embodiment has been provided, and the detailed explanation of the aggregation system 2 will follow.

Configuration of Aggregation System 2

As shown in FIG. 10, the aggregation system 2 includes the optical disc 21, the decryption key storage medium 211, the memory card 22, the portable medium 23, the server 24, the sub content obtainment apparatus 25, the aggregation apparatus 26 and the reproduction apparatus 27, and the server 24 and the sub content obtainment apparatus 25 are connected to each other via the Internet 28.

Structure of Optical Disc 21

The optical disc 21 is a portable medium, such as a DVD-RAM, on which information can be recorded, and an encrypted main content is recorded here.

To be more specific, an encrypted main content ECNT=Sym (K, CNT) is recorded on the optical disc 21. This encrypted main content is generated by applying a common key encryption algorithm Sym like a DES encryption method, as an example of encryption method, to a main content CNT using an encryption key K. The following explanation will be made using this example.

As for the common key encryption method and the DES encryption method, "Gendai Angou" (in Japanese) written by Tatsuaki Okamoto and Hirosuke Yamamoto (Series/Jouhou Kagaku no Suugaku, Sangyo Tosho, 1997) presents a detailed description thereof, so the detailed explanation is not repeated here.

Structure of Decryption Key Storage Medium 211

The decryption key storage medium 211 is a storage medium, such as an SD card, on which information can be recorded. On this decryption key storage medium 211, a decryption key for decrypting an encrypted main content recorded on the optical disc 21 is recorded. It is assumed here that the decryption key recorded on the decryption key storage medium 211 cannot be copied.

To be more specific, it is assumed that a decryption key K' which corresponds to the encryption key K is recorded on the decryption key storage medium 211. Note that the encryption key K and the decryption key K' have the same value in the common key encryption algorithm.

Structure of Memory Card 22

The memory card 22 is a recording medium, such as an SD card, on which information can be recorded. On the memory card 22, a sub content to be used in association with the main content is recorded by the sub content obtainment apparatus 25.

Structure of Portable Medium 23

The portable medium 23 is a portable medium, such as a DVD-RAM, on which information can be recorded. The encrypted main content recorded on the optical disc 21 and the sub content recorded on the memory card 22 are aggregated and recorded onto the portable medium 23 by the aggregation apparatus 26. Note that, as mentioned above, the portable medium 23 may be a removable HDD, or may be replaced with a recording medium such as a nonremovable HDD. In short, the portable medium 23 or the recording medium that replaces the portable medium 23 must be a recording medium on which aggregated main content and sub content are recorded.

Structure of Server 24

The server 24 holds the sub content to be used in association with the main content obtained by decrypting the encrypted main content recorded on the optical disc 21, and provides the sub content obtainment apparatus 25 with the sub content.

Structure of Sub Content Obtainment Apparatus 25

The sub content obtainment apparatus 25 obtains the sub content from the server 24 via the Internet 28, and records it on the memory card 22.

Structure of Aggregation Apparatus 26

Figure 11:
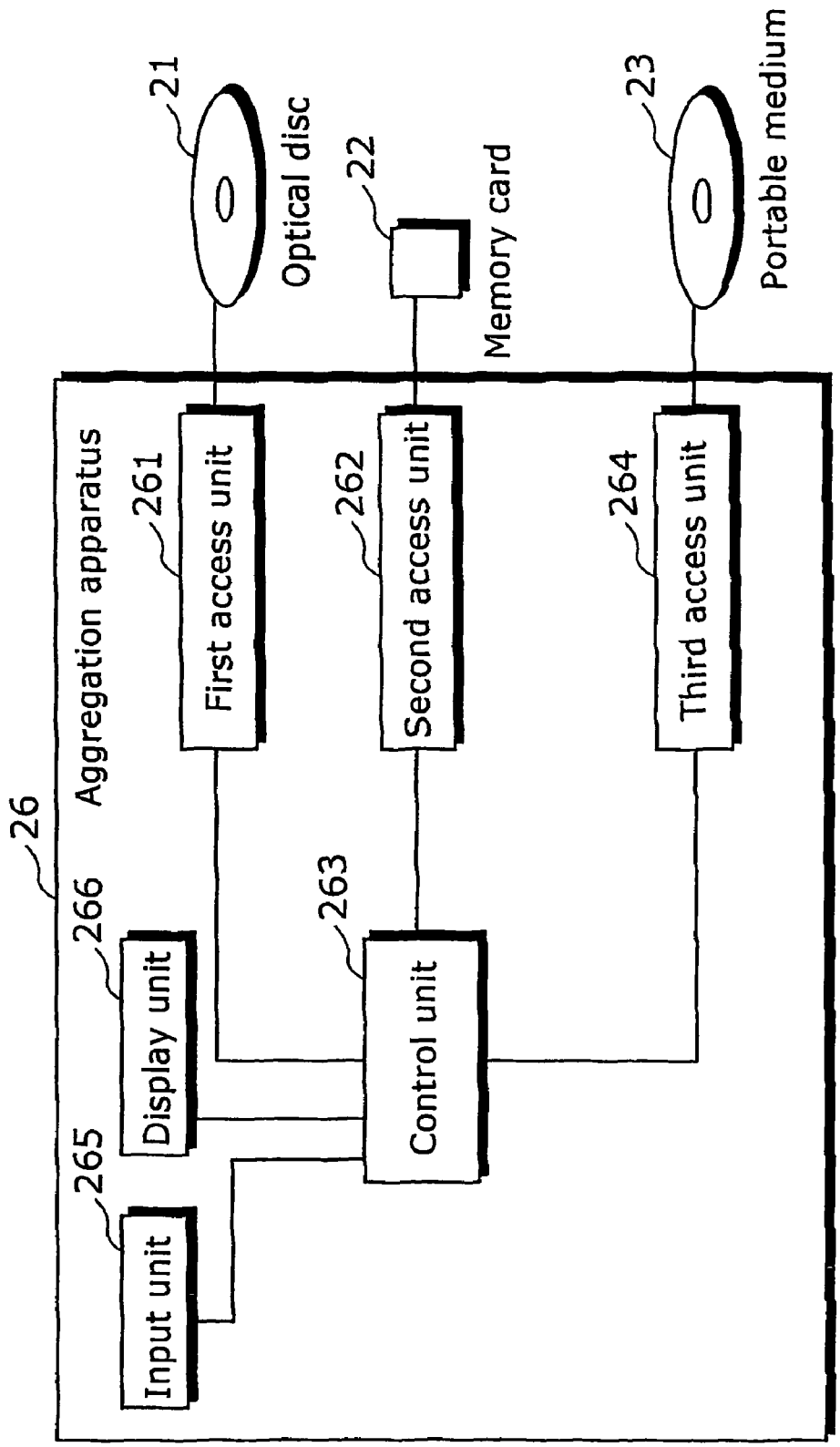
FIG. 11 is a diagram showing a structure of an aggregation apparatus 26 in the second embodiment.

FIG. 11 shows the structure of the aggregation apparatus 26. As shown in FIG. 11, the aggregation apparatus 26 includes a first access unit 261, a second access unit 262, a control unit 263, a third access unit 264, an input unit 265 and a display unit 266.

(1) First Access Unit 261

The first access unit 261 reads the encrypted main content from the optical disc 21 according to the instruction of the control unit 263.

(2) Second Access Unit 262

The second access unit 262 reads the sub content from the memory card 22 according to the instruction of the control unit 263.

(3) Control Unit 263

The control unit 263 reads the encrypted main content from the optical disc 21 via the first access unit 261, and reads the sub content from the memory card 22 via the second access unit 262.

Then, the control unit 263 writes the encrypted main content and the sub content onto the portable medium 23 via the third access unit 264.

(4) Third Access Unit 264

The third access unit 264 writes the encrypted main content and the sub content onto the portable medium 23 according to the instruction of the control unit 263.

(5) Input Unit 265

The input unit 265 accepts an input of an aggregation instruction from a user.

Then, upon receipt of the input of the aggregation instruction from the user, the input unit 265 causes the control unit 263 to operate.

(6) Display Unit 266

After the control unit 263 completes writing the encrypted main content and the sub content onto the portable medium 23, the display unit 266 notifies the user of the end of the writing by displaying it.

Structure of Reproduction Apparatus 27

Figure 12:
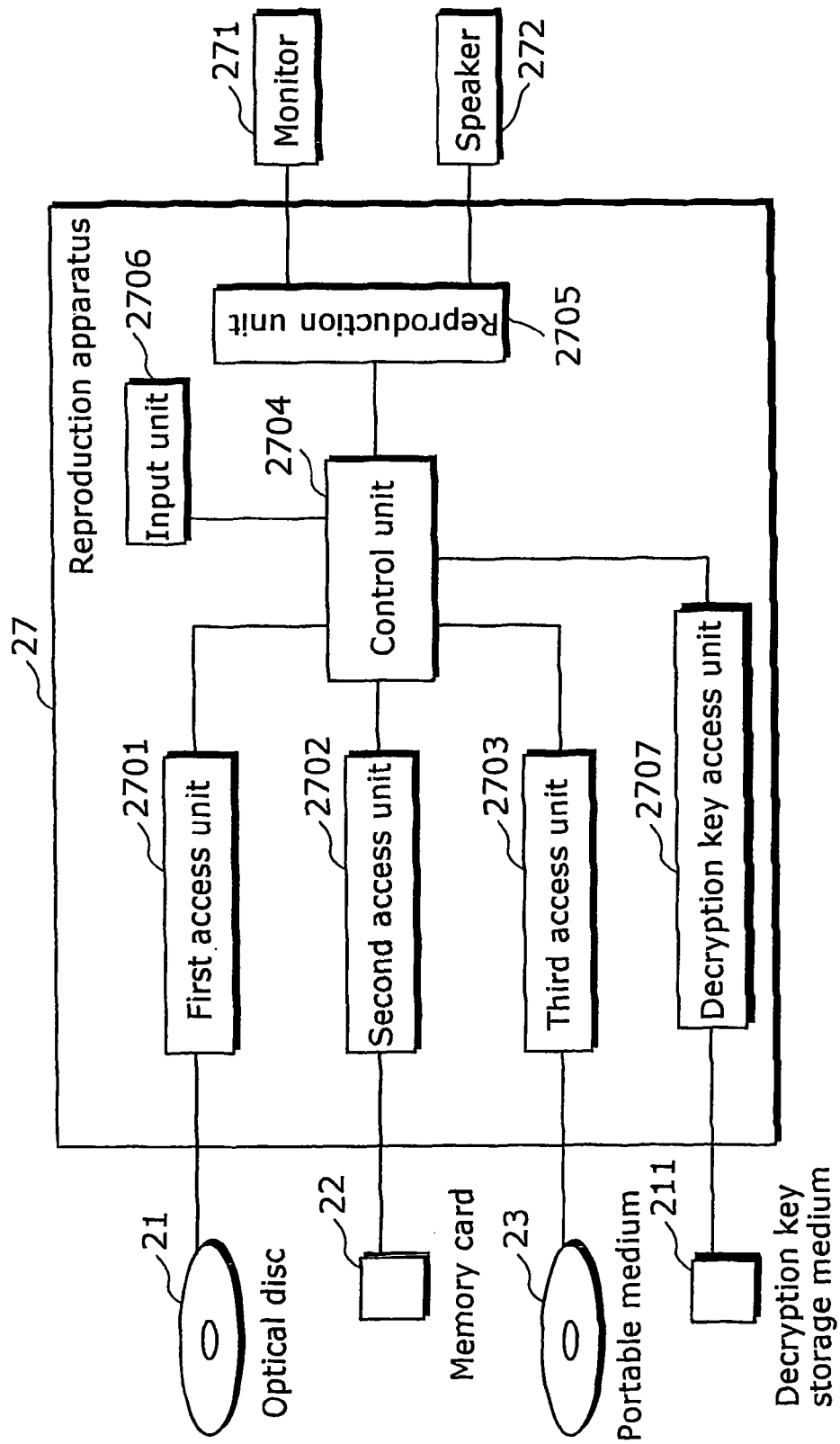
FIG. 12 is a diagram showing a structure of a reproduction apparatus 27 in the second embodiment.

FIG. 12 shows the structure of the reproduction apparatus 27. As shown in FIG. 12, the reproduction apparatus 27 includes a first access unit 2701, a second access unit 2702, a third access unit 2703, a control unit 2704, a reproduction unit 2705, an input unit 2706 and a decryption key access unit 2707.

(1) First Access Unit 2701

The first access unit 2701 reads the encrypted main content from the optical disc 21 according to the instruction of the control unit 2704.

(2) Second Access Unit 2702

The second access unit 2702 reads the sub content from the memory card 22 according to the instruction of the control unit 2704.

(3) Third Access Unit 2703

The third access unit 2703 reads the encrypted main content and the sub content from the portable medium 23 according to the instruction of the control unit 2704.

(4) Control Unit 2704

The control unit 2704 performs either the following processing (i) or (ii) according to the instruction of the input unit 2706.

(i) To cause the reproduction unit 2705 to reproduce the main content obtained by decrypting the encrypted main content recorded on the optical disc 21 and the sub content recorded on the memory card 22 by associating them with each other.

The control unit 2704 reads the encrypted main content from the optical disc 21 via the first access unit 2701, reads the sub content from the memory card 22 via the second access unit 2702, and further reads the decryption key from the decryption key storage medium 211 via the decryption key access unit 2707. Then, the control unit 2704 decrypts the encrypted main content using the decryption key, and causes the reproduction unit 2705 to reproduce the main content obtained by the decryption and the sub content by associating them with each other and output the reproduced data to the outside.

As a specific decryption method, the control unit 2704, which has the common key encryption algorithm Sym used for encrypting the main content CNT, decrypts the encrypted main content ECNT into the main content CNT=Sym (K', ECNT) using the decryption key K' read from the decryption key storage medium 211.

It is assumed in the second embodiment that the main content is digital data composed of audio data and video data and the sub content is digital data composed of audio data, for example. In this case, the control unit 2704 causes the reproduction unit 2705 to replace the audio data in the main content with the audio data in the sub content, so that the main content recorded on the optical disc 21 and the sub content recorded on the memory card 22 are reproduced in association with each other.

(ii) To cause the reproduction unit 2705 to reproduce the main content obtained by decrypting the encrypted main content recorded on the portable medium 23 and the sub content recorded on the portable medium 23 by associating them with each other.

The control unit 2704 reads the encrypted main content and the sub content from the portable medium 23 via the third access unit 2703, and reads the decryption key from the decryption key storage medium 211 via the decryption key access unit 2707. Then, the control unit 2704 decrypts the encrypted main content using the decryption key, and causes the reproduction unit 2705 to reproduce the main content obtained by the decryption and the sub content by associating them with each other and output the reproduced data to the outside.

Note that the specific decryption method and the method for reproducing the main content and the sub content by associating them with each other are same as that in the above (i).

(5) Reproduction Unit 2705

The reproduction unit 2705 reproduces the main content and the sub content by associating them with each other under the control of the control unit 2704, and outputs the reproduced data to a monitor 271 and a speaker 272 which are connected to the reproduction unit 2705. The monitor 271 and the speaker 272 output the data reproduced by the reproduction unit 2705 to the outside.

(6) Input Unit 2706

The input unit 2706 accepts an instruction to reproduce the optical disc 21 or an instruction to reproduce the portable medium 23 from the user.

Upon receipt of the instruction to reproduce the optical disc 21, the input unit 2706 causes the control unit 2704 to operate so that the main content obtained by decrypting the encrypted main content recorded on the optical disc 21 and the sub content recorded on the memory card 22 are reproduced in association with each other.

On the other hand, upon receipt of the instruction to reproduce the portable medium 23, the input unit 2706 causes the control unit 2704 to operate so that the main content obtained by decrypting the encrypted main content recorded on the portable medium 23 and the sub content recorded on the portable medium 23 are reproduced in association with each other.

(7) Decryption Key Access Unit 2707

The decryption key access unit 2707 reads a decryption key from the decryption key storage medium 211 according to the instruction of the control unit 2704.

Operation of Aggregation System 2

The configuration of the aggregation system 2 has been explained, and the detailed explanation of the operations of the aggregation apparatus 26 and the reproduction apparatus 27, as the operation of the aggregation system 2, will follow.

Operation of Aggregation Apparatus 26

Figure 13:
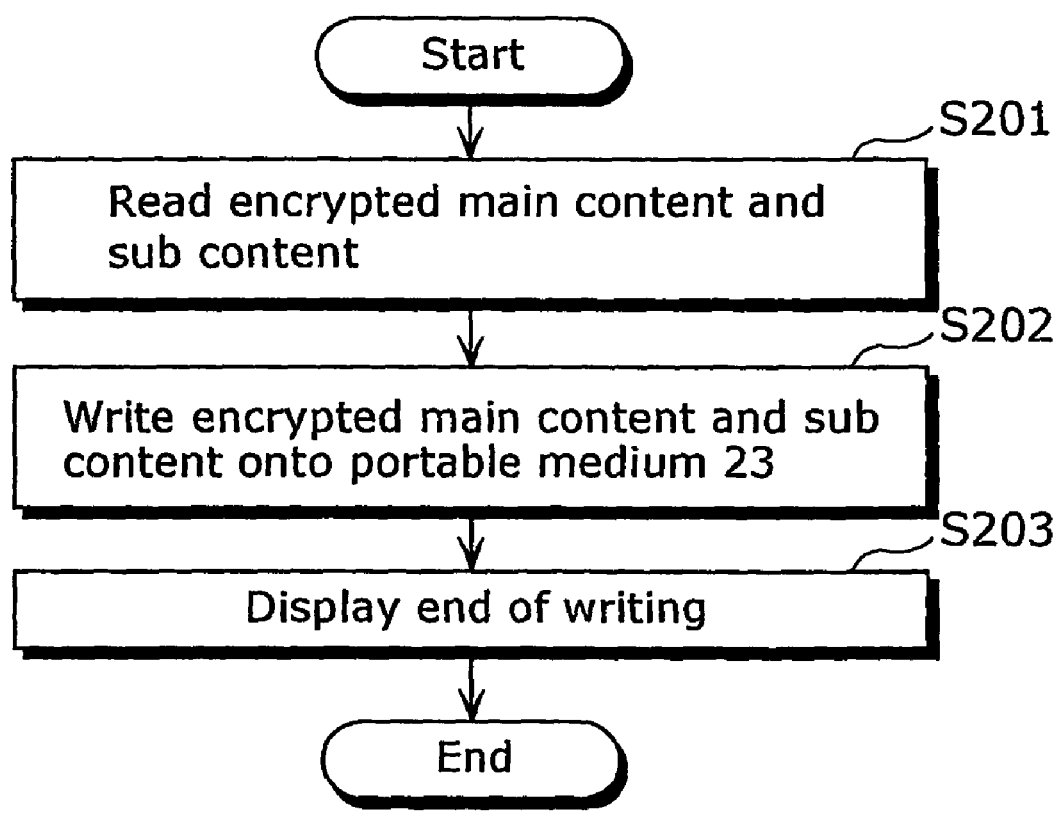
FIG. 13 is a flowchart showing processing of the aggregation apparatus 26 in the second embodiment.

The operation of the aggregation apparatus 26 will be explained with reference to the flowchart as shown in FIG. 13.

When the input unit 265 receives the input of the aggregation instruction from the user, the aggregation apparatus 26 performs the following processing.

First, the control unit 263 reads the encrypted main content from the optical disc 21 via the first access unit 261, and reads the sub content from the memory card 22 via the second access unit 262 (Step S201).

Next, the control unit 263 writes the encrypted main content and the sub content onto the portable medium 23 via the third access unit 264 (Step S202).

Next, the display unit 266 displays that writing of the encrypted main content and the sub content onto the portable medium 23 has been completed (Step S203). Then, the operation of the aggregation apparatus 26 ends.

Operation of Reproduction Apparatus 27

Figure 14:
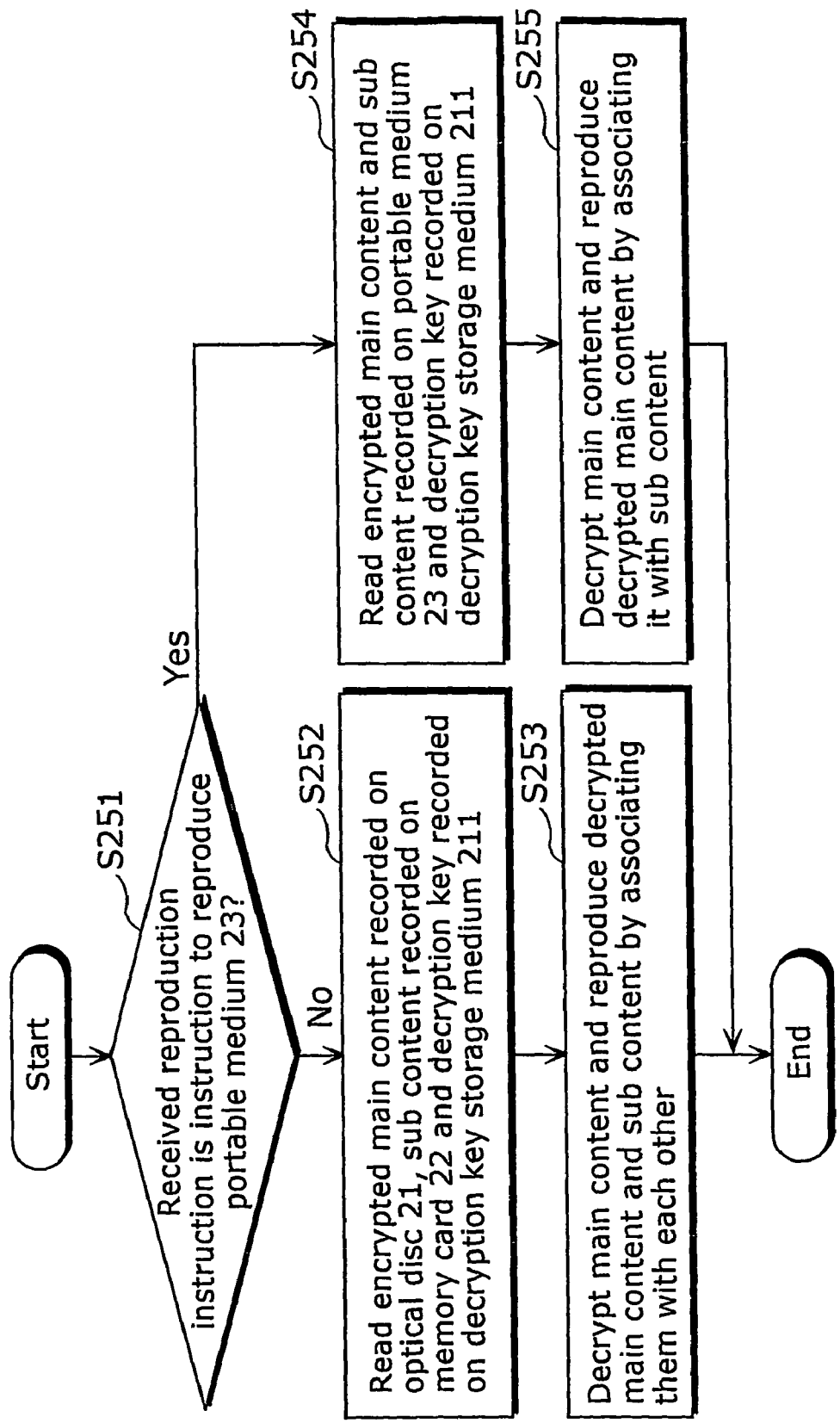
FIG. 14 is a flowchart showing processing of the reproduction apparatus 27 in the second embodiment.

The operation of the reproduction apparatus 27 will be explained with reference to the flowchart as shown in FIG. 14.

When the input unit 2706 receives the instruction to reproduce the optical disc 21 or the instruction to reproduce the portable medium 23 from the user, the reproduction apparatus 27 performs the following operation.

First, the input unit 2706 checks whether the received reproduction instruction is the instruction to reproduce the optical disc 21 or the instruction to reproduce the portable medium 23 (Step S251). The processing goes to Step S252 in the case of the instruction to reproduce the optical disc 21, whereas the processing goes to Step S254 in the case of the instruction to reproduce the portable medium 23.

To be more specific, in a case where the reproduction instruction received by the input unit 2706 is the instruction to reproduce the optical disc 21 (No in Step S251), the control unit 2704 reads the encrypted main content from the optical disc 21 via the first access unit 2701, reads the sub content from the memory card 22 via the second access unit 2702, and further reads the decryption key from the decryption key storage medium 211 via the decryption key access unit 2707 (Step S252).

Next, the control unit 2704 decrypts the encrypted main content using the decryption key, and causes the reproduction unit 2705 to reproduce the main content obtained by the decryption and the sub content by associating them with each other (Step S253). The reproduced data is outputted to the outside via the monitor 271 and the speaker 272. As such, the operation of the reproduction apparatus 27 ends.

On the other hand, in a case where the reproduction instruction received by the input unit 2706 is the instruction to reproduce the portable medium 23 (Yes in Step S251), the control unit 2704 reads the encrypted main content and the sub content from the portable medium 23 via the third access unit 2703, and reads the decryption key from the decryption key storage medium 211 via the decryption key access unit 2707 (Step S254). Then, the control unit 2704 decrypts the encrypted main content using the decryption key, and causes the reproduction unit 2705 to reproduce the main content obtained by the decryption and the sub content by associating them with each other (Step S255). The reproduced data is outputted to the outside via the monitor 271 and the speaker 272. As such, the operation of the reproduction apparatus 27 ends.

Verification of Operation of Aggregation System 2

The overall operation of the aggregation system 2 in the second embodiment will be summarized below.

First, the aggregation apparatus 26 reads the encrypted main content from the optical disc 21, reads the sub content from the memory card 22, and records the encrypted main content and the sub content onto the portable medium 23.

When reproducing the encrypted main content recorded on the optical disc 21 and the sub content recorded on the memory card 22, the reproduction apparatus 27 reads the encrypted main content from the optical disc 21, reads the sub content from the memory card 22, reads the decryption key from the decryption key storage medium 211, and then decrypts the encrypted main content using the decryption key. Then, the reproduction apparatus 27 causes the reproduction unit 2705 to reproduce the main content obtained by the decryption and the sub content by associating them with each other and output the reproduced data to the outside.

On the other hand, when reproducing the encrypted main content and the sub content which are recorded on the portable medium 23, the reproduction apparatus 27 reads the encrypted main content and the sub content from the portable medium 23, further reads the decryption key from the decryption key storage medium 211, and decrypts the encrypted main content using the decryption key. Then, the reproduction apparatus 27 causes the reproduction unit 2705 to reproduce both the main content obtained by the decryption and the sub content by associating them with each other and output the reproduced data to the outside.

As a result, the user can reproduce the encrypted main content recorded on the optical disc 21 and the sub content recorded on the memory card 22 by associating them with each other. In addition, for the sake of enhancing convenience of portability, the user can aggregate the main content recorded on the optical disc 21 and the sub content recorded on the memory card 22 and record them onto the portable medium 23, and reproduce the main content and the sub content which are recorded on the portable medium 23 by associating them with each other.

Effect Obtained in Second Embodiment

In the second embodiment, the main content is recorded, in encrypted form, on the optical disc 21 or the portable medium 23, and the reproduction apparatus 27 reads an uncopyable decryption key from the decryption key storage medium 211 so as to reproduce the main content.

Thereby, in a case where the main content and the sub content are aggregated and recorded onto the portable medium 23, the decryption key storage medium 211 is required for the reproduction of the main content, so neither the main content recorded on the optical disc 21 nor the main content recorded on the portable medium 23 can be reproduced at the same time on a plurality of reproduction apparatuses. As a result, differently from the conventional techniques, even if the aggregation apparatus 26 aggregates the main content recorded on the optical disc 21 and the sub content recorded on the memory card 22 and records them onto the portable medium 23, the main content recorded on the optical disc 21 and the main content recorded on the portable medium 23 are not reproduced at the same time. Therefore, the copyrights of the contents are protected.

Modifications

Figure 15:
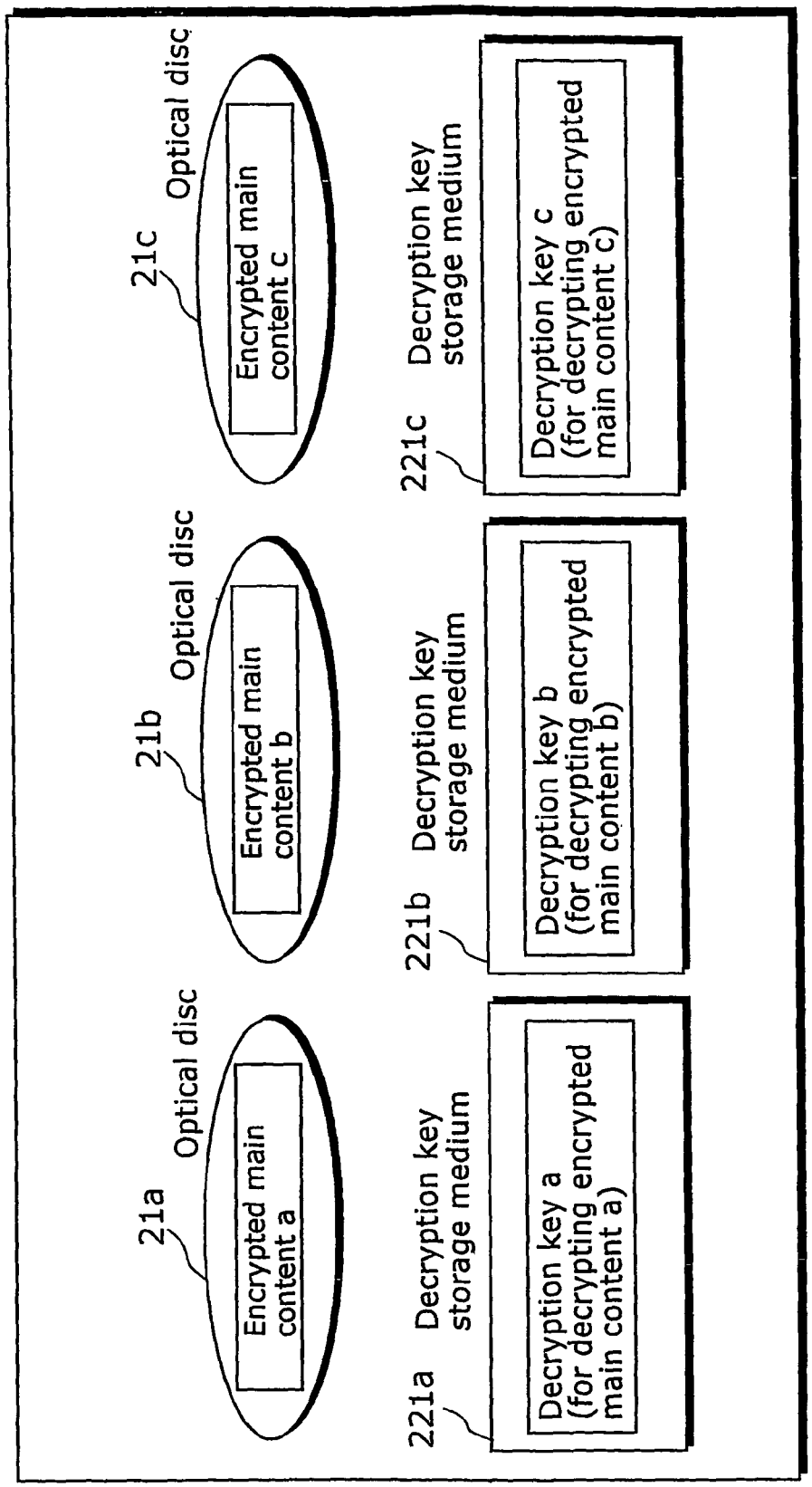
FIG. 15 is a diagram showing structures of optical discs 21a, 21b and 21c and decryption key storage mediums 221a, 221b and 221c.
Figure 16:
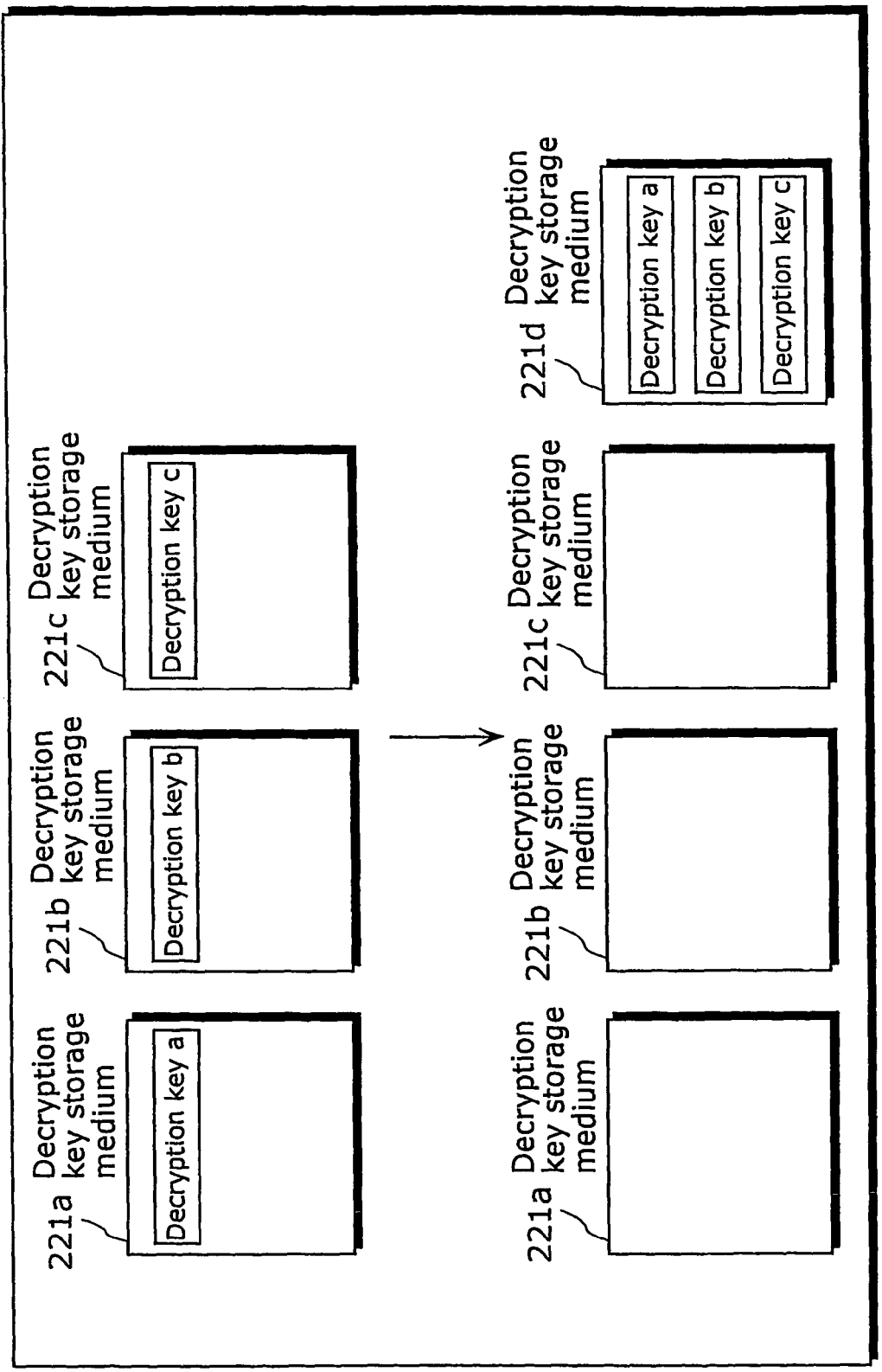
FIG. 16 is an illustration of processing for recording collectively, on a decryption key storage medium 221d, decryption keys a, b and c which are respectively recorded on the decryption key storage mediums 221a, 221b and 221c.

Although the second embodiment has been fully described by way of one example of the embodiments of the present invention, it is to be noted that various changes and modifications will be apparent to those skilled in the art. Therefore, unless otherwise such changes and modifications depart from the scope of the present invention, they should be construed as being included therein. The embodiment of the present invention also includes the following modifications:

(1) In a case where a plurality of main contents a, b and c are recorded, in encrypted form, on a plurality of optical discs 21$a$, 21$b$ and 21$c$, decryption keys a, b and c for the main contents a, b and c are respectively recorded on a plurality of decryption key storage mediums 211$a$, 211$b$ and 211$c$, as shown in FIG. 15. In order to enhance convenience of portability, it is also possible to record the decryption keys a, b and c on a decryption key storage medium 211$d$ collectively and then delete the decryption keys a, b and c recorded on the source decryption key storage mediums 211$a$, 211$b$ and 211$c$.

Thereby, the same effect as that in the second embodiment can be obtained. In addition, when a user carries a plurality of optical discs, the number of decryption key storage mediums 211 to be carried for reproducing such discs can be reduced, so the user convenience is enhanced.

Figure 17:
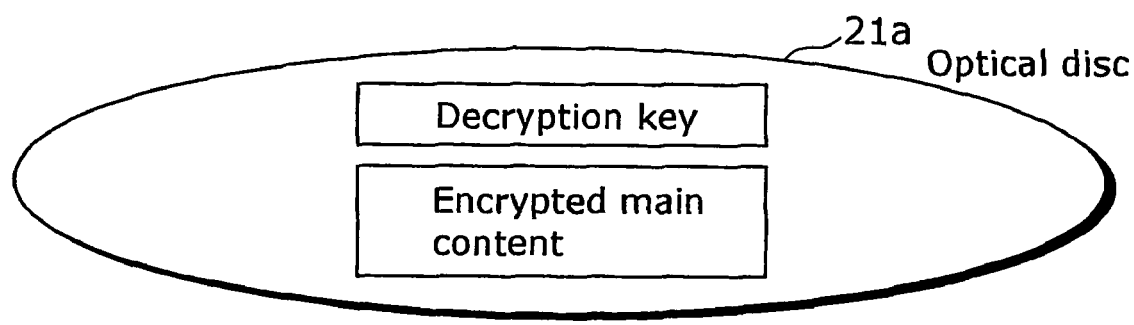
FIG. 17 is a diagram showing a structure of the optical disc 21a in the second embodiment.

(2) FIG. 17 shows an example where the decryption key, which is recorded on the decryption key storage unit 211 in the present embodiment, is recorded on the optical disc 21$a$, together with the encrypted main content. The aggregation apparatus 26 aggregates the encrypted main content recorded on the optical disc 21$a$ and the sub content recorded on the memory card 22 and records them onto the portable medium 23. To be more specific, the optical disc 21 is required for reproduction of the encrypted main content recorded on the portable medium 23, because the decryption key needs to be read from the optical disc 21.

Thereby, the main content recorded on the optical disc 21 and the main content recorded on the portable medium 23 are not reproduced at the same time on a plurality of reproduction apparatuses, so the same effect as that in the second embodiment can be obtained.

(3) The decryption key is not recorded on the decryption key storage medium 211, but may be obtained from the server 24 via the Internet 28 when the reproduction apparatus 27 reproduces the optical disc 21 or the portable medium 23.

Thereby, there is no need to distribute the decryption key storage medium 211, nor for the user to manage the decryption key storage medium 211, so the convenience is enhanced.

Figure 18:
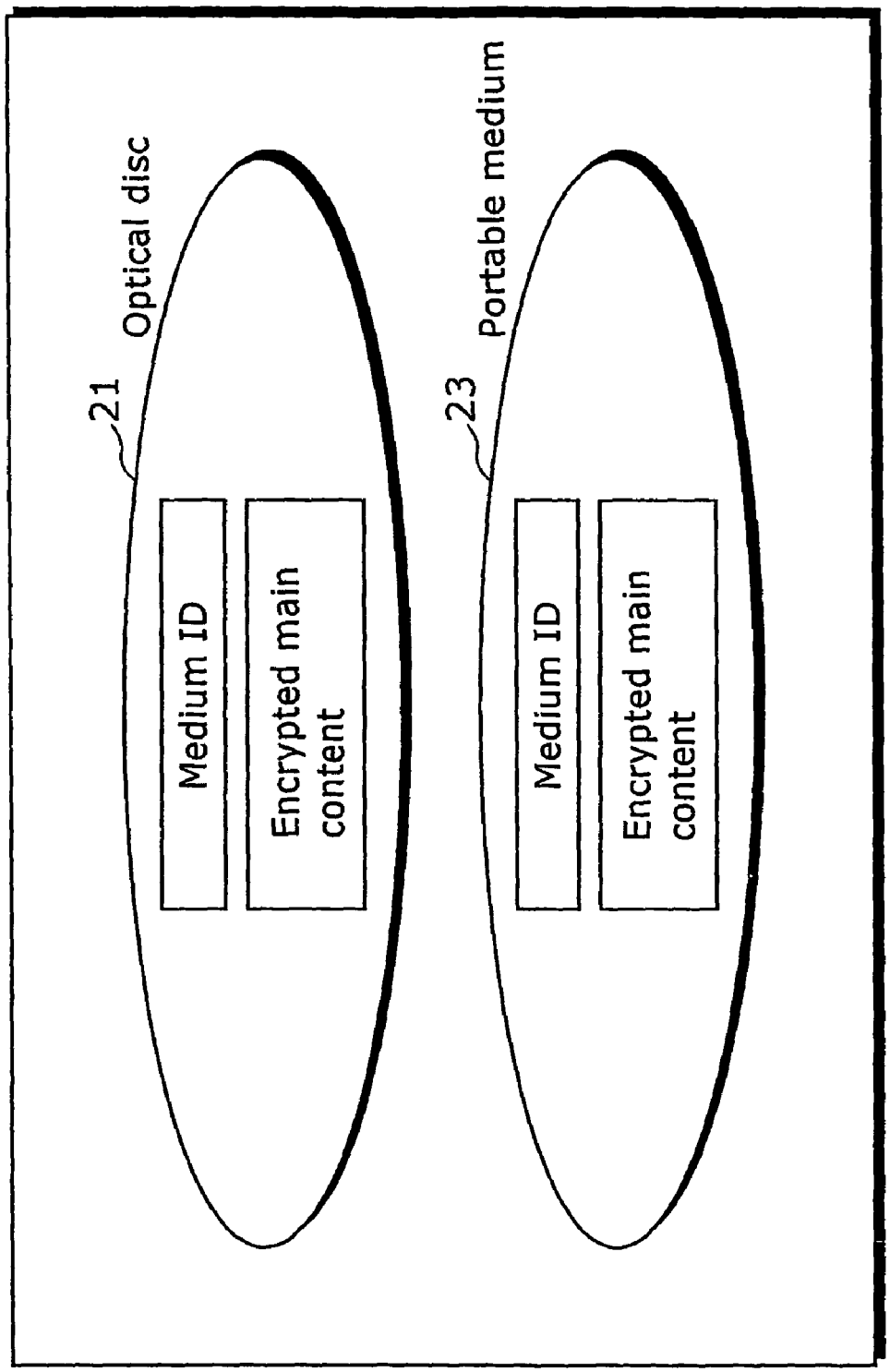
FIG. 18 is a diagram showing structures of the optical disc 21 and a portable medium 23 in the second embodiment.

(4) With respect to the above (3), it is also possible, for example, that unique medium IDs are respectively recorded on the optical disc 21 and the portable medium 23, as shown in FIG. 18, and the server 24 manages, for each medium ID, a set of the medium ID of the optical disc 21 and the decryption key for the encrypted main content recorded on that optical discs 21, as a decryption key list as shown in FIG. 19.

In this case, when aggregating the contents, the aggregation apparatus 26 sends the medium ID of the optical disc 21 and the medium ID of the portable medium 23 to the server 24 via the Internet 28, and the server 24 adds the medium ID of the portable medium 23 to the entry including the medium ID of the optical disc 21. For example, in a case where the main content recorded on the optical disc 21 with its medium ID being 1 is aggregated and recorded onto the portable medium 23 with its medium ID being 5, the decryption key list as shown in FIG. 20 is obtained.

When reproducing the optical disc 21 or the portable medium 23, the reproduction apparatus 27 sends the medium ID of the optical disc 21 or the portable medium 23 to the server 24 to request the server 24 to send the corresponding decryption key. The server 24 checks, using the received medium ID, whether or not the decryption key is used at the same time for reproduction of the optical disc 21 and the portable medium 23. To be more specific, this can be realized by checking whether or not both the medium ID of the optical disc 21 and the medium ID of the portable medium 23 are used in a predetermined period of time, for example, 2 hours. If both the medium IDs are not used at the same time, the server 24 sends the corresponding decryption key to the reproduction apparatus 27.

Thereby, after aggregating the main content and the sub content, the encrypted main content recorded on the optical disc 21 cannot be decrypted at the same time when the encrypted main content recorded on the portable medium 23 is decrypted. Therefore, the same effect as that in the second embodiment can be obtained.

Note that the medium ID may be any other ID as long as it can identify what the content recorded on the optical disc 21 is. For example, it may be a content name, a content ID or the like.

(5) Furthermore, as for the decryption key which is recorded on the decryption key storage medium 211 in the present embodiment, the reproduction apparatus 27 may obtain it from the server 24 via the Internet 28 and records it on the decryption key storage medium 211, when the optical disc 21 is reproduced for the first time.

Thereby, there is no need to distribute the decryption key storage medium 211 on which the decryption key is recorded, and the same effect as that in the second embodiment can be obtained even if the reproduction apparatus 27 is not in the environment where it can access the server 24 all the time via the Internet 28.

(6) Furthermore, it is also possible that there exist a plurality of encrypted contents on the optical disc 21 and there exist a plurality of the corresponding decryption keys on the decryption key storage medium 211. The aggregation apparatus 26 aggregates the plurality encrypted main contents and one or more sub contents which exist on the memory card 22 and records them onto the portable medium 23. This can be realized, for example, if the control unit 263 in the aggregation apparatus 26 reads a plurality of main contents via the first access unit 261, reads one or more sub contents via the second access unit 262, and records the plurality of main contents and one or more sub contents onto the portable medium 23 via the third access unit 264.

Thereby, it becomes possible to aggregate a plurality of contents of a series or the like and one or more sub contents.

In addition, if a plurality of contents which are to be viewed repeatedly are aggregated and recorded on a hard disk or the like using this method, there is no need to swap storage mediums in and out of the reproduction apparatus 27, and thus convenience for users is enhanced more.

Third Embodiment

Next, an aggregation system 3 in the third embodiment of the present invention will be explained below with reference to FIG. 21 to FIG. 27.

When an aggregation apparatus aggregates contents recorded on a plurality of recording mediums and records them onto another recording medium, this aggregation system 3 aggregates the contents and records them onto another recording medium based on aggregation judgment information, managed by the content provider, indicating whether aggregation of the contents is permitted or not.

Overview of Aggregation System 3

Figure 21:
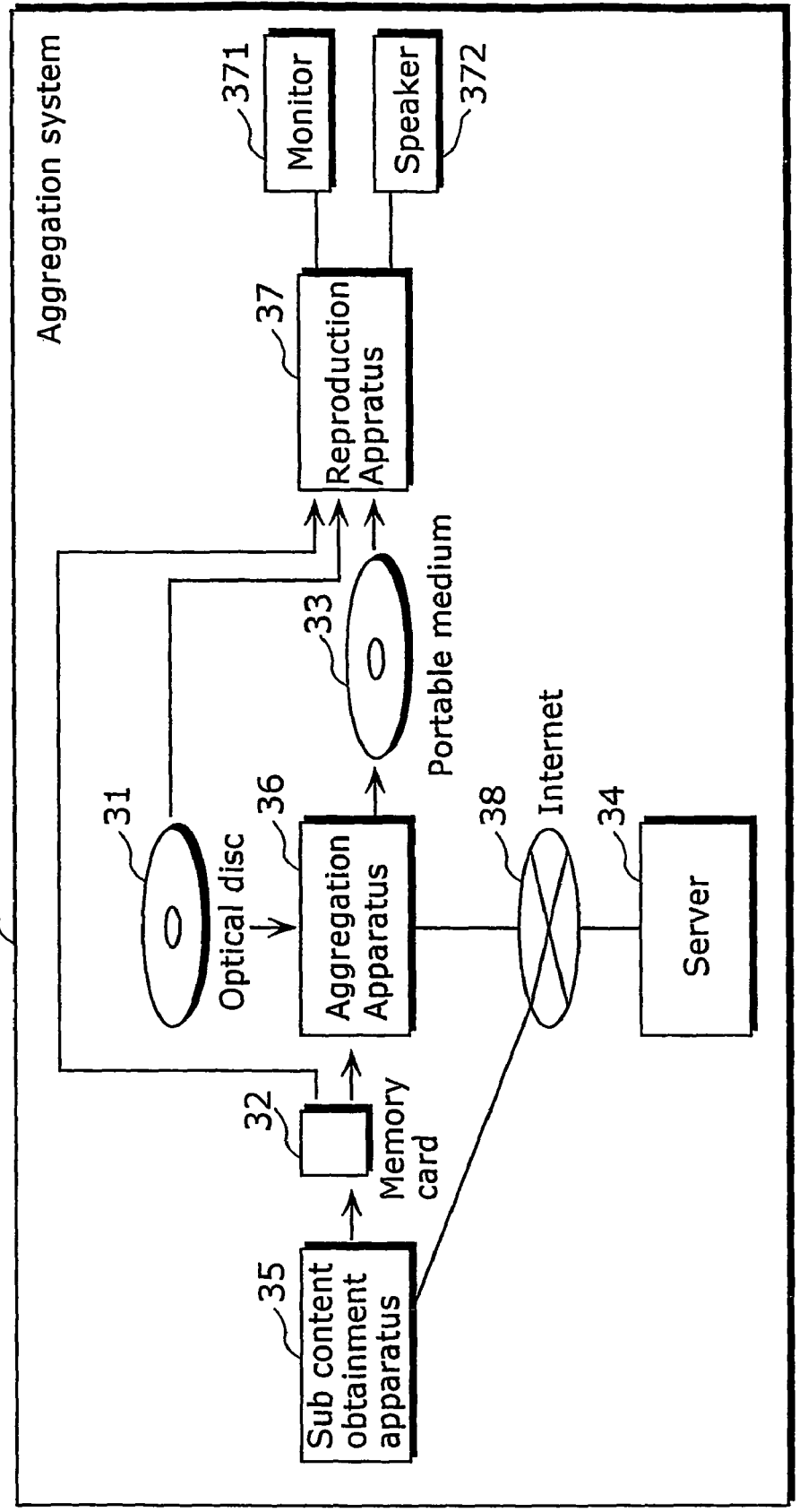
FIG. 21 is a diagram showing a configuration of an aggregation system 3 in a third embodiment.

First, the overview of the aggregation system 3 in the third embodiment will be provided with reference to FIG. 21. FIG. 21 is a block diagram showing the configuration of the aggregation system 3 in the third embodiment.

In FIG. 21, a content such as a movie is recorded, as a main content, on an optical disc 31, a sub content such as audio data to be used in association with the main content recorded on the optical disc 31 can be recorded on a memory card 32, and a portable medium 33 is a portable medium such as a DVD-RAM on which information can be recorded. The portable medium 33 may be a removable HDD, or may be replaced with a recording medium such as a nonremovable HDD.

A content provider distributes the main content to a user via a distribution means such as a sale of the main content recorded on the optical disc 31, and distributes the sub content to be used in association with the main content to the user from a server 34 via the Internet 38.

On the other hand, the user obtains the sub content from the server 34 via the Internet 38 using a sub content obtainment apparatus 35, and records it on the memory card 32. Then, using a reproduction apparatus 37, the user reproduces the main content recorded on the optical disc 31 by associating it with the sub content recorded on the memory card 32, and views it.

In order to enhance convenience of portability, the user can access the server 34 via the Internet 38 and receive aggregation judgment information indicating whether or not aggregation of the main content is permitted, using an aggregation apparatus 36. The user can also record, on the portable medium 33, the main content recorded on the optical disc 31 and the sub content recorded on the memory card 32, based on the aggregation judgment information. The user can also reproduce and view the main content and the sub content which are recorded on the portable medium 33 by associating them with each other, using the reproduction apparatus 37.

This aggregation system 3 is a system for protecting copyrights of contents by putting limitations on a user's aggregation and recording of contents recorded on a plurality of recording mediums onto another recording medium, based on aggregation judgment information, managed by a content provider, indicating whether or not aggregation of the contents is permitted.

The overview of the aggregation system 3 in the third embodiment has been provided, and the detailed explanation of the aggregation system 3 will follow.

Configuration of Aggregation System 3

As shown in FIG. 21, the aggregation system 3 includes the optical disc 31, the memory card 32, the portable medium 33, the server 34, the sub content obtainment apparatus 35, the aggregation apparatus 36 and the reproduction apparatus 37, and the server 34 and the sub content obtainment apparatus 35 are connected to each other via the Internet 38. The server 34 is also connected with the aggregation apparatus 36 via the Internet 38.

Structure of Optical Disc 31

Figure 22:
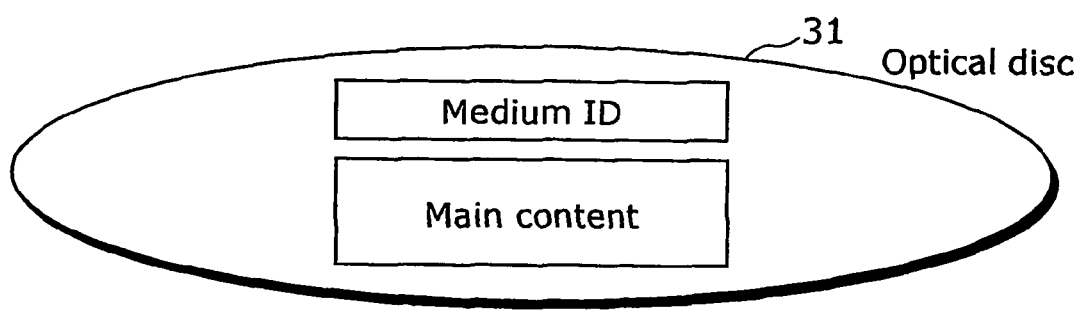
FIG. 22 is a diagram showing a structure of an optical disc 31 in the third embodiment.

The optical disc 31 is a portable medium such as a DVD-RAM on which information can be recorded. As shown in FIG. 22, a main content is recorded on the optical disc 31. And a medium ID for identifying the optical disc 31 uniquely is also recorded on the optical disc 31 when it is manufactured.

Here, the medium ID can be read by the aggregation apparatus 36 and the reproduction apparatus 37, but cannot be rewritten nor deleted.

Structure of Memory Card 32

The memory card 32 is a recording medium such as an SD card on which information can be recorded. On the memory card 32, a sub content to be used in association with the main content is recorded by the sub content obtainment apparatus 35.

Structure of Portable Medium 33

The portable medium 33 is a portable medium such as a DVD-RAM on which information can be recorded. The main content recorded on the optical disc 31 and the sub content recorded on the memory card 32 are aggregated and recorded onto the portable medium 33 by the aggregation apparatus 36. Note that, as mentioned above, the portable medium 33 may be a removable HDD, or may be replaced with a recording medium such as a nonremovable HDD. In short, the portable medium 33 or the recording medium that replaces the portable medium 33 must be a recording medium on which aggregated main content and sub content are recorded.

Structure of Server 34

The server 34 holds the sub content to be used in association with the main content recorded on the optical disc 31, and provides the sub content obtainment apparatus 35 with the sub content.

The server 34 also holds a list of sets of medium IDs and aggregation judgment information, as shown in FIG. 23. The aggregation judgment information indicates whether or not each main content recorded on the optical disc 31 with its medium ID is permitted to be aggregated and recorded onto the portable medium 33, together with the sub content.

Upon receipt of the medium ID from the aggregation apparatus 36 via the Internet 38, the server 34 sends, to the aggregation apparatus 36 via the Internet 38, the aggregation judgment information of the main content recorded on the optical disc 31 with that medium ID, with reference to the above list of aggregation judgment information.

Structure of Sub Content Obtainment Apparatus 35

The sub content obtainment apparatus 35 obtains the sub content from the server 34 via the Internet 38, and records it on the memory card 32.

Structure of Aggregation Apparatus 36

Figure 24:
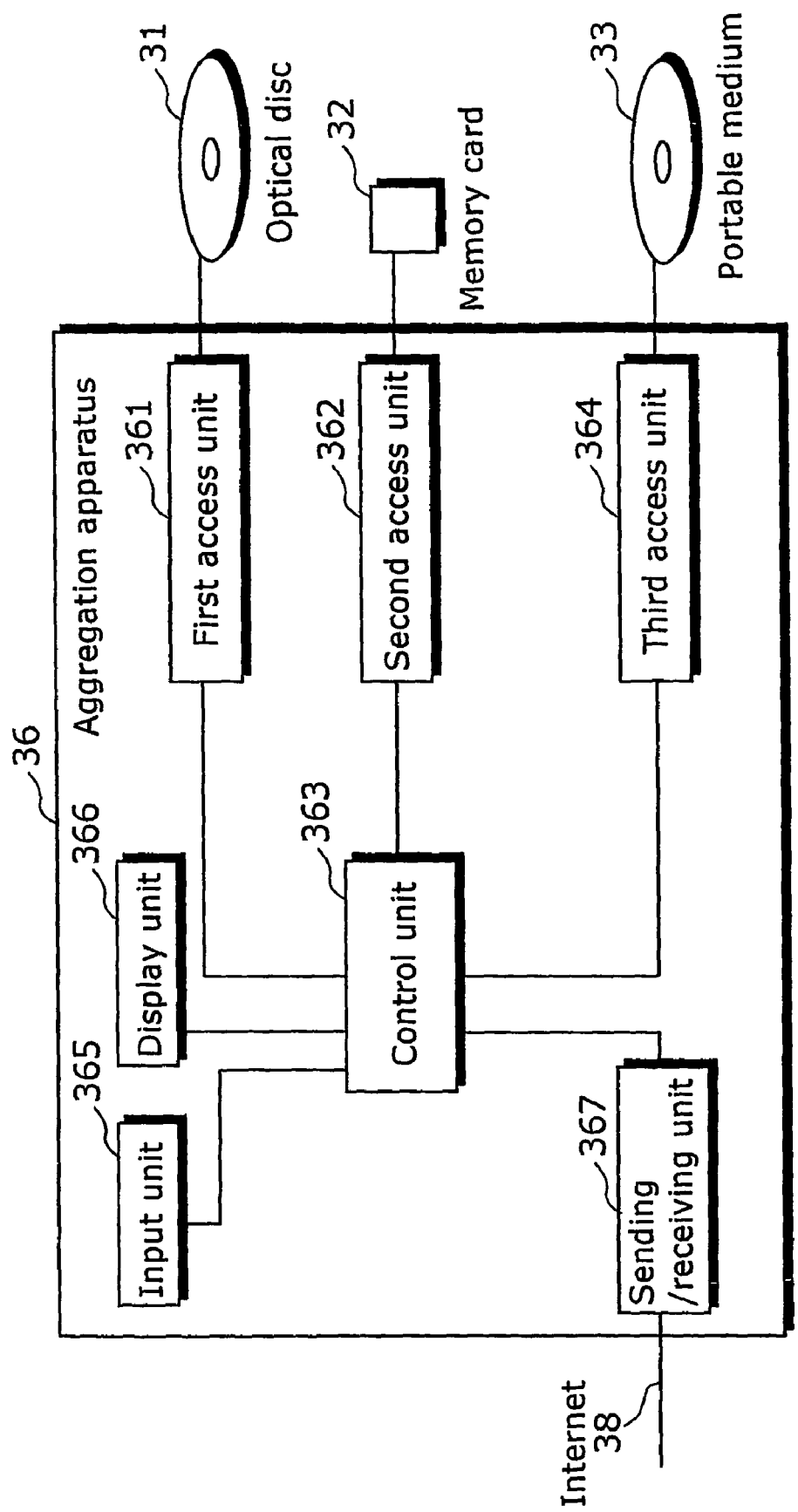
FIG. 24 is a diagram showing a structure of an aggregation apparatus 36 in the third embodiment.

FIG. 24 shows the structure of the aggregation apparatus 36. As shown in FIG. 24, the aggregation apparatus 36 includes a first access unit 361, a second access unit 362, a control unit 363, a third access unit 364, an input unit 365, a display unit 366 and a sending/receiving unit 367.

(1) First Access Unit 361

The first access unit 361 reads the main content and the medium ID from the optical disc 31 according to the instruction of the control unit 363.

(2) Second Access Unit 362

The second access unit 362 reads the sub content from the memory card 32 according to the instruction of the control unit 363.

(3) Control Unit 363

The control unit 363 reads the main content and the medium ID from the optical disc 31 via the first access unit 361, and reads the sub content from the memory card 32 via the second access unit 362.

Then, the control unit 363 sends the medium ID to the server 34 via the sending/receiving unit 367, and receives the aggregation judgment information corresponding to the medium ID from the server 34.

When the aggregation judgment information indicates that the main content is permitted to be aggregated with the sub content and recorded onto the portable medium 33, the control unit 363 writes the main content and the sub content onto the portable medium 33 via the third access unit 364.

(4) Third Access Unit 364

The third access unit 364 writes the main content and the sub content onto the portable medium 33 according to the instruction of the control unit 363.

(5) Input Unit 365

The input unit 365 accepts an input of an aggregation instruction from a user.

Then, upon receipt of the input of the aggregation instruction from the user, the input unit 365 causes the control unit 363 to operate.

(6) Display Unit 366

After the control unit 363 completes writing of the main content and the sub content onto the portable medium 33, the display unit 366 notifies the user of the end of the processing by displaying it.

(7) Sending/Receiving Unit 367

The sending/receiving unit 367 sends the medium ID to the server 34 via the Internet 38 according to the instruction of the control unit 363, and receives the aggregation judgment information corresponding to the medium ID from the server 34 via the Internet 38.

Structure of Reproduction Apparatus 37

Figure 25:
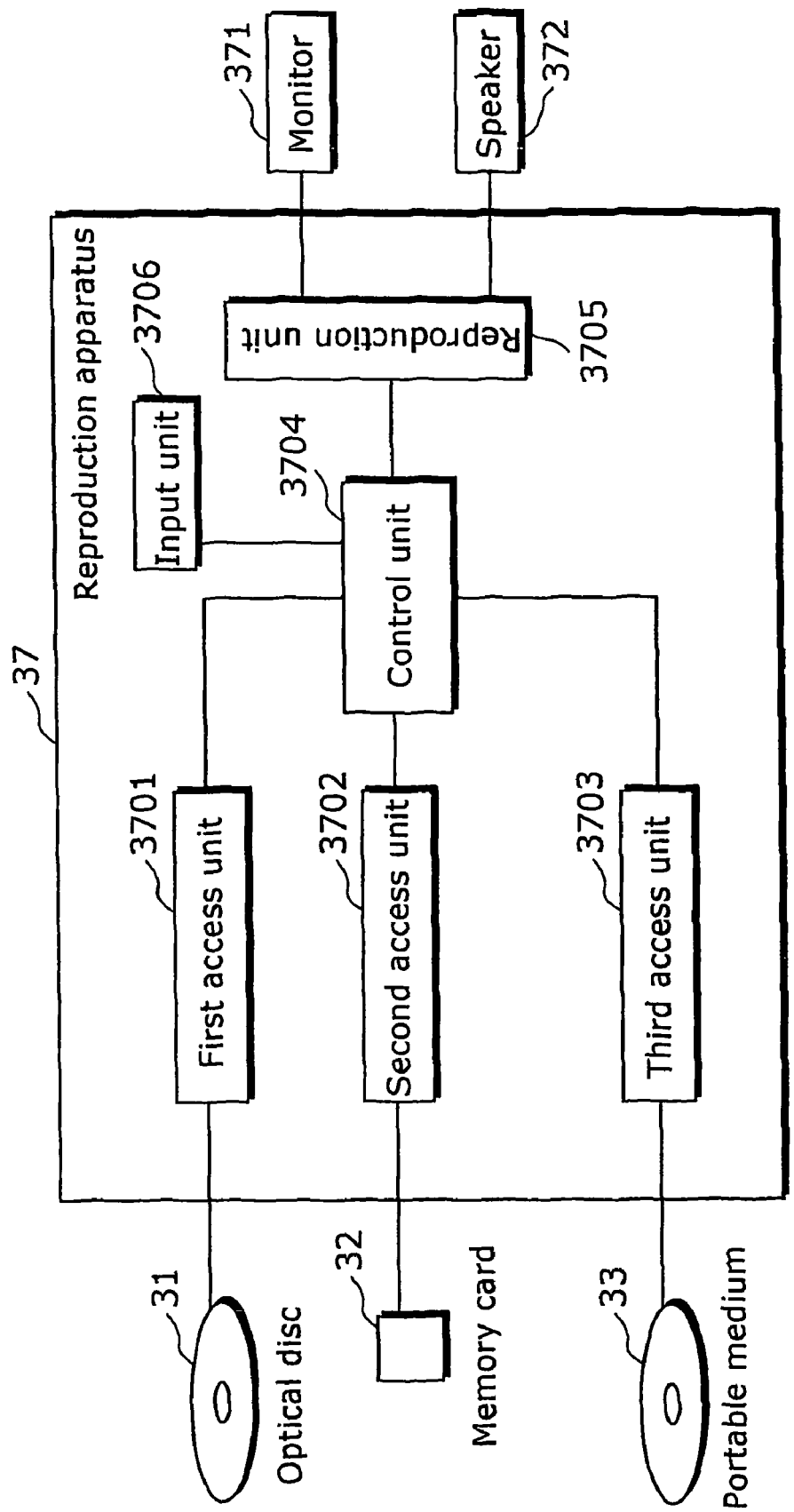
FIG. 25 is a diagram showing a structure of a reproduction apparatus 37 in the third embodiment.

FIG. 25 shows the structure of the reproduction apparatus 37. As shown in FIG. 25, the reproduction apparatus 37 includes a first access unit 3701, a second access unit 3702, a third access unit 3703, a control unit 3704, a reproduction unit 3705, and an input unit 3706.

(1) First Access Unit 3701

The first access unit 3701 reads the main content from the optical disc 31 according to the instruction of the control unit 3704.

(2) Second Access Unit 3702

The second access unit 3702 reads the sub content from the memory card 32 according to the instruction of the control unit 3704.

(3) Third Access Unit 3703

The third access unit 3703 reads the main content and the sub content from the portable medium 33 according to the instruction of the control unit 3704.

(4) Control Unit 3704

The control unit 3704 performs either the following processing (i) or (ii) according to the instruction of the input unit 3706.

(i) To cause the reproduction unit 3705 to reproduce the main content recorded on the optical disc 31 and the sub content recorded on the memory card 32 by associating them with each other.

The control unit 3704 reads the main content from the optical disc 31 via the first access unit 3701, and reads the sub content from the memory card 32 via the second access unit 3702. Then, the control unit 3704 causes the reproduction unit 3705 to reproduce the main content and the sub content by associating them with each other and output them to the outside.

(ii) To cause the reproduction unit 3705 to reproduce the main content and the sub content which are recorded on the portable medium 33 by associating them with each other.

The control unit 3704 reads the main content and the sub content from the portable medium 33 via the third access unit 3703. Then, the control unit 3704 causes the reproduction unit 3705 to reproduce the main content and the sub content by associating them with each other and output them to the outside.

(5) Reproduction Unit 3705

The reproduction unit 3705 reproduces the main content and the sub content by associating them with each other under the control of the control unit 3704, and outputs the reproduced data to a monitor 371 and a speaker 372 which are connected to the reproduction unit 3705. The monitor 371 and the speaker 372 output the data reproduced by the reproduction unit 3705 to the outside.

(6) Input Unit 3706

The input unit 3706 accepts an instruction to reproduce the optical disc 31 or an instruction to reproduce the portable medium 33 from the user.

Upon receipt of the instruction to reproduce the optical disc 31, the input unit 3706 causes the control unit 3704 to operate so that the main content recorded on the optical disc 31 and the sub content recorded on the memory card 32 are reproduced in association with each other.

On the other hand, upon receipt of the instruction to reproduce the portable medium 33, the input unit 3706 causes the control unit 3704 to operate so that the main content and the sub content which are recorded on the portable medium 33 are reproduced in association with each other.

Operation of Aggregation System 3

The configuration of the aggregation system 3 has been explained, and the detailed explanation of the operations of the aggregation apparatus 36 and the reproduction apparatus 37, as the operation of the aggregation system 3, will follow.

Operation of Aggregation Apparatus 36

Figure 26:
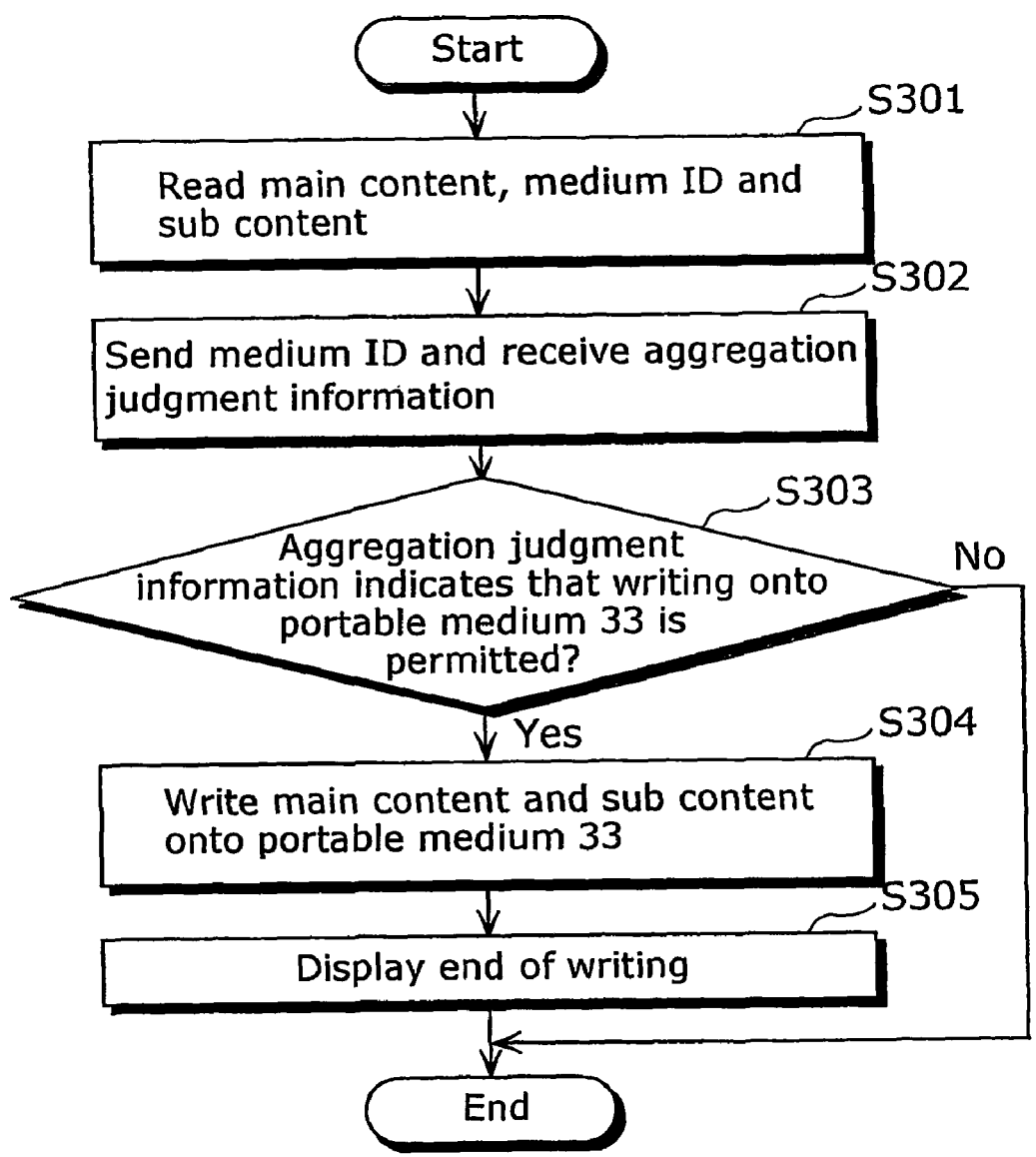
FIG. 26 is a flowchart showing processing of the aggregation apparatus 36 in the third embodiment.

The operation of the aggregation apparatus 36 will be explained with reference to the flowchart as shown in FIG. 26.

When the input unit 365 receives the input of the aggregation instruction from the user, the aggregation apparatus 36 performs the following processing.

First, the control unit 363 reads the main content and the medium ID from the optical disc 31 via the first access unit 361, and reads the sub content from the memory card 32 via the second access unit 362 (Step S301).

Then, the control unit 363 sends the medium ID to the server 34 via the sending/receiving unit 367, and receives the aggregation judgment information corresponding to the medium ID from the server 34 (Step S302).

Next, the control unit 363 checks whether or not the aggregation judgment information indicates that the main content is permitted to be aggregated with the sub content and written onto the portable medium 33 (Step S303). When the aggregation judgment information does not indicate that the content is not permitted to be aggregated and written (No in Step S303), the operation of the aggregation apparatus ends.

On the other hand, when the aggregation judgment information indicates that the content is permitted to be aggregated and written (Yes in Step S303), the control unit 363 writes the main content and the sub content onto the portable medium 33 via the third access unit 364 (Step S304).

Next, the display unit 366 displays that writing of the main content and the sub content onto the portable medium 33 has been completed (Step S305). Thereby, the operation of the aggregation apparatus 36 ends.

Operation of Reproduction Apparatus 37

Figure 27:
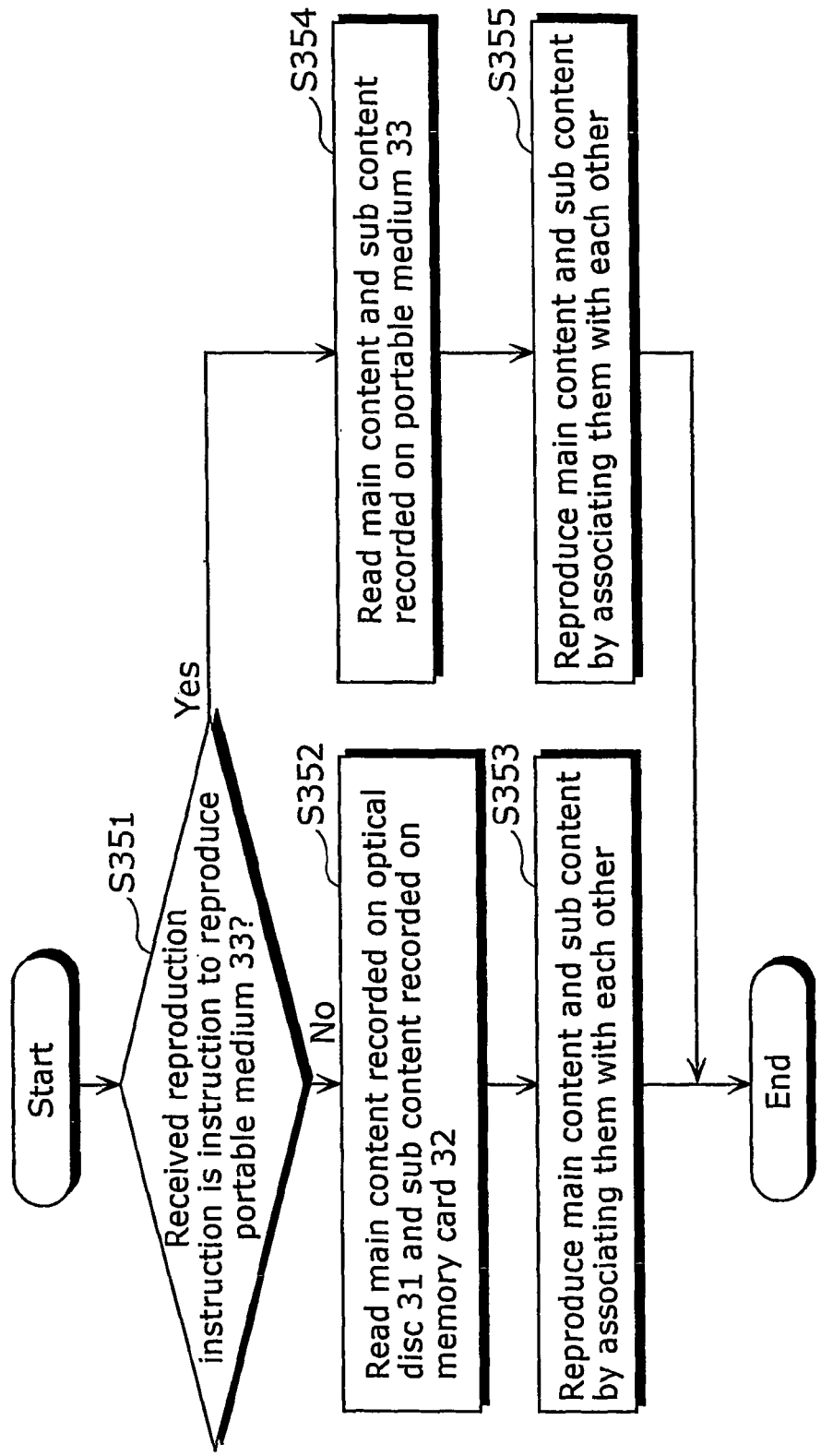
FIG. 27 is a flowchart showing processing of the reproduction apparatus 37 in the third embodiment.

The operation of the reproduction apparatus 37 will be explained with reference to the flowchart as shown in FIG. 27.

When the input unit 3706 receives the instruction to reproduce the optical disc 31 or the instruction to reproduce the portable medium 33 from the user, the reproduction apparatus 37 performs the following operation.

First, the input unit 3706 checks whether the received reproduction instruction is the instruction to reproduce the optical disc 31 or the instruction to reproduce the portable medium 33 (Step S351). The processing goes to Step S352 in the case of the instruction to reproduce the optical disc 31, whereas the processing goes to Step S354 in the case of the instruction to reproduce the portable medium 33.

To be more specific, in the case where the reproduction instruction received by the input unit 3706 is the instruction to reproduce the optical disc 31 (No in Step S351), the control unit 3704 reads the main content from the optical disc 31 via the first access unit 3701, and reads the sub content from the memory card 32 via the second access unit 3702 (Step S352).

Next, the control unit 3704 causes the reproduction unit 3705 to reproduce the main content and the sub content by associating them with each other (Step S353). The reproduced data is outputted to the outside via the monitor 371 and the speaker 372. Thereby, the operation of the reproduction apparatus 37 ends.

On the other hand, in the case where the reproduction instruction received by the input unit 3706 is the instruction to reproduce the portable medium 33 (Yes in Step S351), the control unit 3704 reads the main content and the sub content from the portable medium 33 via the third access unit 3703 (Step S354). Then, the control unit 3704 causes the reproduction unit 3705 to reproduce the main content and the sub content by associating them with each other (Step S355). The reproduced data is outputted to the outside via the monitor 371 and the speaker 372. Then, the operation of the reproduction apparatus 37 ends.

Verification of Operation of Aggregation System 3

The overall operation of the aggregation system 3 in the third embodiment will be summarized below.

First, the aggregation apparatus 36 reads the main content and the medium ID from the optical disc 31, reads the sub content from the memory card 32, sends the medium ID to the server 34, and receives the aggregation judgment information corresponding to that medium ID from the server 34. When the aggregation judgment information indicates that the main content is permitted to be aggregated with the sub content and recorded onto the portable medium 33, the aggregation apparatus 36 records the main content and the sub content onto the portable medium 33.

When reproducing the main content recorded on the optical disc 31 and the sub content recorded on the memory card 32, the reproduction apparatus 37 reads the main content from the optical disc 31, reads the sub content from the memory card 32, and causes the reproduction unit 3705 to reproduce the main content and the sub content by associating them with each other and output the reproduced data to the outside.

On the other hand, when reproducing the main content and the sub content which are recorded on the portable medium 33, the reproduction apparatus 37 reads the main content and the sub content from the portable medium 33, and causes the reproduction unit 3705 to reproduce the main content and the sub content by associating them with each other and output the reproduced data to the outside.

As a result, the user can reproduce the main content recorded on the optical disc 31 and the sub content recorded on the memory card 32 by associating them with each other. In addition, for the sake of enhancing convenience of portability, the user can aggregate the main content recorded on the optical disc 31 and the sub content recorded on the memory card 32 and record them onto the portable medium 33, and reproduce the main content and the sub content which are recorded on the portable medium 33 by associating them with each other.

Effect Obtained in Third Embodiment

In the third embodiment, the main content and the medium ID are recorded on the optical disc 31, and the aggregation apparatus 36 records the main content and the sub content onto the portable medium 33 based on the aggregation judgment information which corresponds to the medium ID.

Thereby, the main content and the sub content cannot be recorded onto the portable medium 33 unless the aggregation judgment information indicates that the main content is permitted to be aggregated with the sub content and recorded onto the portable medium 33. As a result, differently from the conventional techniques, the aggregation system 3 puts limitations on the aggregation of the main content recorded on the optical disc 31 and the sub content recorded on the memory card 32 and recording of them onto the portable medium 33, based on the aggregation judgment information managed by the content provider. Therefore, the copyrights of the contents are protected.

Modifications

Although the third embodiment has been fully described by way of one example of the embodiments of the present invention, it is to be noted that various changes and modifications will be apparent to those skilled in the art. Therefore, unless otherwise such changes and modifications depart from the scope of the present invention, they should be construed as being included therein. The embodiment of the present invention also includes the following modifications:

(1) The aggregation judgment information is not limited to the information as shown in FIG. 23. Each of a plurality of sub contents may include a sub content ID for identifying each sub content, and the aggregation judgment information may be determined based on a combination of the medium ID and the sub content ID, as shown in FIG. 28. To be more specific, the aggregation apparatus 36 sends a sub content ID and a medium ID to the server 34, and the server 34 sends the aggregation judgment information determined based on the medium ID and the sub content ID to the aggregation apparatus 36.

Thereby, it is possible to meet the request of the content provider for permitting only the aggregation of a main content with a specified sub content.

(2) As shown in FIG. 29, the aggregation judgment information may be determined based on a medium ID and information indicating whether or not to bill a user for his/her aggregation of contents. To be more specific, the aggregation apparatus 36 sends a medium ID and a user ID for identifying each user to the server 34, and the server 34 sends, to the aggregation apparatus 36, the aggregation judgment information determined based on the medium ID and the billing information for the user identified by the user ID.

Thereby, it is possible to meet the request of the content provider for permitting only the user who accepts the billing from the content provider to aggregate contents recorded on a plurality of recording mediums and record them onto a single recording medium.

Note that the aggregation judgment information may be determined based on the medium ID and the amount of billing to the user.

(3) As shown in FIG. 30, the aggregation judgment information may be determined based on a medium ID, information indicating whether or not to bill a user for his/her obtainment of a sub content, and information indicating whether or not to bill the user for his/her aggregation of contents. To be more specific, the aggregation apparatus 36 sends a user ID for identifying a user and a medium ID to the server 34, and the server 34 sends, to the aggregation apparatus 36, the aggregation judgment information determined based on the medium ID, the billing information for the user who is identified by the user ID for his/her obtainment of the sub content, and the billing information for the user who is identified by the user ID for his/her aggregation of contents.

Thereby, it is possible to meet the request of the content provider for permitting only the user who accepts the billing from the content provider to his/her obtainment of the sub content and aggregation of the contents to aggregate the contents recorded on a plurality of recording mediums and record them onto a single recording medium.

Figures 31, 32:
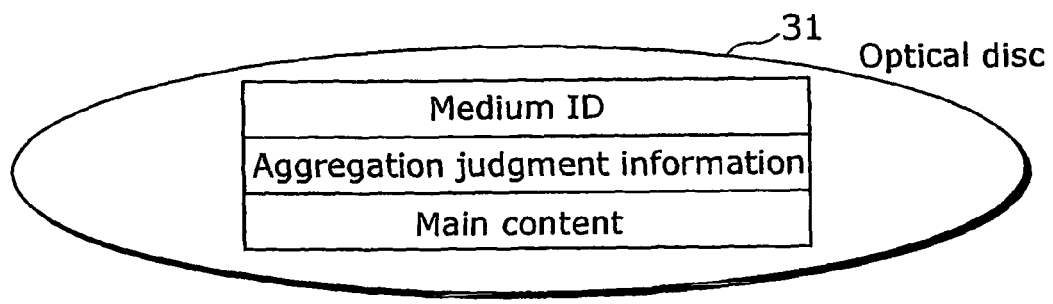
FIG. 31 is a diagram showing an example of medium IDs, information indicating the number of user's aggregations and aggregation judgment information in the third embodiment.
FIG. 32 is a diagram showing another structure of the optical disc 31 in the third embodiment.

(4) Furthermore, as shown in FIG. 31, the aggregation judgment information may be determined based on a predetermined number of user's aggregations of a main content and a sub content. To be more specific, the aggregation apparatus 36 sends a user ID for identifying the user and a medium ID to the server 34, and the server 34 sends, to the aggregation apparatus 36, the aggregation judgment information determined based on the number of aggregations of the main content and the sub content by the user identified by the medium ID and the user ID. In other words, the server 34 manages the number of receptions of the medium ID from the aggregation apparatus 36 as the number of aggregations of the main content and the sub content for each user ID for identifying the user, and the aggregation apparatus 36 sends the user ID and the medium ID to the server 34. Then, the server 34 sends, to the aggregation apparatus 36, the aggregation judgment information determined based on the number of aggregations of the main content and the sub content by the user identified by the medium ID and the user ID.

Thereby, it is possible to meet the request of the content provider for limiting the number of aggregations of contents recorded on a plurality of recording mediums onto a single recording medium.

(5) Furthermore, as shown in FIG. 32, the aggregation judgment information may be recorded on the optical disc 31 for distribution. To be more specific, the aggregation apparatus 36 may read the aggregation judgment information from the optical disc 31, instead of sending the medium ID to the server 34 and receiving the aggregation judgment information from the server 34.

Thereby, the same effect as that in the third embodiment can be obtained even if the aggregation apparatus 36 does not communicate with the server 34.

Note that the aggregation judgment information may be recorded on the memory card 32, together with a sub content obtained from the server 34 via the sub content obtainment apparatus 35.

In addition, in a case where the aggregation apparatus 36 records a predetermined number of user's aggregations of a main content and a sub content on the optical disc 31 or the memory card 32, the aggregation apparatus 36 may rewrite the aggregation judgment information recorded on the optical disc 31 so that no more aggregation cannot be done when the number of actual aggregations has reached the predetermined number of aggregations.

Thereby, it is possible to meet the request of the content provider for limiting the number of aggregations of contents onto a single recording medium even if the aggregation apparatus 36 does not communicate with the server 34.

(6) The medium ID recorded on the optical disc 31 may be any other ID as long as it can identify what the content recorded on the optical disc 31 is.

For example, it may be a content name, a content ID or the like.

(7) It is possible that the server 34, sends, to the aggregation apparatus 36, the information that cannot be created by any other devices than the server 34, as well as the aggregation judgment information, and the aggregation apparatus 36 judges whether the aggregation judgment information is authentic or not using that information and aggregates contents when it is authentic. For example, when sending the aggregation judgment information to the aggregation apparatus 36, the server 34 attaches a digital signature to it. To be more specific, the server 34 creates a digital signature using its own signature key, and attaches the digital signature and a public key for signature verification (or a certificate for the public key for signature verification) to the aggregation judgment information. The aggregation apparatus 36 verifies the aggregation judgment information using the signature verification key before aggregation, and then aggregates contents based on the aggregation judgment information if it is authentic as a result of the verification.

When permitting the aggregation, the server 34 creates a digital signature using its own signature key, and sends the digital signature and a public key for signature verification (or a certificate for the public key for signature verification) to the aggregation apparatus 36. The aggregation apparatus 36 may aggregate contents by considering that the aggregation is permitted if the digital signature is authentic as a result of the verification using the signature verification key.

Fourth Embodiment

Next, an aggregation system 4 in the fourth embodiment of the present invention will be explained below with reference to FIG. 33 to FIG. 38.

When an aggregation apparatus aggregates contents recorded on a plurality of recording mediums and records them onto another recording medium, this aggregation system 4 limits the use of the contents recorded on another recording medium.

Overview of Aggregation System 4

Figure 33:
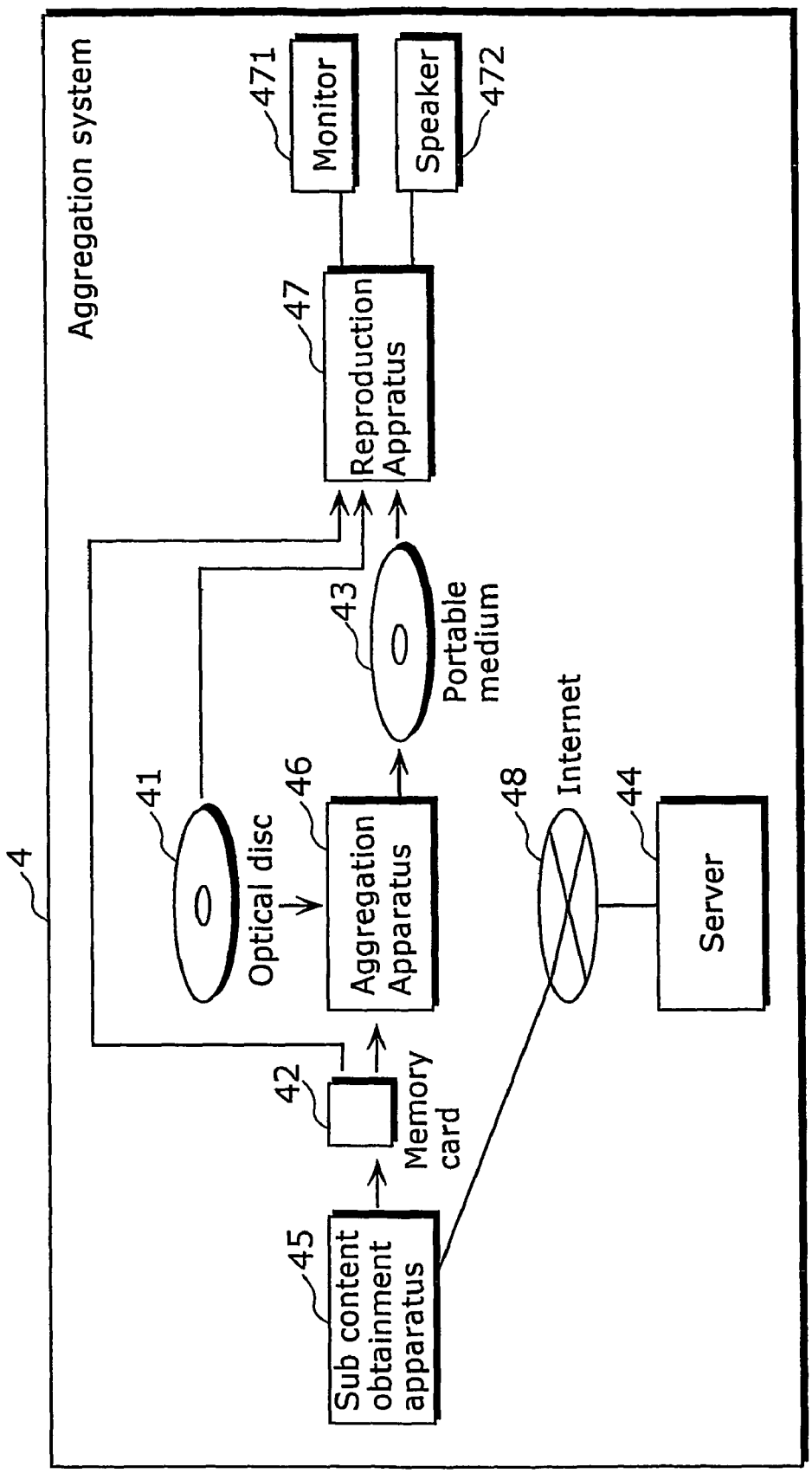
FIG. 33 is a diagram showing a configuration of an aggregation system 4 in a fourth embodiment.

First, the overview of the aggregation system 4 in the fourth embodiment will be provided with reference to FIG. 33. FIG. 33 is a block diagram showing the configuration of the aggregation system 4 in the fourth embodiment.

In FIG. 33, a content such as a movie is recorded, as a main content, on an optical disc 41, a sub content such as audio data to be used in association with the main content recorded on the optical disc 41 can be recorded on a memory card 42, and a portable medium 43 is a portable medium such as a DVD-RAM on which information can be recorded. The portable medium 43 may be a removable HDD, or may be replaced with a recording medium such as a nonremovable HDD.

A content provider distributes a main content to a user via a distribution means such as a sale of the main content recorded on the optical discs 41, and distributes a sub content to be used in association with the main content to the user from a server 44 via the Internet 48.

On the other hand, the user obtains the sub content from the server 44 via the Internet 48 using a sub content obtainment apparatus 45, and records it on the memory card 42. Then, using a reproduction apparatus 47, the user reproduces the main content recorded on the optical disc 41 by associating it with the sub content recorded on the memory card 42, and views it.

In order to enhance convenience of portability, the user can record, on the portable medium 43, the main content recorded on the optical disc 41 and the sub content recorded on the memory card 42, using the aggregation apparatus 46. The user can also reproduce and view the main content and the sub content which are recorded on the portable medium 43 by associating them with each other, using the reproduction apparatus 47. Note that the use of the main content recorded on the portable medium 43 is limited. For example, the number of uses of the main content is limited, or the user is billed for his/her use thereof.

This aggregation system 4 is a system for protecting copyrights of contents by putting limitations on user's use of another recording medium on which the contents recorded on a plurality of recording mediums are aggregated and recorded.

The overview of the aggregation system 4 in the fourth embodiment has been provided, and the detailed explanation of the aggregation system 4 will follow.

Configuration of Aggregation System 4

As shown in FIG. 33, the aggregation system 4 includes the optical disc 41, the memory card 42, the portable medium 43, the server 44, the sub content obtainment apparatus 45, the aggregation apparatus 46 and the reproduction apparatus 47, and the server 44 and the sub content obtainment apparatus 45 are connected with each other via the Internet 48.

Structure of Optical Disc 41

The optical disc 41 is a portable medium such as a DVD-RAM on which information can be recorded. A main content is recorded on the optical disc 41 here.

Structure of Memory Card 42

The memory card 42 is a recording medium such as an SD card on which information can be recorded. On the memory card 42, a sub content to be used in association with the main content is recorded by the sub content obtainment apparatus 45.

Structure of Portable Medium 43

The portable medium 43 is a portable medium such as a DVD-RAM on which information can be recorded. The main content recorded on the optical disc 41 and the sub content recorded on the memory card 42 are aggregated and recorded on the portable medium 43 by the aggregation apparatus 46. Note that, as mentioned above, the portable medium 43 may be a removable HDD, or may be replaced with a recording medium such as a nonremovable HDD. In short, the portable medium 43 or the recording medium that replaces the portable medium 43 must be a recording medium on which aggregated main content and sub content are recorded.

Figure 34:
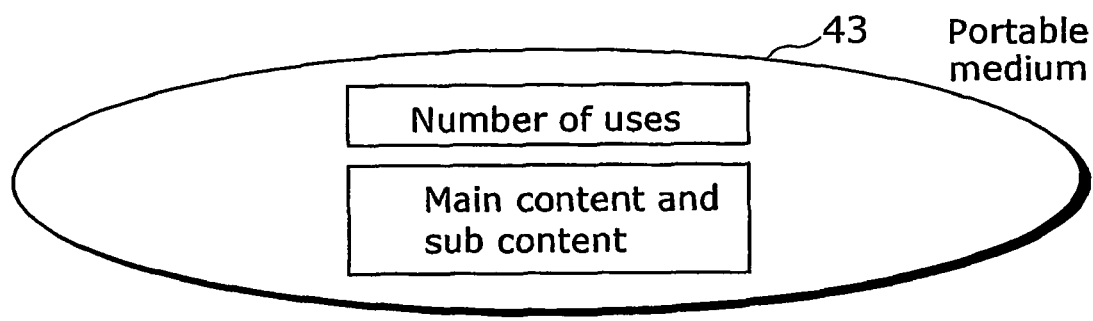
FIG. 34 is a diagram showing a structure of a portable medium 43 in the fourth embodiment.

As shown in FIG. 34, the number of uses of the portable medium 43 is recorded on the portable medium 43 on every use thereof.

Note that the default value of the number of uses of the portable medium 43 shall be 0.

Structure of Server 44

The server 44 holds the sub content to be used in association with the main content recorded on the optical disc 41, and provides the sub content obtainment apparatus 45 with the sub content.

Structure of Sub Content Obtainment Apparatus 45

The sub content obtainment apparatus 45 obtains the sub content from the server 44 via the Internet 48, and records it on the memory card 42.

Structure of Aggregation Apparatus 46

Figure 35:
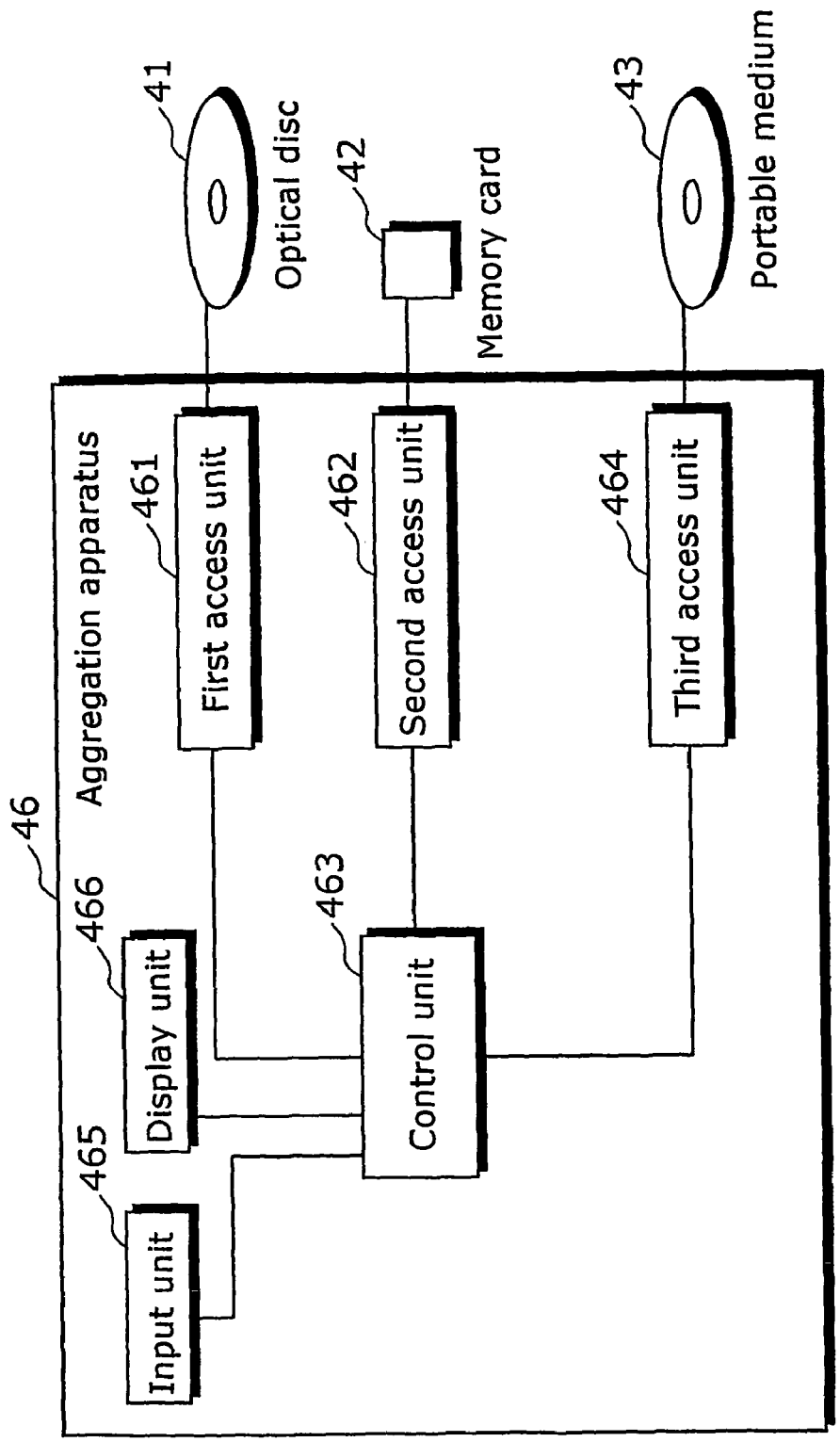
FIG. 35 is a diagram showing a structure of an aggregation apparatus 46 in the fourth embodiment.

FIG. 35 shows the structure of the aggregation apparatus 46. As shown in FIG. 35, the aggregation apparatus 46 includes a first access unit 461, a second access unit 462, a control unit 463, a third access unit 464, an input unit 465, and a display unit 466.

(1) First Access Unit 461

The first access unit 461 reads the main content from the optical disc 41 according to the instruction of the control unit 463.

(2) Second Access Unit 462

The second access unit 462 reads the sub content from the memory card 42 according to the instruction of the control unit 463.

(3) Control Unit 463

The control unit 463 reads the main content from the optical disc 41 via the first access unit 461, and reads the sub content from the memory card 42 via the second access unit 462.

Then, the control unit 463 writes the main content and the sub content on the portable medium 43 via the third access unit 464.

(4) Third Access Unit 464

The third access unit 464 writes the main content and the sub content on the portable medium 43 according to the instruction of the control unit 463.

(5) Input Unit 465

The input unit 465 accepts an input of an aggregation instruction from a user.

Then, upon receipt of the input of the aggregation instruction from the user, the input unit 465 causes the control unit 463 to operate.

(6) Display Unit 466

After the control unit 463 completes writing of the main content and the sub content onto the portable medium 43, the display unit 466 notifies the user of the end of the processing by displaying it.

Structure of Reproduction Apparatus 47

Figure 36:
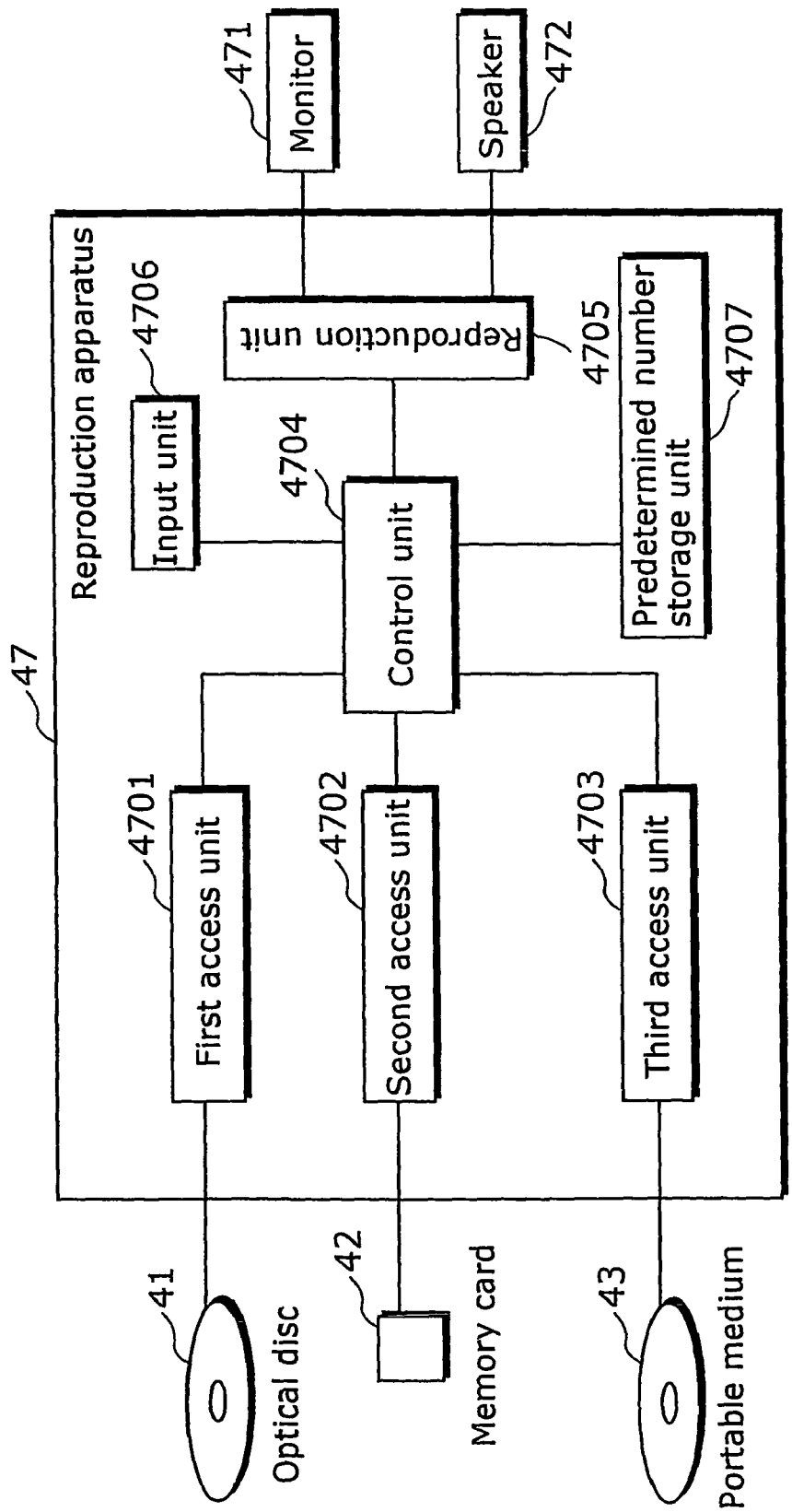
FIG. 36 is a diagram showing a structure of a reproduction apparatus 47 in the fourth embodiment.

FIG. 36 shows the structure of the reproduction apparatus 47. As shown in FIG. 36, the reproduction apparatus 47 includes a first access unit 4701, a second access unit 4702, a third access unit 4703, a control unit 4704, a reproduction unit 4705, an input unit 4706 and a predetermined number storage unit 4707.

(1) First Access Unit 4701

The first access unit 4701 reads the main content from the optical disc 41 according to the instruction of the control unit 4704.

(2) Second Access Unit 4702

The second access unit 4702 reads the sub content from the memory card 42 according to the instruction of the control unit 4704.

(3) Third Access Unit 4703

The third access unit 4703 reads the main content, the sub content and the number of uses of the portable medium 43 from the portable medium 43, according to the instruction of the control unit 4704.

The third access unit 4703 also writes the number of uses of the portable medium 43 on the portable medium 43, according to the instruction of the control unit 4704.

The third access unit 4703 further deletes the main content recorded on the portable medium 43, according to the instruction of the control unit 4704.

(4) Control Unit 4704

The control unit 4704 performs either the following processing (i) or (ii) according to the instruction of the input unit 4706.

(i) To cause the reproduction unit 4705 to reproduce the main content recorded on the optical disc 41 and the sub content recorded on the memory card 42 by associating them with each other.

The control unit 4704 reads the main content from the optical disc 41 via the first access unit 4701, and reads the sub content from the memory card 42 via the second access unit 4702. Then, the control unit 4704 causes the reproduction unit 4705 to reproduce the main content and the sub content by associating them with each other and output them to the outside.

(ii) To cause the reproduction unit 4705 to reproduce the main content and the sub content which are recorded on the portable medium 43 by associating them with each other.

The control unit 4704 reads the main content, the sub content and the number of uses of the portable medium 43 from the portable medium 43 via the third access unit 4703.

Then, the control unit 4704 increments the number of uses of the portable medium 43 by one, and writes the incremented number of uses of the portable medium 43 on the portable medium 43.

Then, the control unit 4704 causes the reproduction unit 4705 to reproduce the main content and the sub content by associating them with each other and output them to the outside.

When the number of uses of the portable medium 43 has reached a predetermined number of uses, for example, three times, the control unit 4704 deletes the main content and the sub content which are recorded on the portable medium 43, via the third access unit 4703. Note that the predetermined number of uses, that is, the upper limit of the number of times up to which the user can use the portable medium 43, is stored in the predetermined number storage unit 4707.

(5) Reproduction Unit 4705

The reproduction unit 4705 reproduces the main content and the sub content by associating them with each other under the control of the control unit 4704, and outputs the reproduced data to a monitor 471 and a speaker 472 which are connected to the reproduction unit 4705. The monitor 471 and the speaker 472 output the data reproduced by the reproduction unit 4705 to the outside.

(6) Input Unit 4706

The input unit 4706 accepts an instruction to reproduce the optical disc 41 or an instruction to reproduce the portable medium 43 from the user.

Upon receipt of the instruction to reproduce the optical disc 41, the input unit 4706 causes the control unit 4704 to operate so that the main content recorded on the optical disc 41 and the sub content recorded on the memory card 42 are reproduced in association with each other.

On the other hand, upon receipt of the instruction to reproduce the portable medium 43, the input unit 4706 causes the control unit 4704 to operate so that the main content and the sub content which are recorded on the portable medium 43 are reproduced in association with each other.

(7) Predetermined Number Storage Unit 4707

The predetermined number storage unit 4707 stores the predetermined number of uses, that is, the upper limit of the number of times up to which the user can use the portable medium 43.

It is assumed in the fourth embodiment that the predetermined number of uses is stored in the predetermined number storage unit 4707, but it may be recorded on a recording medium such as a memory card. In short, the predetermined number of uses can be used by the control unit 4707. Therefore, the predetermined number of uses may be obtained by the control unit 4707 via the Internet 48, or may be stored in the control unit 4704.

Operation of Aggregation System 4

The configuration of the aggregation system 4 has been explained, and the detailed explanation of the operations of the aggregation apparatus 46 and the reproduction apparatus 47, as the operation of the aggregation system 4, will follow.

Operation of Aggregation Apparatus 46

Figure 37:
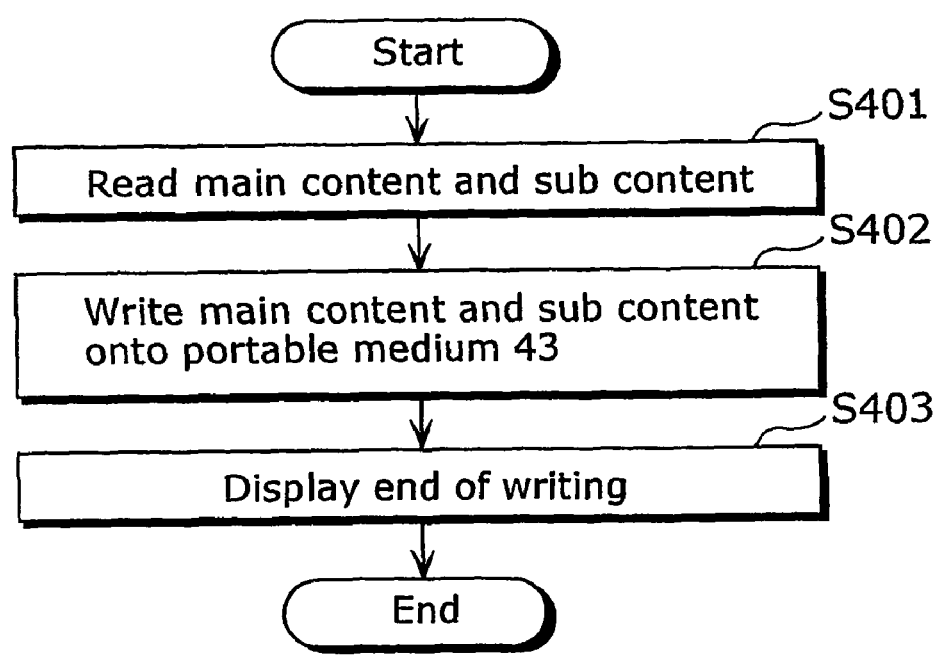
FIG. 37 is a flowchart showing processing of the aggregation apparatus 46 in the fourth embodiment.

The operation of the aggregation apparatus 46 will be explained with reference to the flowchart as shown in FIG. 37.

When the input unit 465 receives the input of the aggregation instruction from the user, the aggregation apparatus 46 performs the following processing.

First, the control unit 463 reads the main content from the optical disc 41 via the first access unit 461, and reads the sub content from the memory card 42 via the second access unit 462 (Step S401).

Then, the control unit 463 writes the main content and the sub content on the portable medium 43 via the third access unit 464 (Step S402).

Next, the display unit 466 displays that writing of the main content and the sub content onto the portable medium 43 has been completed (Step S403). Then, the operation of the aggregation apparatus 46 ends.

Operation of Reproduction Apparatus 47

Figure 38:
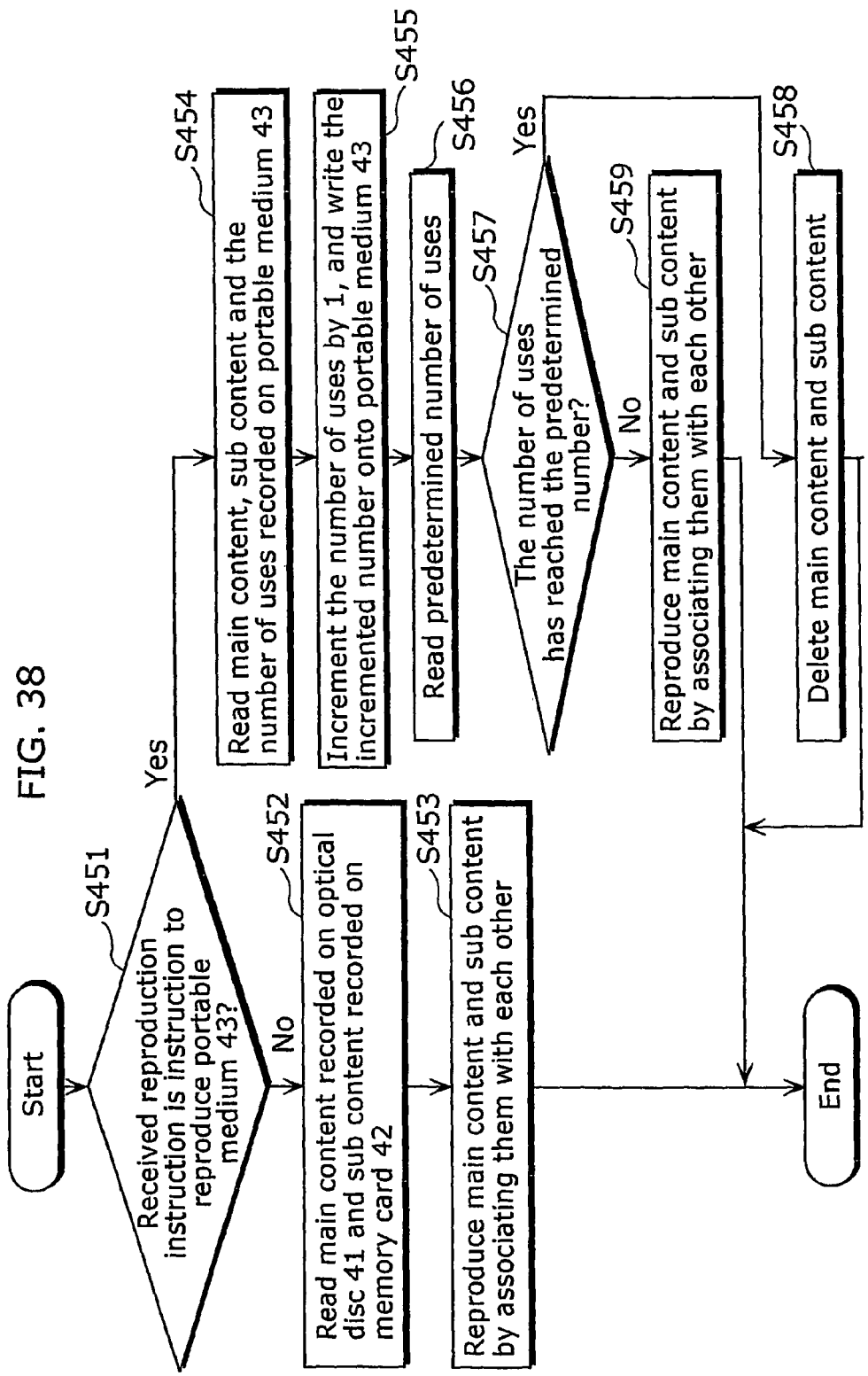
FIG. 38 is a flowchart showing processing of the reproduction apparatus 47 in the fourth embodiment.

The operation of the reproduction apparatus 47 will be explained with reference to the flowchart as shown in FIG. 38.

When the input unit 4706 receives the instruction to reproduce the optical disc 41 or the instruction to reproduce the portable medium 43 from the user, the reproduction apparatus 47 performs the following operation.

First, the input unit 4706 checks whether the received reproduction instruction is the instruction to reproduce the optical disc 41 or the instruction to reproduce the portable medium 43 (Step S451). The processing goes to Step S452 in the case of the instruction to reproduce the optical disc 41, whereas the processing goes to Step S454 in the case of the instruction to reproduce the portable medium 43.

To be more specific, in a case where the reproduction instruction received by the input unit 4706 is the instruction to reproduce the optical disc 41 (No in Step S451), the control unit 4704 reads the main content from the optical disc 41 via the first access unit 4701, and reads the sub content from the memory card 42 via the second access unit 4702 (Step S452).

Next, the control unit 4704 causes the reproduction unit 4705 to reproduce the main content and the sub content by associating them with each other (Step S453). The reproduced data is outputted to the outside via the monitor 471 and the speaker 472. Thereby, the operation of the reproduction apparatus 47 ends.

On the other hand, in a case where the reproduction instruction received by the input unit 4706 is the instruction to reproduce the portable medium 43 (Yes in Step S451), the control unit 4704 reads the main content, the sub content and the number of uses of the portable medium 43 from the portable medium 43 via the third access unit 4703 (Step S454). Then, the control unit 4704 increments the number of uses of the portable medium 43 by one, and writes the incremented number of uses of the portable medium 43 on the portable medium 43 via the third access unit 4703 (Step S455).

Then, the control unit 4704 reads, from the predetermined number storage unit 4707, the predetermined number of uses that is the maximum number of times to which the user can use the portable medium 43 (Step S456).

The control unit 4704 checks whether the number of uses of the portable medium 43 has reached the predetermined number or not (Step S457). When it has reached the predetermined number of uses (Yes in Step S457), the control unit 4704 deletes the main content and the sub content which are recorded on the portable medium 43, via the third access unit 4703 (Step S458). Thereby, the operation of the reproduction apparatus 47 ends.

On the other hand, when the number of uses of the portable medium 43 has not yet reached the predetermined number (No in Step S457), the control unit 4704 causes the reproduction unit 4705 to reproduce the main content and the sub content by associating them with each other (Step S459). The reproduced data is outputted to the outside via the monitor 471 and the speaker 472. Thereby, the operation of the reproduction apparatus 47 ends.

Verification of Operation of Aggregation System 4

The overall operation of the aggregation system 4 in the fourth embodiment will be summarized below.

First, the aggregation apparatus 46 reads the main content from the optical disc 41, reads the sub content from the memory card 42, and records the main content and the sub content onto the portable medium 43.

When reproducing the main content recorded on the optical disc 41 and the sub content recorded on the memory card 42, the reproduction apparatus 47 reads the main content from the optical disc 41, reads the sub content from the memory card 42, and causes the reproduction unit 4705 to reproduce the main content and the sub content by associating them with each other and output the reproduced data to the outside.

On the other hand, when reproducing the main content and the sub content which are recorded on the portable medium 43, the reproduction apparatus 47 reads the main content and the sub content from the portable medium 43, and causes the reproduction unit 4705 to reproduce the main content and the sub content by associating them with each other and output the reproduced data to the outside. Note that the reproduction apparatus 47 deletes the main content and the sub content which are recorded on the portable medium 43 when the portable medium 43 has been used the predetermined number of times.

As a result, the user can reproduce the main content recorded on the optical disc 41 and the sub content recorded on the memory card 42 by associating them with each other. In addition, for the sake of enhancing convenience of portability, the user can reproduce the main content and the sub content which are recorded on the portable medium 43 by associating them with each other, by aggregating the main content recorded on the optical disc 41 and the sub content recorded on the memory card 42 and recording them onto the portable medium 43.

Effect Obtained in Fourth Embodiment

In the fourth embodiment, the number of uses of the portable medium 43 is recorded on the portable medium 43. The reproduction apparatus 47 updates the number of uses to be recorded on the portable medium 43 every time this portable medium 43 is used. When the number of uses has reached the predetermined number, the main content and the sub content which are recorded on the portable medium 43 are deleted from the portable medium 43.

Thereby, the contents which are aggregated and recorded on another recording medium can only be reproduced within the predetermined number of uses. As a result, differently from the conventional techniques, the aggregation system 4 protects the copyrights of the contents by putting limitations on the uses of the contents which are recorded onto another recording medium.

Modifications

Although the fourth embodiment has been fully described by way of one example of the embodiments of the present invention, it is to be noted that various changes and modifications will be apparent to those skilled in the art. Therefore, unless otherwise such changes and modifications depart from the scope of the present invention, they should be construed as being included therein. The embodiment of the present invention also includes the following modifications:

(1) In the present embodiment, the reproduction apparatus 47 increments the number of uses to be recorded on the portable medium 43 by one every time the portable medium 43 is used, and deletes the main content and the sub content when the number of uses has reached a predetermined number. However, it is also possible to record the predetermined number of uses on the portable medium 43 when the main content and the sub content are aggregated and recorded onto the portable medium 43, decrement the predetermined number recorded on the portable medium 43 by one every time the portable medium 43 is used, and delete the main content and the sub content when the predetermined number has reached 0.

(2) It is also possible that the portable medium 43 includes a clock for measuring the time for which the portable medium 43 has been used, a predetermined time is recorded on the portable medium 43, and the reproduction apparatus 47 deletes the main content and the sub content when the used time has reached the predetermined time. Or, the predetermined time may have already been recorded on the portable medium 43 when the main content and the sub content are aggregated and recorded onto the portable medium 43. In that case, the reproduction apparatus 47 may subtract the used time from the remaining reproduction time recorded and updated on the portable medium 43 every time the portable medium 43 is used, and delete the main content and the sub content when the recorded remaining time has reached 0.

(3) When using the portable medium 43, the reproduction apparatus 47 may increment the number of uses to be recorded on the portable medium 43 by one when the used time exceeds the predetermined minimum used time.

Or, assuming that the total used time is recorded on the portable medium 43, the reproduction apparatus 47 may delete the main content and the sub content when the total used time has reached a predetermined time.

Furthermore, using these conditions in combinations, the reproduction apparatus 47 may delete the main content and the sub content when all the conditions are satisfied.

(4) Note that the number of uses to be recorded on the portable medium 43 may be encrypted for protection against tampering, or all the information to be recorded on the portable medium 43 may be encrypted.

In addition, the portable medium 43 may include a CPU for mutual authentication with the reproduction apparatus 47. When the reproduction apparatus 47 is authenticated by the CPU, it is permitted to access the portable medium 43 for reading and writing. By doing so, there is no exchange of data with an unauthenticated reproduction apparatus which may tamper the data, so protection against tampering can be achieved.

(5) The predetermined number of uses indicating the upper limit of the number of times up to which the portable medium 43 can be used does not need to be a fixed value, but may be recorded previously on the optical disc 41 for each content and be recorded on the portable medium 43 when contents are aggregated. In addition, the predetermined number of uses may be obtained from the server 44 via the Internet 48.

(6) Furthermore, the main content recorded on the optical disc 41 may be encrypted. A decryption key for decrypting the encrypted main content and the medium ID may also be recorded on the optical disc 41. Under the circumstances, when the decryption key and the medium ID are managed by the server 44 and the reproduction apparatus 47 can access the server 44 via the Internet 48, the aggregation apparatus 46 may record only the encrypted main content and the medium ID on the portable medium 43, not recording the decryption key. In this case, when reproducing the portable medium 43, the reproduction apparatus 47 sends the medium ID to the server 44 to obtain the decryption key that corresponds to the medium ID from the server 44, decrypts the encrypted main content recorded on the portable medium 43 using the obtained decryption key, and then reproduces the main content.

Note that the medium ID to be recorded on the optical disc 41 may be any other ID as long as it can identify what the content recorded on the optical disc 41 is. For example, it may be a content name, a content ID or the like.

At that time, billing processing may be performed for user's content use.

Thereby, it is possible to meet the request of the content provider for permitting only the user who accepts the billing from the content provider to use the contents aggregated and recorded onto a single recording medium from a plurality of recording mediums.

Other Modifications

Although the first through fourth embodiments have been fully described by way of examples of the embodiments of the present invention, it is to be noted that various changes and modifications will be apparent to those skilled in the art. Therefore, unless otherwise such changes and modifications depart from the scope of the present invention, they should be construed as being included therein. The embodiments of the present invention also include the following modifications:

(1) Assuming that there are a plurality of optical discs 11 (or optical discs 21, 31 or 41) (which are hereinafter referred to as optical discs), main contents may be recorded on the plurality of optical discs. Or, assuming that there are a plurality of portable mediums 13 (or portable mediums 23, 33 or 43) (which are hereinafter referred to as portable mediums), main contents and sub contents may be aggregated and recorded on the plurality of portable mediums.

(2) In the above first through fourth embodiments, the sub content obtainment apparatus 15 (or the sub content obtainment apparatus 25, 35 or 45) (which is hereinafter referred to as a sub content obtainment apparatus) records a sub content on the memory card 12 (or the memory card 22, 32 or 42) (which is hereinafter referred to as a memory card), and the aggregation apparatus 16 (or the aggregation apparatus 26, 36 or 46) (which is hereinafter referred to as an aggregation apparatus) or the reproduction apparatus 17 (or the reproduction apparatus 27, 37 or 47) (which is hereinafter referred to as a reproduction apparatus) reads the sub content via the memory card. However, the aggregation apparatus or the reproduction apparatus itself may obtain the sub content from the server 14 (or the server 24, 34 or 44) via the Internet 18 (or the Internet 28, 38 or 48).

(3) When the sub content obtainment apparatus 15 (or the sub content obtainment apparatus 25, 35 or 45) (which is hereinafter referred to as a sub content obtainment apparatus) obtains a sub content from the server 14 (or the server 24, 34 or 44) (which is hereinafter referred to as a server), the server and the sub content obtainment apparatus may authenticate each other and share a key so that the sub content is obtained securely.

To be more specific, it is assumed, for example, that the server and the sub content obtainment apparatus have the public key certificates. When the sub content obtainment apparatus obtains a sub content from the server, it sends its own public key certificate to the server and receives the public key certificate of the server. Then, the sub content obtainment apparatus and the server verify the public key certificates each other, and after the verification, share a temporary key CK under the Diffie-Hellman key exchange protocol. Then, the server encrypts the sub content using the temporary key CK and sends it to the sub content obtainment apparatus. The sub content obtainment apparatus decrypts the sub content encrypted using the temporary key so as to obtain the original sub content.

As for the public key certificate, "Digital Shomei to Angou Gijutsu" (in Japanese) written by Shin'ichiro Yamada (Pearson Education Japan, p. 159-p. 214, 1997) describes it in detail, and as for the Diffie-Hellman key exchange, "Gendai Angou" (in Japanese) written by Tatsuaki Okamoto and Hirosuke Yamamoto (Series/Jouhou Kagaku no Suugaku, Sangyo Tosho, 1997) describes it in detail, so the detailed explanation thereof is not repeated here.

As a result, since the sub content is obtained securely, the copyrights of the contents are protected more securely.

(4) In the above embodiments, when the aggregation apparatus 16 (or the aggregation apparatus 26, 36 or 46) (which is hereinafter referred to as an aggregation apparatus) aggregates the main content and the sub content and records them onto the portable medium 13 (or the portable medium 23, 33 or 43) (which is hereinafter referred to as a portable medium), it writes the main content and the sub content onto the portable medium. However, any other method may be used as long as it enables the reproduction apparatus 17 (or the reproduction apparatus 27, 37 or 47) to reproduce the main content and the sub content by associating them with each other.

For example, as described above, in a case where the main content and the sub content are reproduced in association with each other by replacing the audio data of the main content with the audio data of the sub content for reproduction, the aggregation apparatus may record only the video data of the main content and the audio data of the sub content onto the portable medium.

(5) In the above embodiment, the reproduction apparatus 17 (or the reproduction apparatus 27, 37 or 47) (which is hereinafter referred to as a reproduction apparatus) reproduces the main content and the sub content by associating them with each other by replacing the audio data of the main content with the audio data of the sub content. However, any other method may be used as long as it enables the reproduction apparatus to reproduce the main content into which the information of the sub content is incorporated.

For example, in a case where the main content is digital data composed of audio and video and the sub content is digital data composed of subtitles, the reproduction apparatus may add the subtitles of the sub content to the video data of the main content for reproduction.

(6) Furthermore, the aggregation apparatus 16 (or the aggregation apparatus 26, 36 or 46) may further aggregate contents aggregated and recorded onto the portable medium 13 (or the portable medium 23, 33 or 43) and a sub content recorded on another memory card 12z and record them onto still another portable medium 13z.

To be more specific, when aggregating and recording the contents onto the portable medium 13, the aggregation apparatus 16 also records the reproduction judgment information on the portable medium 13 and determines the default value thereof to be 1. Then, the first access unit 161 reads the aggregated contents from the portable medium 13, the second access unit 162 reads the sub content from the memory card 12z, and the third access unit 164 further aggregate the aggregated contents and the sub content and writes them onto the portable medium 13z, and after the aggregation, rewrites the reproduction judgment information on the portable medium 13. By doing so, it is possible to further aggregate the contents aggregated and recorded onto the portable medium 13 and the sub content recorded on the memory card 12z and record them onto the portable medium 13z. Since the portable medium 13 cannot be reproduced any more, the copyrights of the contents are protected even if they are further aggregated, as is the case with the first embodiment.

In addition, for example, the first access unit 261 reads the aggregated contents from the portable medium 23, the second access unit 262 reads the sub content from the memory card 12z, and the third access unit 264 further aggregates the aggregated contents and the sub content and writes them onto the portable medium 13z. By doing so, it is possible to further aggregate the contents aggregated and recorded onto the portable medium 23 and the sub content recorded on the memory card 12z and record them onto the portable medium 13z. Since the decryption key storage medium 211 is required for the reproduction of the portable medium 23 or the portable medium 13z, the copyrights of the contents are protected even if they are further aggregated as mentioned above, as is the case with the second embodiment.

As another example, when aggregating contents on the portable medium 33, the aggregation apparatus 36 records the medium ID read from the optical disc 31 on the portable medium 33, the first access unit reads the aggregated contents from the portable medium 33, the second access unit 362 reads the sub content from the memory card 12z, and the third access unit further aggregates the aggregated contents and the sub content and writes them onto the portable medium 13z. By doing so, it is possible to further aggregate the contents aggregated and recorded onto the portable medium 33 and the sub content recorded on the memory card 12z and record them onto the portable medium 13z. The medium ID read from the optical disc 31 is recorded on the portable medium 33, and the aggregation apparatus 36 determines whether or not to aggregate and record the contents onto the portable medium 13z based on this medium ID and the aggregation judgment information, so the copyrights of the contents are protected even if they are further aggregated as mentioned above, as is the case with the third embodiment.

As still another example, the first access unit 461 reads the aggregated contents and the number of uses from the portable medium 43, the second access unit 462 reads the sub content from the memory card 12z, and the third access unit 464 further aggregates the aggregated contents and the sub content and writes them, together with the number of uses, onto the portable medium 13z, and rewrites the number of uses on the portable medium 43 to 0. By doing so, it is possible to further aggregate the contents aggregated and recorded onto the portable medium 43 and the sub content recorded on the memory card 12z and record them onto the portable medium 13z. And the number of uses recorded on the portable medium 43 is inherited as it is to the number of uses recorded on the portable medium 13z, so the copyrights of the contents are protected even if they are further aggregated as mentioned above, as is the case with the fourth embodiment.

As a result, it is possible to further aggregate the contents which have been aggregated once on the portable medium 13 (or the portable medium 23, 33 or 43) and the sub content and to record them onto another medium, while protecting the copyrights of the contents.

(7) The present invention may be any of the methods as described above, a computer program for causing a computer to realize any of these methods, or a digital signal consisting of the computer program.

The present invention may be a computer readable recording medium, such as a semiconductor memory, a hard disk drive, a CD-ROM, a DVD-ROM and a DVD-RAM, on which the above-mentioned computer program or the digital signal is recorded.

(8) Each of the above-mentioned embodiments and modifications may be combined.

As described above, the present invention provides the aggregation system which has not been realized by the conventional technology, and thus is of great value.

The aggregation system of the present invention has the effect of aggregating contents which are recorded on a plurality of recording mediums and recording them onto another recording medium while protecting the copyrights of the contents, or reproducing the aggregated contents while protecting the copyrights of the contents. Therefore, the present invention is of value as an aggregation system or the like for aggregating contents which are recorded on a plurality of recording mediums and recording them onto a single recording medium.

The invention claimed is:

1. An aggregation system comprising an aggregation apparatus, a first reproduction apparatus and a second reproduction apparatus,
wherein said aggregation apparatus includes:
a first obtainment unit operable to obtain a main content including video data and audio data from a first recording medium;
a second obtainment unit operable to obtain a sub content including either audio data or subtitle data; and
a recording unit operable to aggregate the main content and the sub content and record the aggregated contents onto a second recording medium,
said first reproduction apparatus includes:
a third obtainment unit operable to obtain the main content from the first recording medium;
a fourth obtainment unit operable to obtain reproduction control information for controlling reproduction of the main content; and
a reproduction unit operable to reproduce the main content recorded on the first recording medium and the sub content, based on the reproduction control information, so that the audio data of the main content is replaced with either the audio data of the sub content or the subtitle data of the sub content to be reproduced, and
said second reproduction apparatus reproduces the main content and the sub content which are recorded on the second recording medium so that the audio data of the main content is replaced with either the audio data of the sub content or the subtitle data of the sub content to be reproduced.

2. The aggregation system according to claim 1,
wherein the reproduction control information indicates whether or not reproduction of the main content is permitted, and is recorded on the first recording medium,
said aggregation apparatus further includes:
a fifth obtainment unit operable to obtain the reproduction control information from the first recording medium;
a first judgment unit operable to judge whether or not the reproduction control information obtained by the fifth obtainment unit is information indicating that reproduction of the main content is permitted; and
a changing unit operable to change the reproduction control information recorded on the first recording medium so that the reproduction control information indicates that reproduction of the main content is not permitted, in the case where the main content and the sub content are recorded onto the second recording medium by the recording unit,
the first reproduction apparatus includes a second judgment unit operable to judge whether or not the reproduction control information obtained by the fourth obtainment unit is the information indicating that reproduction of the main content is permitted,
the recording unit aggregates the main content obtained by the first obtainment unit and the sub content obtained by the second obtainment unit and records the aggregated contents onto the second recording medium, when the first judgment unit judges that the reproduction control information is the information indicating that reproduction of the main content is permitted,
the fourth obtainment unit obtains the reproduction control information from the first recording medium, and
the reproduction unit reproduces the main content recorded on the first recording medium, when the second judgment unit judges that the reproduction control information is the information indicating that reproduction of the main content is permitted.

3. The aggregation system according to claim 2,
wherein said first reproduction apparatus and said second reproduction apparatus are identical.

4. The aggregation system according to claim 2,
wherein a format of the main content recorded on the first recording medium is same as a format of the main content recorded on the second recording medium.

5. The aggregation system according to claim 2,
wherein the reproduction control information is index information which is required for reading the main content.

6. The aggregation system according to claim 2,
wherein the main content is encrypted, and
the reproduction control information is a decryption key for decrypting the encrypted main content.

7. The aggregation system according to claim 2,
wherein a special area which can be physically destroyed is provided in the first recording medium,
the reproduction control information is recorded in the special area, and
the changing unit destroys the special area to prevent reproduction of the main content.

8. An aggregation apparatus for (i) aggregating a main content including video data and audio data recorded on a first recording medium and a sub content including either audio data or subtitle data and (ii) recording the aggregated contents onto a second recording medium, the aggregation apparatus comprising:
a first obtainment unit operable to obtain the main content from the first recording medium recording reproduction control information, on the first recording medium, indicating whether or not reproduction of the main content and the sub content is permitted, the main content and the sub content being reproduced so that the audio data of the main content is replaced with either the audio data of the sub content or the subtitle data of the sub content to be reproduced;
a second obtainment unit operable to obtain the sub content;
a third obtainment unit operable to obtain the reproduction control information from the first recording medium;
a judgment unit operable to judge whether or not the reproduction control information is information indicating that reproduction of the main content and the sub content is permitted;
a recording unit operable to aggregate the main content and the sub content and record the aggregated contents onto the second recording medium, when said judgment unit judges that the reproduction control information is the information indicating that reproduction of the main content and the sub content is permitted; and a changing unit operable to change the reproduction control information recorded on the first recording medium so that said reproduction control information indicates that reproduction of the main content and the sub content is not permitted, in the case where the main content and the sub content are recorded onto the second recording medium by said recording unit.

9. A reproduction apparatus for reproducing (i) a main content including video data and audio data recorded on a recording medium, and (ii) sub content including either audio data or subtitle data, the reproduction apparatus comprising:

a first obtainment unit operable to obtain (i) the main content from the recording medium, and (ii) the sub content, the sub content being obtained for reproduction, and the recording medium recording reproduction control information, on the recording medium, indicating whether or not reproduction of the main content and the sub content is permitted, the main content and the sub content being reproduced so that the audio data of the main content is replaced with either the audio data of the sub content or the subtitle data of the sub content to be reproduced;

a second obtainment unit operable to obtain the reproduction control information from the recording medium;

a judgment unit operable to judge whether or not the reproduction control information is information indicating that reproduction of the main content and the sub content is permitted; and a reproduction unit operable to reproduce the main content recorded on the recording medium and the sub content so that the audio data of the main content is replaced with either the audio data of the sub content or the subtitle data of the sub content to be reproduced, when the judgment unit judges that the reproduction control information is the information indicating that reproduction of the main content and the sub content is permitted.

10. An aggregation method for (i) aggregating a main content including video data and audio data recorded on a first recording medium and a sub content including either audio data or subtitle data and (ii) recording the aggregated contents onto a second recording medium, the aggregation method comprising:

a first obtainment step of obtaining the main content from the first recording medium recording reproduction control information, on the first recording medium, indicating whether or not reproduction of the main content and the sub content is permitted, the main content and the sub content being reproduced so that the audio data of the main content is replaced with either the audio data of the sub content or the subtitle data of the sub content to be reproduced;

a second obtainment step of obtaining the sub content;

a third obtainment step of obtaining the reproduction control information from the first recording medium;

a judgment step of judging whether or not the reproduction control information is information indicating that reproduction of the main content and the sub content is permitted; and a recording step of aggregating the main content and the sub content and recording the aggregated contents onto the second recording medium, when it is judged in the judgment step that the reproduction control information is the information indicating that reproduction of the main content and the sub content is permitted; and a changing step of changing the reproduction control information recorded on the first recording medium so that said reproduction control information indicates that reproduction of the main content and the sub content is not permitted, in the case where the main content and the sub content are recorded onto the second recording medium in the recording step.

11. A reproduction method for reproducing (i) a main content including video data and audio data recorded on a recording medium and (ii) a sub content including either audio or data subtitle data, the reproduction method comprising:

a first obtainment step of obtaining (i) the main content from the recording medium, and (ii) the sub content, the sub content being obtained for reproduction and the recording medium recording reproduction control information, on the recording medium, indicating whether or not reproduction of the main content and the sub content is permitted, the main content and the sub content being reproduced so that the audio data of the main content is replaced with either the audio data of the sub content or the subtitle data of the sub content to be reproduced;

a second obtainment step of obtaining the reproduction control information from the recording medium;

a judgment step of judging whether or not the reproduction control information is information indicating that reproduction of the main content and sub content is permitted; and a reproduction step of reproducing the main content recorded on the recording medium and the sub content, so that the audio data of the main content is replaced with either the audio data of the sub content or the subtitle data of the sub content to be reproduced, when it is judged in the judgment step that the reproduction control information is the information indicating that reproduction of the main content and the sub content is permitted.

12. A program stored on a computer-readable recording medium for (i) aggregating a main content including video data and audio data recorded on a first recording medium and a sub content including either audio data or subtitle data and (ii) recording the aggregated contents onto a second recording medium, the program causing a computer to execute:

a first obtainment step of obtaining the main content from the first recording medium recording reproduction control information, on the first recording medium, indicating whether or not reproduction of the main content and the sub content is permitted, the main content and the sub content being reproduced so that the audio data of the main content is replaced with either the audio data of the sub content or the subtitle data of the sub content to be reproduced;

a second obtainment step of obtaining the sub content;

a third obtainment step of obtaining the reproduction control information from the first recording medium;

a judgment step of judging whether or not the reproduction control information is information indicating that reproduction of the main content and the sub content is permitted;

a recording step of aggregating the main content and the sub content and recording the aggregated contents onto the second recording medium, when it is judged in the judgment step that the reproduction control information is the information indicating that reproduction of the main content and the sub content is permitted; and a changing step of changing the reproduction control information recorded on the first recording medium so that said reproduction control information indicates that reproduction of the main content and the sub content is not permitted, in the case where the main content and the sub content are recorded onto the second recording medium in the recording step.

13. A program stored on a computer-readable recording medium for reproducing (i) a main content including video data and audio data recorded on a recording medium, and (ii) a sub content including either audio data or subtitle data, the program causing a computer to execute:

a first obtainment step of obtaining (i) the main content from the recording medium, and (ii) the sub content, the sub content being obtained for reproduction and the recording medium recording reproduction control information, on the recording medium, indicating whether or not reproduction of the main content and the sub content is permitted, the main content and the sub content being reproduced so that the audio data of the main content is replaced with either the audio data of the sub content or the subtitle data of the sub content to be reproduced;

a second obtainment step of obtaining the reproduction control information from the recording medium;

a judgment step of judging whether or not the reproduction control information is information indicating that reproduction of the main content and the sub content is permitted; and a reproduction step of reproducing the main content recorded on the recording medium and the sub content, so that the audio data of the main content is replaced with either the audio data of the sub content or the subtitle data of the sub content to be reproduced, when it is judged in the judgment step that the reproduction control information is the information indicating that reproduction of the main content and the sub content is permitted.

14. An aggregation system comprising an aggregation apparatus and a reproduction apparatus, wherein said aggregation apparatus includes:

a first obtainment unit operable to obtain a main content including video data and audio data;

a second obtainment unit operable to obtain a sub content including either audio data or subtitle data;

a third obtainment unit operable to obtain aggregation judgment information indicating whether or not aggregation of the main content and the sub content and recording of the aggregated contents onto a recording medium are permitted;

a judgment unit operable to judge whether or not the aggregation judgment information is information indicating that aggregation of the main content and the sub content and recording of the aggregated contents onto the recording medium are permitted; and a recording unit operable to aggregate the main content and the sub content and record the aggregated contents onto the recording medium, when the judgment unit judges that the aggregation judgment information is the information indicating that aggregation and recording onto the recoding medium are permitted, and said reproduction apparatus reproduces the main content and the sub content which are recorded on the recording medium so that the audio data of the main content is replaced with either the audio data of the sub content or the subtitle data of the sub content to be reproduced.

15. An aggregation apparatus for (i) aggregating a main content including video data and audio data and a sub content including either audio data or subtitle data and (ii) recording the aggregated contents onto a first recording medium, comprising:

a first obtainment unit operable to obtain the main content;

a second obtainment unit operable to obtain the sub content;

a third obtainment unit operable to obtain aggregation judgment information indicating whether or not aggregation of the main content and the sub content and recording of the aggregated contents onto the first recording medium are permitted, the aggregation being executed so that the audio data of the main content is replaced with either the audio data of the sub content or the subtitle data of the sub content to be reproduced;

a judgment unit operable to judge whether or not the aggregation judgment information is information indicating that aggregation of the main content and the sub content and recording of the aggregated contents onto the first recording medium are permitted; and a recording unit operable to aggregate the main content and the sub content and record the aggregated contents onto the first recording medium, when said judgment unit judges that the aggregation judgment information is the information indicating that aggregation and recording onto the first recording medium are permitted.

16. The aggregation apparatus according to claim 15, wherein the main content is recorded on a second recording medium, and a predetermined identifier is further recorded on the second recording medium, the aggregation apparatus further comprises:

a fourth obtainment unit operable to obtain the predetermined identifier from the second recording medium; and a sending unit operable to send the predetermined identifier to a predetermined apparatus for sending the aggregation judgment information based on the predetermined identifier, said first obtainment unit obtains the main content from the second recording medium, and said third obtainment unit obtains the aggregation judgment information by receiving said aggregation judgment information from the predetermined apparatus.

17. The aggregation apparatus according to claim 16, wherein the predetermined identifier is a medium identifier that specifies the second recording medium.

18. The aggregation apparatus according to claim 16, wherein the predetermined identifier is a content identifier that specifies the main content.

19. The aggregation apparatus according to claim 15, wherein the aggregation judgment information is information indicating whether or not aggregation of the main content and the sub content and recording of the aggregated contents onto the first recording medium are permitted, depending on billing for aggregation of the main content and the sub content.

20. The aggregation apparatus according to claim 15, wherein the aggregation judgment information is information indicating whether or not aggregation of the main content and the sub content and recording of the aggregated contents onto the first recording medium are permitted, depending on the number of aggregations of the main content and the sub content.

21. The aggregation apparatus according to claim 15, wherein the main content and the aggregation judgment information are recorded on a second recording medium, said first obtainment unit obtains the main content from the second recording medium, and said third obtainment unit obtains the aggregation judgment information from the second recording medium.

22. An aggregation method for (i) aggregating a main content including video data and audio data and a sub content including either audio data or subtitle data and (ii) recording the aggregated contents onto a recording medium, comprising:

a first obtainment step of obtaining the main content;

a second obtainment step of obtaining the sub content;

a third obtainment step of obtaining aggregation judgment information indicating whether or not aggregation of the main content and the sub content and recording of the aggregated contents onto the recording medium are permitted, the aggregation being executed so that the audio data of the main content is replaced with either the audio data of the sub content or the subtitle data of the sub content to be reproduced;

a judgment step of judging whether or not the aggregation judgment information is information indicating that aggregation of the main content and the sub content and recording of the aggregated contents onto the recording medium are permitted; and a recording step of aggregating the main content and the sub content and recording the aggregated contents onto the recording medium, when it is judged in said judgment step that the aggregation judgment information is the information indicating that aggregation and recording onto the recording medium are permitted.

23. A program stored on a computer-readable recording medium for (i) aggregating a main content including video data and audio data and a sub content including either audio data or subtitle data and (ii) recording the aggregated contents onto a recording medium, the program causing a computer to execute:

a first obtainment step of obtaining the main content;

a second obtainment step of obtaining the sub content;

a third obtainment step of obtaining aggregation judgment information indicating whether or not aggregation of the main content and the sub content and recording of the aggregated contents onto the recording medium are permitted, the aggregation being executed so that the audio data of the main content is replaced with either the audio data of the sub content or the subtitle data of the sub content to be reproduced;

a judgment step of judging whether or not the aggregation judgment information is information indicating that aggregation of the main content and the sub content and recording of the aggregated contents onto the recording medium are permitted; and a recording step of aggregating the main content and the sub content and recording the aggregated contents onto the recording medium, when it is judged in said judgment step that the aggregation judgment information is the information indicating that aggregation and recording onto the recording medium are permitted.

24. An aggregation system comprising an aggregation apparatus, and a reproduction apparatus, wherein the aggregation apparatus includes:

a first obtainment unit operable to obtain a main content including video data and audio data;

a second obtainment unit operable to obtain a sub content including either audio data or subtitle data; and a recording unit operable to aggregate the main content and the sub content and record the aggregated contents onto a recording medium, and the reproduction apparatus includes:

a judgment unit operable to judge whether or not a situation of reproduction of the main content and the sub content satisfies a predetermined condition indicating that reproduction of the main content and the sub content is permitted, the main content and the sub content being reproduced so that the audio data of the main content is replaced with either the audio data of the sub content or the subtitle data of the sub content to be reproduced, and a reproduction unit operable to reproduce the main content and the sub content which are recorded on the recording medium, so that the audio data of the main content is replaced with either the audio data of the sub content or the subtitle data of the sub content to be reproduced, when the judgment unit judges that the situation satisfies the predetermined condition.

25. A reproduction method for reproducing a main content and a sub content which are aggregated and recorded onto a recording medium, the encrypted main content including video data and audio data, and the sub content including either audio data or subtitle data, comprising:

a judgment step of judging whether or not a situation of reproduction of the main content and the sub content satisfies a predetermined condition indicating that reproduction of the main content and the sub content is permitted, the main content and sub content being reproduced so that the audio data of the main content is replaced with either the audio data of the sub content or the subtitle data of the sub content to be reproduced; and a reproduction step of reproducing the main content and the sub content which are recorded on the recording medium, so that the audio data of the main content is replaced with either the audio data of the sub content or the subtitle data of the sub content or the subtitle data of the sub content to be reproduced, when it is judged in the judgment step that the situation satisfies the predetermined condition.

26. A program stored on a computer-readable recording medium for reproducing a main content and a sub content which are aggregated and recorded onto a recording medium, the encrypted main content including video data and audio data, and the sub content including either audio data or subtitle data, the program causing a computer to execute:

a judgment step of judging whether or not a situation of reproduction of the main content and the sub content satisfies a predetermined condition indicating that reproduction of the main content and the sub content is permitted, the main content and sub content being reproduced so that the audio data of the main content is replaced with either the audio data of the sub content or the subtitle data of the sub content to be reproduced; and a reproduction step of reproducing the main content and the sub content which are recorded on the recording medium, so that the audio data of the main content is replaced with either the audio data of the sub content or the subtitle data of the sub content or the subtitle data of the sub content to be reproduced, when it is judged in the judgment step that the situation satisfies the predetermined condition.

* * * * *

UNITED STATES PATENT AND TRADEMARK OFFICE
CERTIFICATE OF CORRECTION

PATENT NO.       : 7,823,212 B2                              Page 1 of 1
APPLICATION NO.  : 10/553412
DATED            : October 26, 2010
INVENTOR(S)      : Masato Yamamichi et al.

It is certified that error appears in the above-identified patent and that said Letters Patent is hereby corrected as shown below:

<u>ON THE TITLE PAGE</u>

In section (75) "Inventors: Masato Yamamichi, Ota (JP); Satomi Yamamichi, legal representative, Ota (JP); Keiko Yamamichi, legal representative, Maebashi (JP); Motoji Ohmori, Hirakata (JP); Masaya Yamamoto, Hirakata (JP); Yasushi Uesaka, Sanda (JP); Hiroshi Hamasaka, Hirakata (JP)"
should read -- Inventors: Masato Yamamichi, Ota (JP); Masami Yamamichi, legal representative, Ota (JP); Satomi Yamamichi, legal representative, Ota (JP); Keiko Yamamichi, legal representative, Maebashi (JP); Motoji Ohmori, Hirakata (JP); Masaya Yamamoto, Hirakata (JP); Yasushi Uesaka, Sanda (JP); Hiroshi Hamasaka, Hirakata (JP) --.

Signed and Sealed this
Twenty-ninth Day of March, 2011

David J. Kappos
*Director of the United States Patent and Trademark Office*